(12) United States Patent
Kerfoot

(10) Patent No.: US 6,312,605 B1
(45) Date of Patent: *Nov. 6, 2001

(54) GAS-GAS-WATER TREATMENT FOR GROUNDWATER AND SOIL REMEDIATION

(76) Inventor: William B. Kerfoot, 49 Ransome Rd., Falmouth, MA (US) 02649

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/921,763

(22) Filed: Aug. 26, 1997

Related U.S. Application Data

(63) Continuation of application No. 08/756,273, filed on Nov. 25, 1996, now Pat. No. 5,855,775, which is a continuation-in-part of application No. 08/638,017, filed on Apr. 25, 1996, now abandoned, which is a continuation-in-part of application No. 29/038,499, filed on May 5, 1995, now abandoned, and a continuation-in-part of application No. PCT/US96/18464, filed on Nov. 15, 1996.

(51) Int. Cl.[7] ............................ C02F 1/78; B09B 3/00
(52) U.S. Cl. .................. 210/741; 210/747; 210/760; 210/763; 210/170; 210/220; 210/908; 210/909; 405/128; 588/206; 588/248; 166/250.02
(58) Field of Search .................. 166/250.02, 266, 166/257, 300, 261, 401; 588/248, 206; 210/170, 198.1, 220, 747, 749, 758, 741, 760, 763, 908, 909; 405/128, 263

(56) References Cited

U.S. PATENT DOCUMENTS 3,823,776 * 7/1974 Holmes .
4,268,283   5/1981 Roberts ................................. 55/189
4,614,596 * 9/1986 Wyness .

(List continued on next page.)

FOREIGN PATENT DOCUMENTS 2 185 901   8/1987 (GB) .
32-67196   11/1991 (JP) .

OTHER PUBLICATIONS

"Laboratory Study of Sparging: Air Flow Visulaization", Ji et al, Fall 1993 GWMR pp. 115–126.
"Application of a 3–D Model in the Design of Air Sparging Systems", Marley et al pp. 377–392 1992.
"Leachate Plume Management" by Repa et al, for Office of Solid Waste & Emergency Response, 1985 JRB.
"Injectable Points for Sandy Soil Sparging Systems" by Kerfoot 1993 in Hydrocarbon Contaminated Soils.
"Groundwater Mounding Under Leaching Beds" by Repa et al, 1981, in OnSite Sewage Treatment pp. 215–222.
"Growth & Decay of Groundwater Mounds in Response to Uniform Percolation" by Hantush 1967 in Water Resources Research, vol. 3, No. 1 227–234.

(List continued on next page.)

*Primary Examiner*—Chester T. Barry
*Assistant Examiner*—Fred Prince
(74) *Attorney, Agent, or Firm*—Fish & Richardson P.C.

(57) ABSTRACT

A sparging system and process for in-situ removal of contaminants from soil and an associated subsurface groundwater aquifer of a site is disclosed. The sparge system is capable of extracting contaminant in the form of gas from groundwater in a gas/gas/water reaction. The system includes at least one microporous diffuser having a porosity matched to a soil porosity. The microdiffuser is in an injection well. Ozone or other oxidizing gas in the form of bubbles is injected into the site to extract volatile dissolved contaminants for in-situ decomposition. A pump and a pneumatic packer are disposed to alternate pumping and bubble injection into the well to maximize dispersal of bubbles within and outward from the well casing, and to provide uniform dispersion of the bubbles as they travel through the site formation.

29 Claims, 41 Drawing Sheets

U.S. PATENT DOCUMENTS

| | | | |
|---|---|---|---|
| 4,730,672 | * | 3/1988 | Payne . |
| 4,832,122 | * | 5/1989 | Corey et al. . |
| 4,941,957 | | 7/1990 | Zeff et al. ............... 204/157.3 |
| 5,080,805 | | 1/1992 | Houser ...................... 210/722 |
| 5,120,442 | | 6/1992 | Kull et al. .................. 210/621 |
| 5,167,806 | * | 12/1992 | Wang et al. . |
| 5,221,159 | | 6/1993 | Billings et al. ............. 405/128 |
| 5,269,943 | * | 12/1993 | Wickramanayake . |
| 5,332,333 | * | 7/1994 | Bentley . |
| 5,389,267 | * | 2/1995 | Gorelick et al. . |
| 5,427,693 | | 6/1995 | Mausgrover et al. ...... 210/739 |
| 5,430,228 | * | 7/1995 | Ciambrone et al. . |
| 5,472,294 | | 12/1995 | Billings et al. ............. 405/128 |
| 5,525,008 | * | 6/1996 | Wilson . |
| 5,615,974 | * | 4/1997 | Land et al. . |
| 5,622,450 | * | 4/1997 | Grant, Jr. . |
| 5,663,475 | * | 9/1997 | Elgal . |
| 5,855,775 | * | 1/1999 | Kerfoot . |

OTHER PUBLICATIONS

"Soil Remediation Workshop" by Johnson et al 1992 for Shell Development.

"Soil Gas Movement–Monitoring Under Natural and Remediation Conditions" by Kerfoot 1994 in Remediation of Hazardous Waste Contaminated Soils, Chapter 33 pp. 791–828.

"Adapting Ozonation For Soul and Groundwater Cleanup", by C. H. Nelson et al. Chemical Engineering, Nov. 1994, pp. 2–5.

* cited by examiner

1 AC TO DC POWER CONVERTER (OR TRICKLE CHARGED LEAD ACID BATTERY)

2 OZONE GENERATOR

3 WELL GAS RELAYS (3 WELLS SHOWN)

4 COMPRESSOR

5 MASTER RELAY 6 15A MAIN FUSE

7 PROGRAMMABLE TIMER-CONTROLLER

8 POWER STRIP

9 GAS REGULATOR AND PRESSURE GAGE

10 SOLENOID MANIFOLD (NUMBER DEPENDS ON SERIES AND NUMBER WELLS)

11 GROUND FAULT INTERRUPTOR

12 COOLING FAN

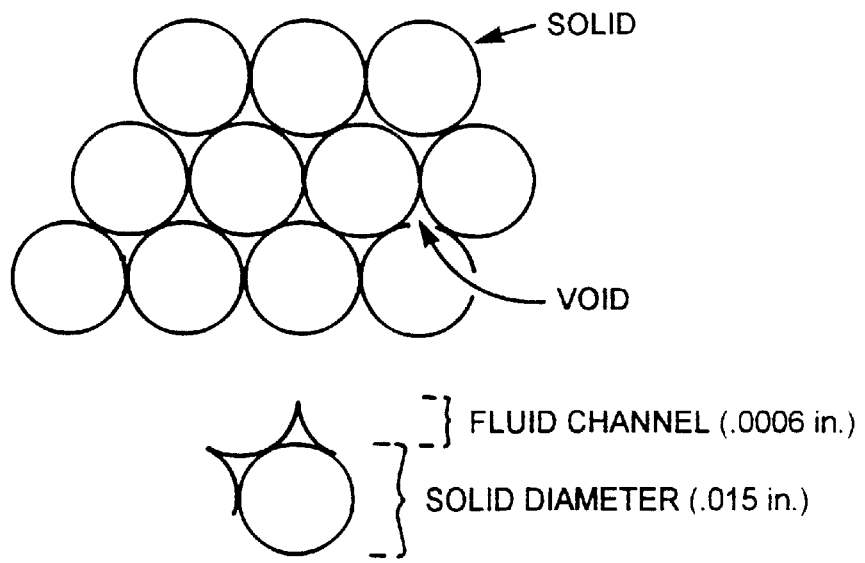
FIG. 7
50 MICRON BUBBLES
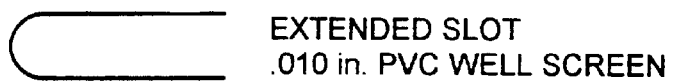
EXTENDED SLOT
.010 in. PVC WELL SCREEN
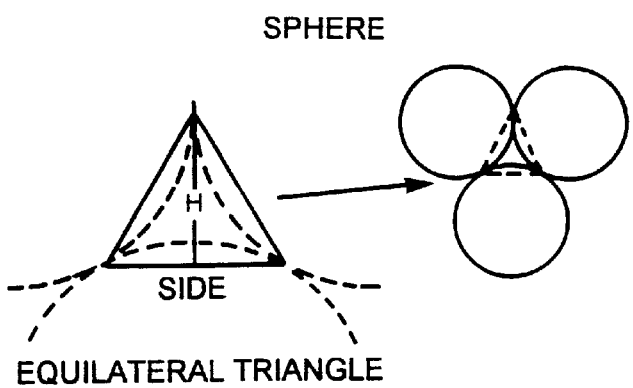

Permeability of Glass Beads Compared
with Permeability of Soil Fractions

| Mean Bead Diameter (mm) | Pore Space (microns) | Permeability (Darcy) | Gas Conductivity (cm/sec) | Equivalent Soil Classification |
|---|---|---|---|---|
| 2.000 | 860 | 1000 | 1.000 | Very coarse sand |
| 1.200 | 516 | 250 | 0.250 | Coarse sand |
| 0.655 | 281 | 147 | 0.147 | Medium coarse sand |
| 0.327 | 140 | 85 | 0.085 | Medium sand |
| 0.167 | 72 | 22 | 0.022 | Fine-medium sand |
| 0.083 | 36 | 9 | 0.009 | Fine sand |
| 0.041 | 18 | 5 | 0.005 | Very fine sand |
| 0.020 | 9 | 2 | 0.002 | Very fine silty sand |

Modified from Anderson, et.al., 1987[2]

FIG. 9

Bubbling zone and mounded area above the active aeration zone. Shape of bubble saturated area widens with increased pressure and volume of injected air.

Sequential rise in water table from bubbling. Concentric zones permit containing Any floating contaminant.

Sequential rise in water table from bubbling. Concentric zones permit containing any floating contaminant.

Movement of microbubbles through saturated pores as diameter of bubble increases, showing coalescing.

US 6,312,605 B1

GAS-GAS-WATER TREATMENT FOR GROUNDWATER AND SOIL REMEDIATION

CONTINUING APPLICATION DATA

This application is a continuation application of application Ser. No. 08/756,273, filed Nov. 25, 1996 entitled "Microporous Diffusion Apparatus" U.S. Pat. No. 5,855,775 which was a continuation-in-part of application Ser. No. 08/638,017 filed on Apr. 25, 1996 entitled "Groundwater and Soil Remediation with Microporous Diffusion Methods and Apparatuses", (abandoned) which was a continuation-in-part of application Ser. No. 29/038,499 filed on May 5, 1995 entitled "Bubblersparge Unit for Ground Water Treatment" (abandoned) and this application is a continuation-in-part of International Application PCT US/96/18464, filed Nov. 15, 1996.

BACKGROUND OF THE INVENTION

1. Field of Invention (Technical Field)

The present invention relates to sparging systems and methods of in-situ groundwater remediation for removal of contamination including dissolved chlorinated hydrocarbons and dissolved hydrocarbon petroleum products. Remediation of saturated soils may also be obtained by employment of the present invention. In particular, the present invention is directed to the use in injection wells of microfine bubble generators, matched to substrates of selected aquifer regions, for injection and distribution of said bubbles containing oxidizing gas through said aquifer. Further, the present invention relates to selectively encapsulating gases including oxygen and ozone in duo-gas bubbles which, in the presence of co-reactant substrate material acting as a catalyst, are effective to encourage biodegradation of leachate plumes which contain biodegradable organics, or Criegee decomposition of leachate plumes containing dissolved chlorinated hydrocarbons.

2. Background Prior Art

The introduction of air bubbles into aquifers for the purpose of remediation is a recent advancement in in-situ treatment of groundwater (Marley, et al., 1992; Brown et al., 1991). Contained air entrainment has been used for many years to provide vertical movement of water in low-head aquariums and in the development of public well supplies (Johnson, 1975). Aeration of aquifers for plume management was suggested to accelerate bacterial degradation of dissolved organic compounds (JRB, 1985). As bubble volume increases in density above re-aeration needs by approaching ratios beyond 1 to 10 (1 water to 10 air), gas transfer begins to dominate. In this case, volatile organics may be physically transported from the saturated aquifer to the overlying unsaturated zone (vadose zone).

There is a well recognized need for a simple test to evaluate a potential site to assist with design of sparging systems deployed on a remediation site. Whereas hydraulic tests have been performed for some period of time based upon the well known Theis equation, the introduction of air bubbles (particularly microscopic bubbles) is new. Also, whereas the introduction of air to the pressure vessel is continuous, the production of bubbles, particularly the microscopic variety, is a discrete discontinuous process. Bubbles, once generated, may take preferential pathways, determined largely by the substratum and, secondarily, by the introduction of pressure (Ji, et al, 1993).

Applicant is aware of prior art devices that have used injection of air to facilitate biodegradation of plumes. U.S. Pat. No. 5,221,159 to Billings shows injection of air into aquifer regions to encourage biodegradation of leachate plumes which contain biodegradable organics together with simultaneous soil vacuum extraction.

Also in U.S. Pat. No. 4,730,672 to Payne, there is disclosed a closed-loop process for removing volatile contaminants. However, Payne deals only with volatile contaminants. Payne discloses a withdrawal well surrounded by multiple injection wells. Pressurized air is injected into the groundwater through the injection wells, and is withdrawn under vacuum from the withdrawal well whereupon contaminants are removed from the air stream and the air is then recycled through the system. The U.S. Pat. No. 4,588,506, to Raymond et al. discloses the injection of a diluted solution of hydrogen peroxide into a contaminated soil for enhancing biodegradation of organic contaminants in the soil. Raymond discloses intermittent spiking of the hydrogen peroxide concentration to eliminate biota to increase soil permeability. Raymond has the disadvantage of failing to deliver oxygen through the system, and depends on a complicated process of hydrologic management of the subsurface which has rendered the process uneconomical.

In U.S. Pat. No. 5,167,806 to Wang et al. there is disclosed apparatus for treatment of a contaminated liquid stream comprising generating extremely fine gas bubbles through porous diffusers, wherein the gas may be a combination of air and ozone. One process disclosed by Wang involves removing dissolved organics from contaminated groundwater by means of generating micro gas bubbles. In the first stage of the process for removing dissolved organics, which involves generating bubbles, no vacuum is employed, as gas bubbles are completely dissolved by the method. Wang teaches an enhanced dissolved aqueous reaction.

In U.S. Pat. No. 4,832,122 to Corey et al. is disclosed an in-situ method for removing contamination from groundwater comprising a horizontal well positioned in the saturated zone which has multiple apertures for injecting gas. The apertures are shown in the figures to be sequentially arranged and closely spaced so that the bubble zones produced from each one would overlap with the adjacent zones. Corey et al. teaches that the configuration of the injection system is dictated by the size and shape of the plume, drilling economics, and the subsurface geology (column 1, lines 4–9, 41–43, 64–68; column 2, lines 1–8, 43–48). Corey also teachers an enhanced dissolved aqueous reaction.

U.S. Pat. No. 4,614,596 to Wyness discloses a method for dissolving a gas in an aqueous stream which comprises diffusing a gas in an aqueous stream to produce small gas bubbles which are rotated to provide a long flow distance over which the bubbles have increased contact time. The figures show that the bubbles are dispersed within and outward from a vessel, or well casing, by maximizing the dispersal of bubbles from a well casing and maximizing contact with the bubbles. Wyness also teaches an enhanced dissolved aqueous reaction.

Notwithstanding the teachings of Wang et al., Corey et al., and Wyness, there has not been shown a sparging system for remediating a site in a controlled manner of poorly biodegradable organics, employing oxidizing gas encapsulated in microbubbles generated from microporous diffusors matched to soil porosity pulsed in a wave form for even distribution through the substrate (aquifer structure) employing a co-reactant in the form of substrate material. Further, the prior art fails to show matching of micron sized bubble formation with substrate material of a selected aquifer or to show the beneficial effect of uniform distribution of sized bubbles through such a formation by means of a pulsed wave form without fracturing said substrate. The present invention accomplishes this by injecting micron size bubbles into aquifer regions in combination with substrate materials acting as a catalyst to encourage biodegradation of leachate plumes which contain biodegradable organics by means of a gas/gas/water reaction which overcomes at least some of the disadvantages of prior art.

SUMMARY OF THE INVENTION

The present invention relates to injection of oxidizing gas in the form of microfine bubbles into aquifer regions by means of a sparging system which includes one or more injection wells to encourage in-situ remediation of subsurface leachate plumes by means of a gas-gas-water reaction. The present invention is directed to sparging systems and methods of in-situ groundwater remediation in combination with co-reactant substrate materials acting as a catalyst to encourage biodegradation of leachate plumes for removal of dissolved chlorinated hydrocarbons and dissolved hydrocarbon petroleum products. Remediation of saturated soils may also be obtained by employment of the present invention. In particular the present invention employs sparging apparatus including microporous bubble generators for generating micron sized duo-gas bubbles into aquifer regions by means of one or more vertically arranged injection wells having a bubble chamber for regulating the size of bubbles. The sparging system of the present invention encourages biodegradation of leachate plumes which contain biodegradable organics or Criegee decomposition of leachate plumes containing dissolved chlorinated hydrocarbons.

The following systems and methods for removing contaminants from soil and an associated subsurface groundwater aquifer using microporous diffusers and duo-gas systems are particularly useful in that they promote extremely efficient removal of poorly biodegradable organics, particularly dissolved chlorinated solvents, without vacuum extraction, and wherein remediation occurs by destroying organic and hydrocarbon material in place without release of contaminating vapors.

In the present invention the groundwater and soil remediation system comprises oxidizing gas encapsulated in microbubbles generated from microporous diffusers matched to soil porosity. A unique bubble size range is matched to underground formation porosity and achieves dual properties of fluid like transmission and rapid extraction of selected volatile gases, said size being so selected so as to not to be so small as to lose vertical mobility. In order to accomplish a proper matching, a prior site evaluation test procedure is devised to test effectiveness of fluid transmission at the site to be remediated.

The advantage of controlled selection of small bubble size is the promotion of rapid extraction of selected volatile organic compounds, such as tetrachloroethene (PCE), trichloroethene (TCE) or dichloroethene (DCE) by incorporating the exceptionally high surface to gas volume ratio. The dual capacity of the small production and rise time is matched to the short lifetime of an oxidative gas, such as ozone to allow rapid dispersion into water saturated geological formations, and extraction and rapid decomposition of the volatile organic material. The unique apparatus of the present invention provides for extraction efficiency with resulting economy of operation by maximizing contact with oxidant by selective rapid extraction providing for optimum fluidity to permit bubbles to move like a fluid through media which can be monitored.

The use of microporous bubble generators provides a more even distribution of air into a saturated formation than the use of pressurized wells. A microfine sparge system installed to remediate contaminated groundwater is made more cost-effective by sparging different parts of the plume area at sequenced times. Through the proper placement of bubble generator locations and sequence control, any possible off-site migration of floating product is eliminated. With closely spaced bubble generators, water mounding is used to advantage in preventing any off-site escape of contaminant. The mounding is used to herd floating product toward extraction sites.

In the present invention, the concept of microfine sparge system manipulation is predicated upon a thorough knowledge of the features of the groundwater or saturated zones on a site selected for remediation. Balancing the volume of air to the microfine system sparge loci enables control of sparging efficiency and balancing of any downgradient movement of a contaminated plume while remediation is accomplished. Critical to microfine sparge system design and accomplishment of any of the above points is to initially perform a "sparge point test" for the purpose of evaluating the characteristics of the site for matching purposes.

Furthermore, the present invention overcomes the limitations expressed above of the prior technology. The invention employs the well recognized Criegee mechanisms which describes the gaseous reaction of ozone with the incoming PCE, TCE and DCE, and vinyl chloride into microbubbles produced by bubble generators with the resultant products then hydrolysed, i.e., reacted with water to decompose into HCl and $CO^2$. It is this physical/chemical reaction which produces the rapid removal rate employed by the present invention (see reference Maston S 1986, "Mechanisms and Kinetics of Ozone Hydroxal Radical Reactions with Model Alafadic and Olanfadic Compounds:, Ph.D. Thesis, Harvard University, Cambridge, Mass.).

Unlike the prior art, the contaminated groundwater is injected with an air/ozone mixture wherein microfine air bubbles strip the solvents from the groundwater and the encapsulated ozone acts as an oxidizing agent to break down the contaminants into carbon dioxide, very dilute HCl and water. This process is also known as the C-Sparger™ process.

Accordingly, the object and purpose of the present invention is to provide microporous diffulsors for removal of contaminants from soil and associated subsurface ground water aquifer, without requiring vacuum extraction.

Another object is to provide duo-gas systems to be used in combination with the microporous diffusors to promote an efficient removal of poorly biodegradable organics, particularly dissolved chlorinated solvents, without vacuum extraction.

A further object is to provide for economical and efficient remediation of contaminated groundwater by providing a calculated plan of sparging different parts of a plume area at sequenced times.

Yet a further object is to control off-site migration of floating product by employing a water mounding technique which effectively herds floating product to extraction sites.

Another object is to provide microfine sparge system manipulation predicated on performance of a site evaluation test.

A further object is to provide that remediation occurs by destroying organic and hydrocarbon material in place without release of contaminating vapors to the atmosphere.

Yet a further object is to obtain economy of operation by maximizing contact with the oxidant to achieve selective rapid extraction.

Another object is to provide a microfine sparge system providing for optimum fluidity to permit bubbles to move like a fluid through media.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

FIG. 7 is a graph illustrating pore size compared with air bubble size.

FIG. 9 is an illustration of permeability of glass beads compared with permeability of soil fractions.

FIG. 30 shows movement of microbubbles through saturated pores as diameter of bubble increases, showing coalescing FIG. 31 is a graphical illustration of PCE removal rate as function of bubble size.

FIG. 32 is a graphical illustration of rapid reaction of gas/gas mixture when passing through moistened sand.

FIG. 33 is a schematic diagram of gas/gas/water reactions contrasted with previous known ozone reactions.

FIG. 34 is a diagram of ozone reactions illustrating Criegee mechanism for gas/gas/water reaction with tetra-chloroethene (PCE).

FIG. 35 shows a microbubble generator column chamber and process.

FIG. 36 shows pressure waves created by C-Sparger™ unit during operation.

FIG. 37 is a graphical illustration of frequency of microbubbles entering monitoring well screen at 15 ft. distance compared to pressure wave from C-Sparger™ unit during water pumpage (pump), lower bubble generator (Spargepoint®) operation (lover SP) and in-well bubble generator (Spargepoint®) operation (in-well SP).

FIG. 38 shows induced recirculation from bubble distribution.

FIG. 39 is a graphical illustration of expanding zone of influence when air and then air/ozone mixtures are injected with C-Sparger™ recirculation system.

FIG. 40 shows remote C-Sparger™ process interrogator and controller.

DETAILED DESCRIPTION OF THE PREFERRED EMBODIMENT

Figure 1:
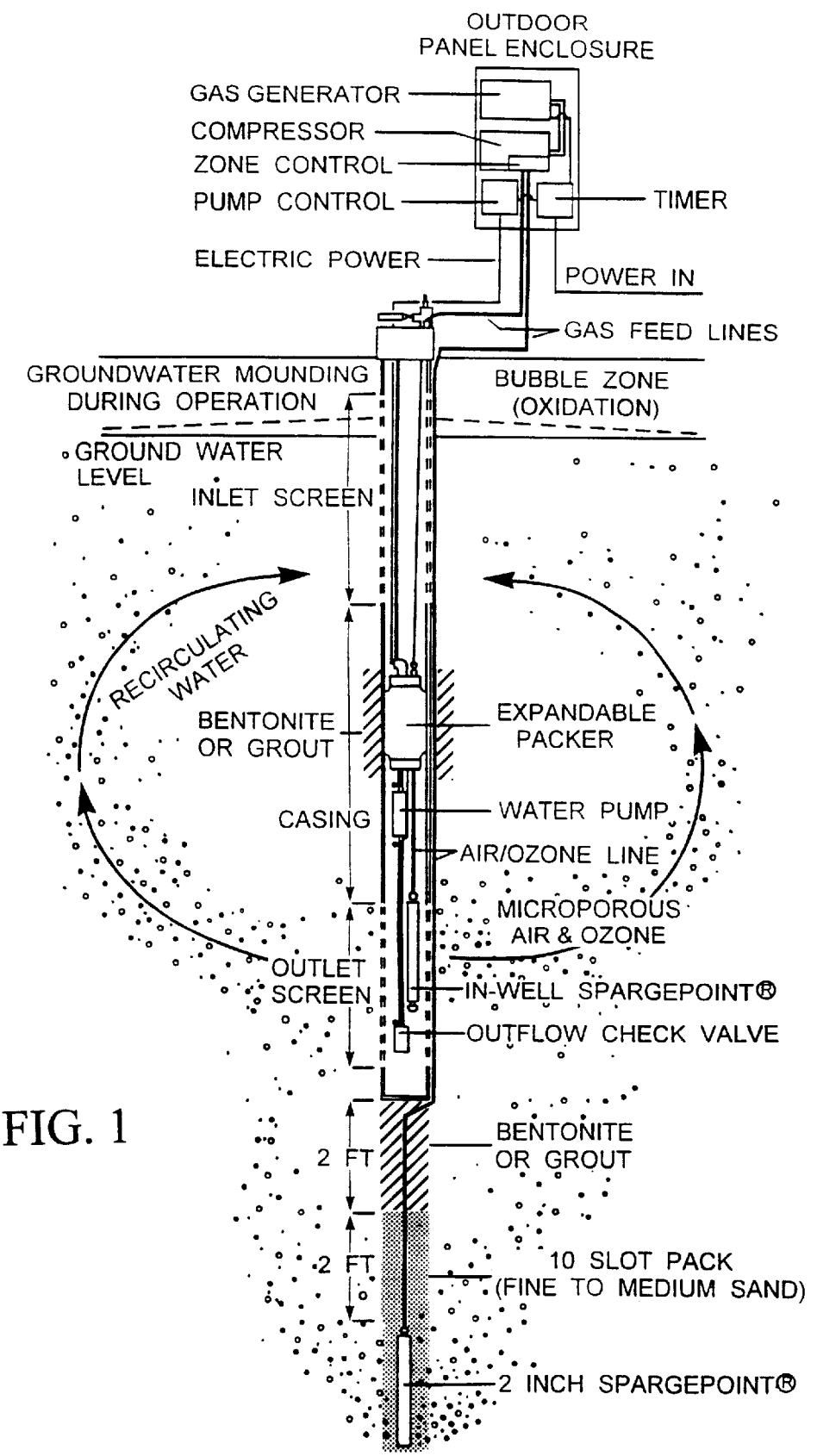
FIG. 1 is a cross sectional schematic illustration of a soil formation showing the system of the present invention as disclosed in the parent applications and incorporated herein.
Figure 2:
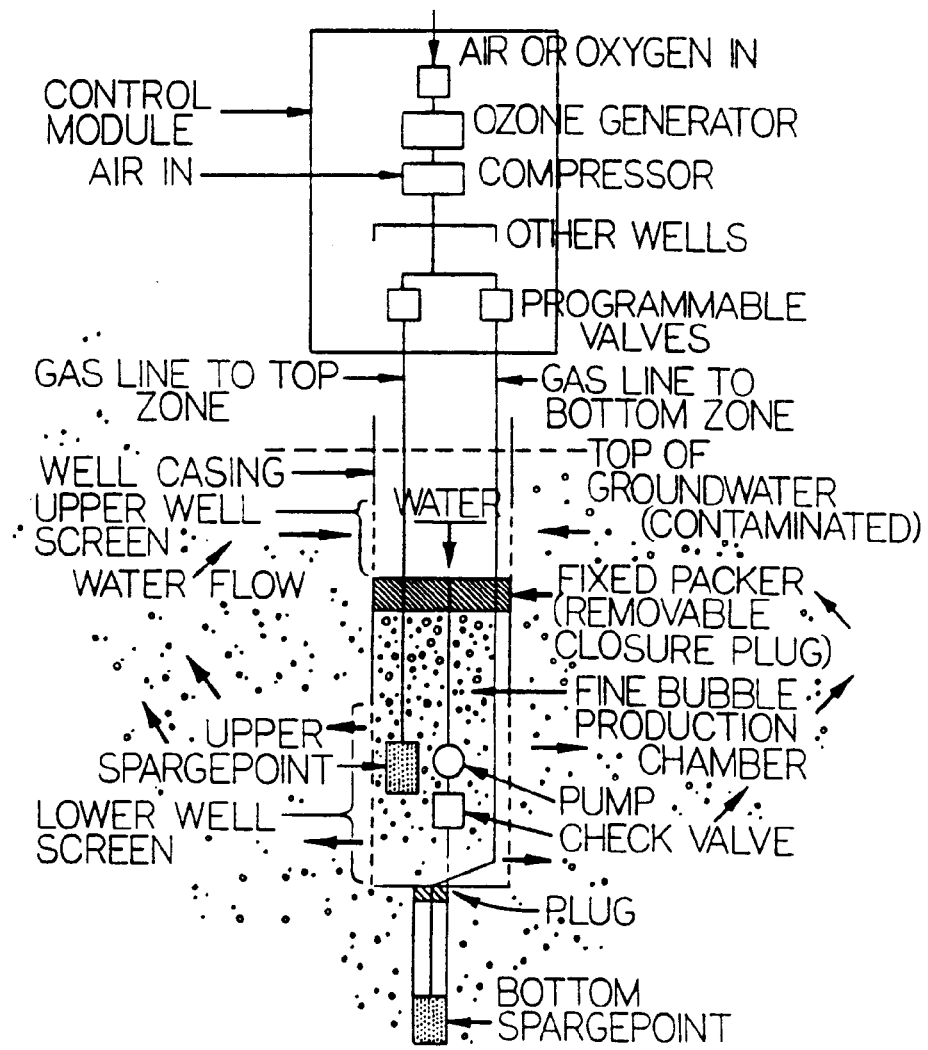
FIG. 2 shows an enlarged piping schematic of the present invention of FIG. 1 showing the unique fine bubble production chamber.
Figure 3:
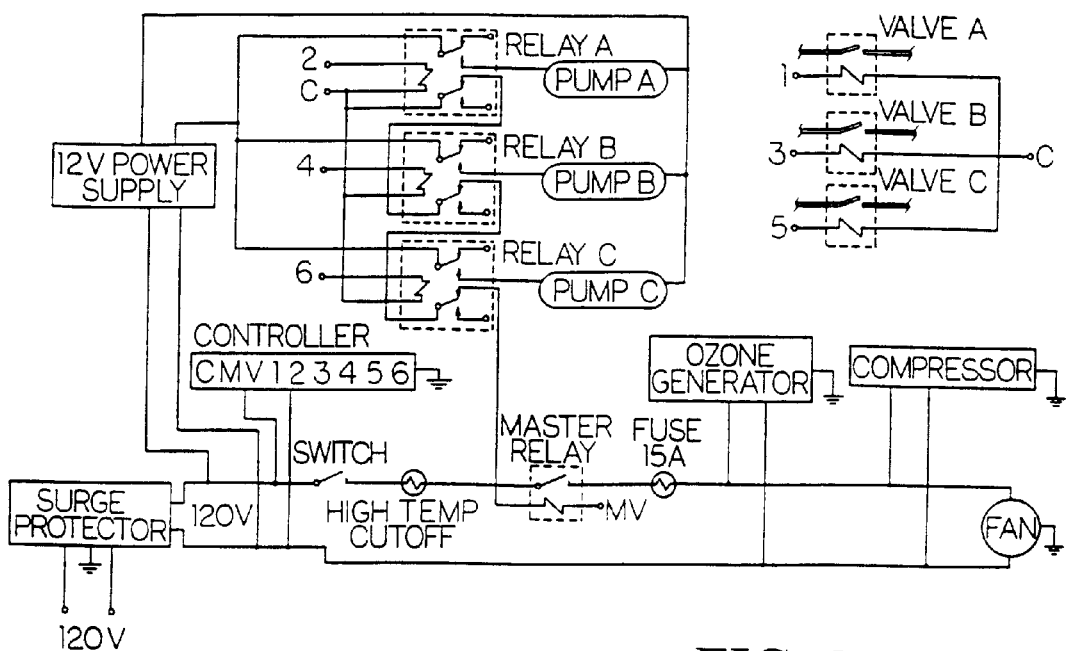
FIG. 3 is an electrical schematic for a 3 well system of the present invention of FIG. 1.
Figure 4:
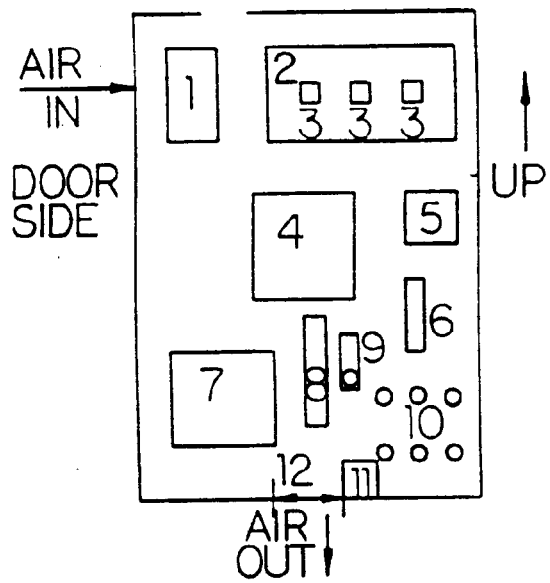
FIG. 4 shows an internal layout of the Control Module box for a three well system of the present invention of FIG. 1.
Figure 5A:
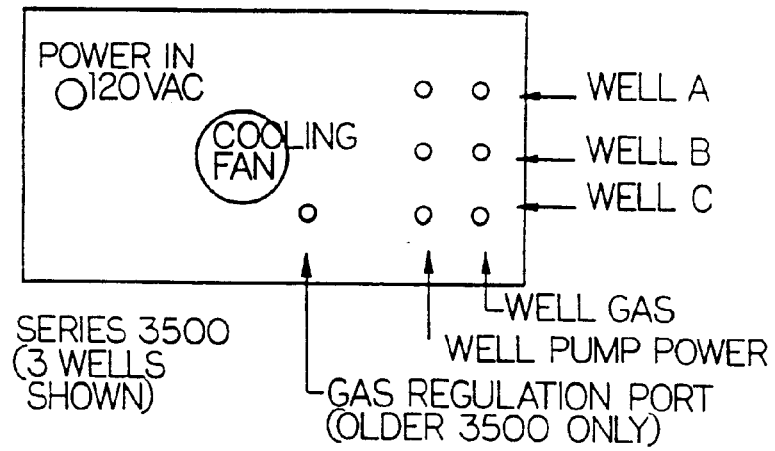
FIG. 5A shows the geometry of the bottom panel on the Control Module identifying the external connections and ports for three well units of the invention of FIG. 1.
Figure 5B:
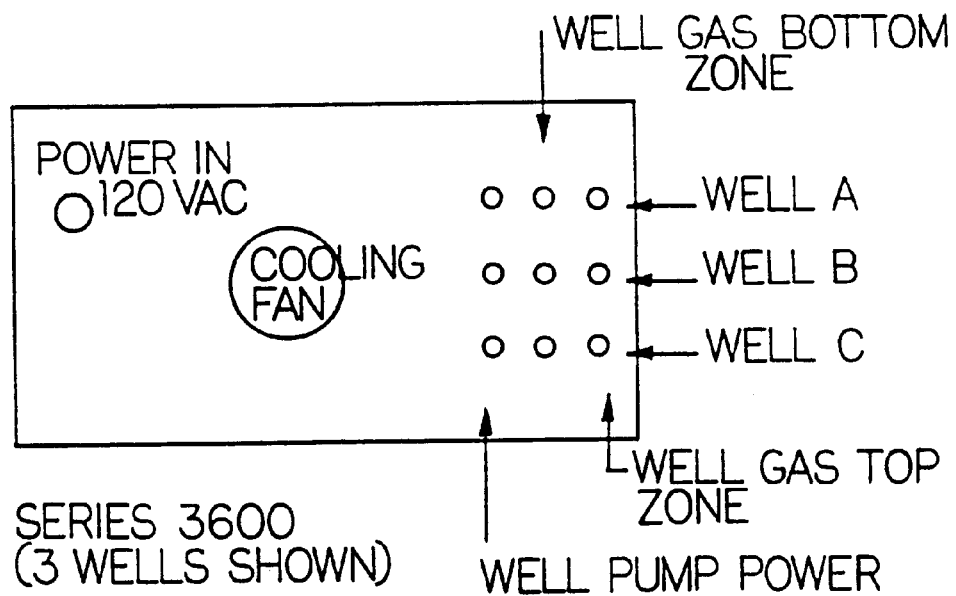
FIG. 5B is the left side view of FIG. 5A.
Figure 6:
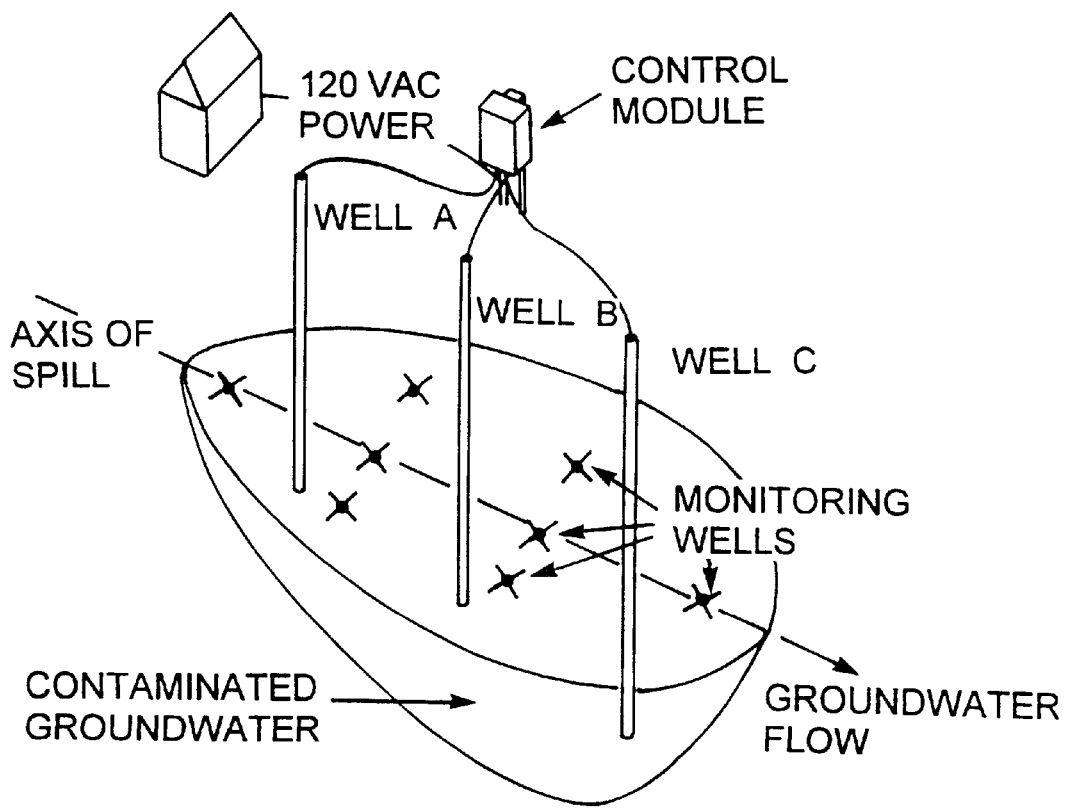
FIG. 6 is a schematic illustration of a soil formation showing the method for the present invention.

Referring to the FIGS. 1–29 there is shown a microfine sparge system employing oxidizing gas encapsulated in microbubbles generated from microporous diffusors matched to soil porosity in a wave form employing a co-reactant in the form of substrate material for use with injection wells known as the C-Sparger™ system. Said system consists of the following components: a vertical injection well, a master control unit, and at least one in-well bubble generator. Each master control unit can operate up to a total of three injection wells, simultaneously permitting treatment of an area up to 50 feet wide and 100 feet long. Actual performance characteristics of the system depend upon site conditions which are determined in advance by an evaluation test. Inasmuch as treatment takes place in-situ, vapor capture is not normally necessary. The master unit consists of the combination of a gas generator, a compressor, a pump control unit, a timer, gas feed lines, and a power source for providing electrical power to the apparatus. The In-Well Bubble Generating unit consists of a fixed packer consisting of a microfine bubble diffuser, commonly called Spargepoint®, a water pump, air/ozone line, check valve, and connecting fittings. The master control unit is typically mounted on a secure foundation such as 4×4 post or building wall 40 adjacent the injection well. A heavy-duty power cable, not over 50 feet in length, may be used to run from the power source to the master control unit.

I. EVALUATION TEST

The first step in preparing a site for treatment is to conduct an evaluation test to determine whether or not an aquifer has characteristics which make it suitable for treatment by the microbubble sparging system of the present invention. The test employs one or more microporous bubble generators known as Spargepoints™ which produce extremely fine bubbles and are sized to penetrate fine sands by matching the bubble size to the soil porosity. The bubble generator (Spargepoint®) may be injected with a hydraulic or pneumatic hammer into the aquifer or inserted through a hollow stem auger usually up to 10 feet below static water level. (See FIG. 11 for flow chart of sparge test.) Prior to conducting an evaluation test, reconnaissance steps normally performed at a site include 1) soil coring to establish the extent of volatile organic carbon (vocn) contamination and 2) soil types with depth and hydrocarbon content. Monitoring wells are usually installed for later observation points, typically having well screens which extend five to seven feet below static water with one to three feet above depending upon historic record of water level changes for the area. If floating nonaqueous liquid petroleum is observed (greater than sheen thickness), efforts to remove the product should be undertaken prior to evaluation testing. Oil corings are commonly scanned with a PID detector to establish the three-dimensional extent of petroleum contamination. Subsamples can be forwarded to a laboratory to determine precise chemical composition.

The next step is to prepare a site map, noting the distances between the test point and adjacent wells. Immediately prior to conducting the test, check water elevation in monitoring wells and/or point piezometers. The following is a list of the materials and a stepwise procedure (see FIG. 11) for conducting a sparge test with the micro-bubbler generator: ¾-inch OD×18 inch. (for 0.5 inch ID schedule 90 PVC); Wellhead surface assembly, (¼ inch connections, 0–2.5 cfm); Gas tank regulator, (acetylene torch type, zero air or nitrogen, 0–100 psi adjustable, 0–3 cfm flow capacity, male ¼ inch NPT connector); Zero air tank (medium, 500 cf, 15600 to 2000 psi) 90 lbs.; ¼ inch compression fittings, ¼ inch copper tube. (See FIG. 12 for assembly of parts.)

Suggested well locations are at 5, 10, 15, and 20 feet from point of bubble injection. The screen should be five (5) feet, with two (2) feet placed into the unsaturated (vadose) zone and 3 feet below static water level. NOTE: Initially water may move out of wellpoint causing a period of time (1–2 minutes) before bubbling begins. A step-wise PROCEDURE is as follows:

A. Connect ¼ inch NPT of flowmeter assembly to regulator output;
B. Test before connection to wellhead to check flow to ⅔ cfm, with tubing wide open: (1) Leave ¾-inch NPT wellhead connector off; (2) Shut valve (b) on regulator, open valve on flowmeter; (3) Adjust pressure to 20 psi; (4) Slowly open valve (b); (5) Briefly check flow up to 2–3 cfm. Shut down by turning valve (b) off:
C. Connect ¼ inch compression fitting to wellhead stickup 0.5 inch PVC pressure cape (either glue or screw top to casing, leaving enough for later completion);
D. Bring pressure down to 10 psi; (1) Slowly open valve (b); (2) Check flow (yield) on flowmeter, in cfph (cubic ft. per hour). Divide by 60 to get cfm. (3) If yield is less than 0.3 cfm, increase pressure valve to 15 psi; maintain for 5 minutes opening valve b to maximum flow. (4) Maintain for 30 minutes if flow is near 0.5 cfm. (5) Check observation wells with electronic dip meter to record water levels at 15 minute intervals. Check surface with flashlight for bubbles reaching surface. Verify with transparent bailers. It normally takes 30 to 40 minutes for bubbles to appear. (6) After one hour, increase pressure by another 5 psi, again opening valve (b) to maximum. (a). Record maximum yield from flowmeter. (b) Repeat procedure 1–6. (7) Record pressure and maximum flow, and confirm distance of bubbling out from the injection location. (8) Continue with stepwise procedure recording pressure and yield; plot on graph paper. Record water elevations in wells and time of onset of bubbling. A test is usually conducted for a period of three hours, using about 150 to 200 cubic feet of gas. (9) After onset of bubbling, insert a bubble trap into the well. This allows quantification of the volume of gas being evolved into the unsaturated zone. A sample of the gas can be analyzed later to determine volatile mass transfer. As a substitute, count the number of bubbles present in a volume of water obtained with a bailer or peristaltic pump. (10) If you are dealing with silt or clay you may want to modify the procedure to increase pressure at 10 psi intervals up to 50 psi. Check for fracturing by sudden change in slope upwards (increase in permeability). If bentonite or grout seal fails, flow also increases suddenly with a noticeable drop in water elevation in monitoring wells. Normally test is completed when 25 or 30 psi is reached or non-linear conditions are encountered. (11) In clay soils there may be substantial back pressure following cessation of test. Be careful unhooking lines. Wait until pressure reads below 20 psi before disengaging line or use a t-valve in line for venting.

II. INTERPRETATION OF RESULTS

Upon completion of a qualifying sparge test, there should be sufficient data to plot curves for the relationship between pressure and gas yield, zone of influence and bubble region. These plots will determine whether the area is amenable for use of the sparging system of the present invention.

The injection of air into an aquifer closely approaches Darcian flow, as long as fracturing pressures are not exceeded. With microporous materials, the initial bubble can be sized below or matching the interparticle pore space, allowing gas conductivity to more approximate fluid conditions (Kerfoot, 1993). The injection of air then approximates the more familiar injection of water, exhibiting mounding and outward movement until equilibrium is reached.

The creation of bubbling occurs when the gas pressure overcomes the hydraulic head (depth of water from static elevations to bottom of bubbler), the line friction, the membrane resistance of the bubbler wall, and the back pressure of the formation. The hydraulic head is converted to psi equivalents by multiplying depth of water by 0.43. The resistance of a half (½) inch tube is negligible under ten feet. The membrane resistance of a three quarter (¾) inch bubble generator is roughly two psi. For a ten (10) foot installation, the critical bubbling pressure would be the following:

| Hydraulic Head: | 10 ft. × .43 = | 4.3 |
| --- | --- | --- |
| Line Friction: | Negligible = | .0 |
| Bubbler Wall Resistance: | = | 2.0 |
| Critical Bubbling Pressure | | 6.3 psi |

The most crucial pressure to overcome is the formation back pressure which varies with the surface to volume relationship of the pore spaces and the extent of their occlusion by fines. For a rough approximation, previous field tests have shown the following ranges:

| Gravel | .2 to 2 psi |
| --- | --- |
| Coarse sand | .3 to 4 psi |
| Medium sand | .5 to 6 psi |
| Fine sand | 1.0 to 10 psi |
| Silty sands | 3.0 to 30 psi |

III. INTERSTITIAL GAS: VELOCITY AND SOIL CONDUCTIVITY—DARCY'S LAW (1) Gas is a fluid that, unlike water, is compressible. Vapor flow rates through porous material, such as soil, are affected by the material's porosity and permeability, as well as the viscosity, density, and pressure gradient of the gas. The movement of gas through soil can be approximated by Darcy's law. A simple formulation of Darcy's law for saturated gas flow in one dimension is:

$$V = \frac{V}{n} = \frac{q}{An} = \frac{k(dP/dm)}{un}$$

where:

| V | = | seepage velocity (cm/sec) |
| --- | --- | --- |
| V | = | gas yield (cm$^3$)/ (cm$^2$)(sec)) |
| q | = | flow rate (cm$^3$/sec) |
| k | = | gas permeability (cm$^2$) (Darcies) |
| A | = | cross-sectional area (cm$^2$) |
| u | = | viscosity (g/(cm)(sec)) |
| dP/dm | = | pressure gradient (g/cm)(sec$^2$)/cm |
| n | = | specific porosity (i.e., void nonwetted volume) |

(2) The simplified Darcy equation can be used in conjunction with simple vadose-zone well tests to directly relate soil permeability to gas viscosity, flow rate, and pressure gradient. By using direct gas velocity and rearranging the Darcy equation to solve for gas permeability (k), the following equation is derived and compared with its groundwater equivalent (Masserman, 1989):

$$\text{Gas flow: } k = \frac{Vn}{dP/dm}$$

$$\text{Groundwater equivalent: } k = \frac{Vn}{dh/dl}$$

(3) The slope (dh/dl) change in water head with change in distance (dl) is replaced by the pressure gradient (dp/dm) in the soil gas equivalent. The solution for k can be found for a known gradient and porosity. Effective porosity (n) remains unchanged, except that moisture content must be considered with gas movement. The viscosity of air (u) is estimated from Table 1.

TABLE 1

VISCOSITY OF AIR

| Temperature (° C.) | Viscosity (g/(cm)(sec))* |
| --- | --- |
| 0 | 0.00017 |
| 9 | 0.000176 |
| 18 | 0.000182 |
| 29 | 0.000186 |
| 40 | 0.00019 |

*The Units are called Poises.
Source: CRC 1972

(4) Petroleum engineers have defined the Darcy as a unit of permeability. Technically, one Darcy is defined as the permeability that will lead to a specific discharge (v) of 1 cm/sec for a fluid with a viscosity of 1 centipoise under a pressure gradient that makes the term pg/u (dp/dl) equal to 1 atmosphere, where p is density, u viscosity, and g is the force of gravity. To convert Darcies to cm$^2$, multiply by 9.88×10$^{-9}$. To convert Darcies to gas conductivity in cm/sec, multiply by 9.11×10$^7$. To convert Darcies to cm/sec, divide by 10$^3$.

The differential equations that govern pressure flow of gas and vapor in soil are non-linear since gas density depends upon gas pressure. Masserman 1989 has pointed out, however, that if the maximum pressure difference between any two points in the flow field is less than approximately 0.5 atmospheres, the differential equations developed to model groundwater flow provide good approximations of gas flow. Analytical models used to evaluate groundwater flow can then be designed to estimate gas flow in sandy soils.

(5) Following Darcy's Law, the rate of gas discharge from the bubble generator increases proportionately to the pressure (head) applied above critical bubbling pressure. The outflow through the aquifer can be predicted by an analogy to the Darcy equation:

$$Q_o = K_g A \frac{(hm-hx)}{x}$$

Where:

$Q_o$ = gas flow (cfm)

$K_g$ = bubble conductivity $A$ = cross-sectional flow area (ft$^2$)

$(hm-hx)$ = pressure head (ft)

$x$ = distance from source (ft)

Since the area of a ¾ inch bubble generator (Spargepoint®) is fixed at 0.29 square feet, the gas yield is directly proportional to pressure. (A plot of pressure versus gas flow should be a straight line.) If, however, sufficient excessive pressure is applied to fracture the formation, thereby increasing its conductivity, the line will bend in the direction of more flow with less pressure. This creates an undesirable condition where a greater air volume can bypass soil without permeating through it. As a result, extraction efficiency drops rapidly as large channels are formed. Secondly, within confined aquifers or semi-confined aquifers, the cross-sectional area through which the air bubbles (fluid) is being injected may be limited having a ceiling or floor, and thereby limit the volume which can be injected. See FIG. 13 for depiction of the pressure/flow relationship in different formations.

(6) Referring to the drawings there is shown use of unique microporous diffusers in place of standard slotted well screen to improve bubble dispersion through soil and improve rate of gaseous exchange. A normal 10-slot PVC well screen contains roughly twelve percent (12%) open area. Under pressure most air exits the top slits and radiates outwards in a starlike fracture pattern, evidencing fracturing of the formation.

The effectiveness of treatment is dependent upon uniformity of dispersion of the gas as it travels through the formation. A porous structure with appropriate packing matches the condition of the pores of the soil with thirty percent (30%) pore distribution. The dispersion of bubbles as a fluid can be checked with Darcy's equation. The use of microporous materials to inject gases into groundwater saturated formations has special advantages for the following reasons: (1) Matching permeability and channel size: (2) Matching porosity; (3) Enhancing fluidity, which can be determined in-situ.

The most effective range of pore space for the diffusor depends upon the nature of the unconsolidated formation to be injected into, but the following serves as a general guide: (1) Porosity of porous material: thirty percent (30%); (2) Pore Space: 5–200 microns: (a) 5–20 very fine silty sand; (b) 20–50 medium sand; (c) 50–200 coarse sand and gravel.

The surrounding sand pack placed between the bubble generator and natural material to fill the zone of drilling excavation should also be compatible in channel size to reduce coalescing of the produced bubbles.

The permeability range for fluid injection function without fracturing would follow: (1) $10^{-2}$ to $10^{-6}$ cm/sec, corresponding to 2 to 2000 Darcies; or (2) $20^{-2}$ to $10^{-6}$ cm/sec: or (3) 100 to 0.01 ft/day hydraulic conductivity.

(7) Permeability is the measure of the ease of movement of a gas through the soil. The ability of a porous soil to pass any fluid, including gas, depends upon its internal resistance to flow, dictated largely by the forces of attraction, adhesion, cohesion, and viscosity. Because the ratio of surface area to porosity increases as particle size decreases, permeability is often related to particle size, see FIG. 9.

Figure 8:
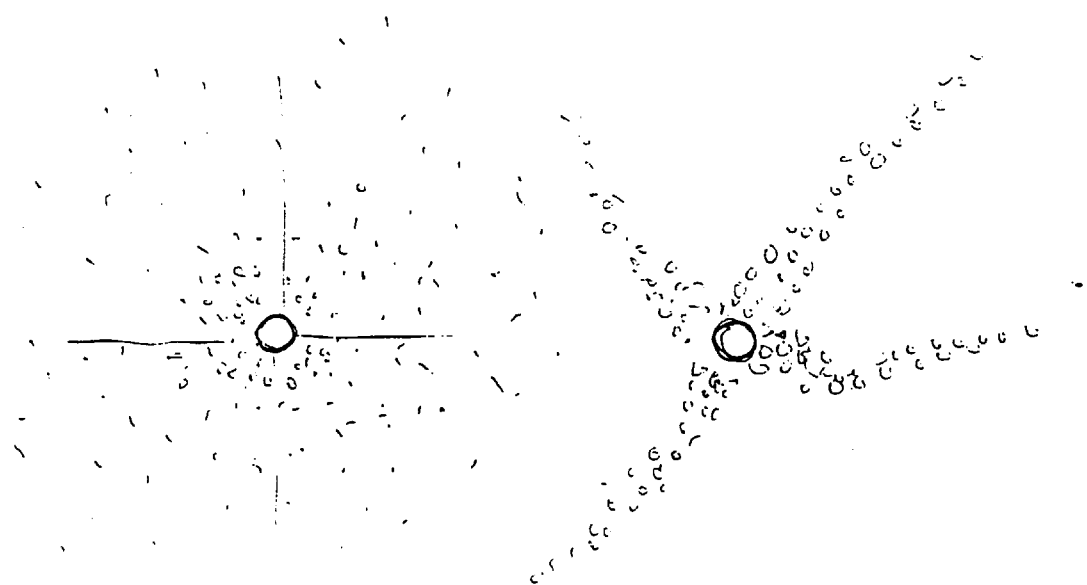
FIG. 8 is an illustration of radiation of bubbles from standard 0.010 (10 Slot) well screen compared to microporous diffusor.

An estimate of the permeability of a soil can be obtained by comparing its grain size in millimeters with glass beads of a similar size, see FIG. 9. This method is generally limited to uniformly graded sands, i.e., sands with a uniformity coefficient of less than 5.0. Permeability (k) is a function only of the soil medium and is expressed as an area ($cm^2$). Reference is made to FIG. 8 and FIG. 9.

IV. EQUIPMENT

1. Unique Microporous Diffusors—types a. Direct substitute for well screen, 30% porosity 5–50 micron channel size resistance to flow only 1 to 3 psi, can take high volume flow, need selective annular pack (sized to formation). High density polyethylene or polypropylene is light weight, inexpensive.

b. Diffusor on end of narrow diameter pipe riser VVA 14-291. This reduces the residence time in the riser volume.

c. Shielded microporous diffusor which is injected with a hand-held or hydraulic vibratory hammer. The microporous material is molded around an internal metal (copper) perforated tubing and attached to an anchor which pulls the bubble generator out when the protective insertion shaft is retracted. Unit is connected to surface with ³⁄₁₆ or ¼ inch polypropylene tubing with a compression fitting.

d. Thin bubble generators with molded tubing can be inserted down narrow shaft for use with push or vibratory tools with detachable points. The shaft is pushed to the depth desired, then the bubble generator inserted, the shaft is pulled upwards, pulling off the detachable drive point and exposing the bubble generator.

V. BUBBLING RADIUS AND BUBBLE CONDUCTIVITY OF AN AQUIFER

The back pressure from the aquifer and radius of bubbling represent some of the major unknowns in the sparging system field design. The following test was designed and field tested to evaluate the capacity of the aquifer for sparging and to provide critical design information. A microporous bubbler of known characteristics is placed by injection or hollow stem auger a fixed distance below static water. A gas tank (zero air or nitrogen) with unlimited pressure and outfitted with a flowmeter provides the source of gas. The pressure is increased in a stepwise manner while observing flow. The yield versus pressure is then recorded. The shape of the curve indicates the pressure range of normal formation acceptance of flow under Darcian conditions and non-Darcian fracturing pressures.

Observation points away from the source use water table levels in both well screens and point piezometers. The rise in water level is recorded and the presence of bubbles noted. There is always a lag in time between bubble injection at depth and arrival at the surface. The yield curves and bubble zones are compared against theoretical and other curves observed for known formations.

VI. MOUNDING

The phenomenon of groundwater mounding occurs when a fluid is introduced into soil in unconfined sandy aquifers. Small bubbles displace an equivalent volume of water creating a movement of water horizontally and vertically. Hantush (1976) and Fielding (1981) have developed equations to depict two-dimensional behavior of groundwater in a constant-recharging system. Assuming a radial flow of bubbles in an aquifer of thickness (d), the head distribution can be represented as:

$$(hm\text{-}hx) = \frac{Q_2}{1K_g(d+hx)}$$

Where:

$K_g$ = bubble conductivity of aquifer $(hm\text{-}hx)$ = pressure head (ft)

$m$ = maximum water rise $D$ = depth of aquifier

-continued $\pi$ = pi, a constant (3.14...)

$Q_o$ = gas outflow (cfd)

x = distance from source (ft)

In a theoretical depiction, the introduced the introduced bubbles exit the sparge bubble generator and migrate vertically resulting in a symmetrical spheroid shape. In reality, circular regions rarely are found. More commonly, an elliptical region is found, reflecting higher hydraulic conductivity in one axis than another, inherent with the depositional history of the formation. (See FIG. 19 for a depiction of groundwater mounding caused by sparging.)

VII. BUBBLE RADIUS AND DISTRIBUTION

As with mounding, it is often convenient to think of bubble movement as being symmetrical and circular. In reality, it is rarely so uniform. However, there are some general finds which can serve as guidelines in interpreting results of the bubble tests. First of all, bubbles in a more uniform sandy deposit move upwards at about a 45° angle when released at critical bubbling pressure. Doubling the depth doubles the radius. Unfortunately, stratified deposits may also be encountered which may divert bubble vertical movement.

For every doubling of pressure above critical bubbling pressure, the radius of influence will expand 1.42 times its original radius. This approximation is based upon maintaining a fixed thickness of aquifer while doubling the volume of the cylinder. An approximation of the relationship between depth, radius and pressure for a medium to fine sand is presented in FIG. 20.

The relationship observed between depth of the bubbler and radius of the bubble zone with air pressure set to only 10 psi above critical bubbling pressure with a three quarter (¾) inch diameter bubble generator. The diameter observed for bubbling was noticeably less than the measured zone of influence of the displaced water. At ten feet below static water, a 10-foot pressure radius was observed at the top of the water when operated at critical bubbling. The radius of the observed bubble zone fit closely the relationship predicted by Repa and Kufs, 1985. At a fixed pressure set at 10 psi above critical bubbling, the radius expands linearly, (directly proportional), to increasing depth.

VIII. PRESSURE INFLUENCE

A second test was conducted on an 18-inch bubble generator (Spargepoint®) located five (5) feet below static water. Pressure was increased in increments (5.0 psi) well above critical bubbling pressure (see FIG. 13). Although the bubbling zone radius was five (5) feet at critical bubbling pressure, it expanded with increased pressure to approximately the square root of the pressure increase:

$$r = \frac{\text{Pressure}}{\text{Critical Pressure}} \char`\^ 0.5\, dc$$

where:

r = radius of bubbling zone

-continued dc = depth of installation

IX. PRESSURE VERSUS FLOW

Figure 13:
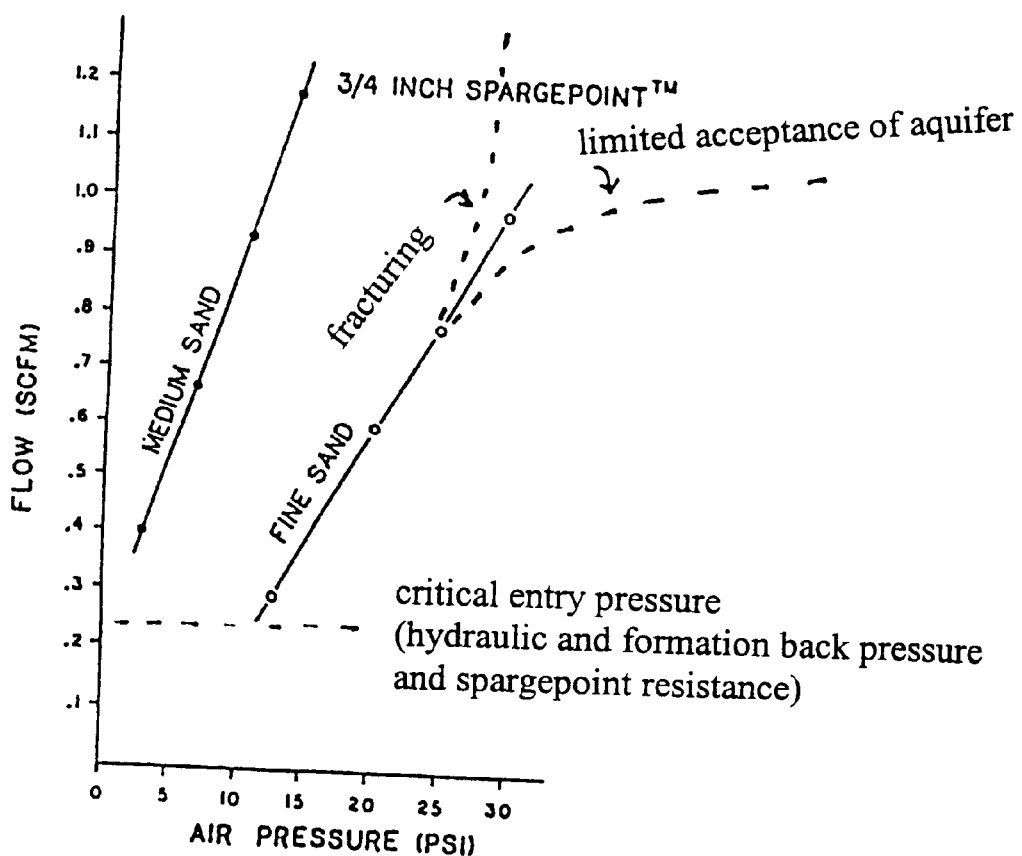
FIG. 13 is a graph illustrating pressure/flow relationship observed in different formations.
Figure 14:
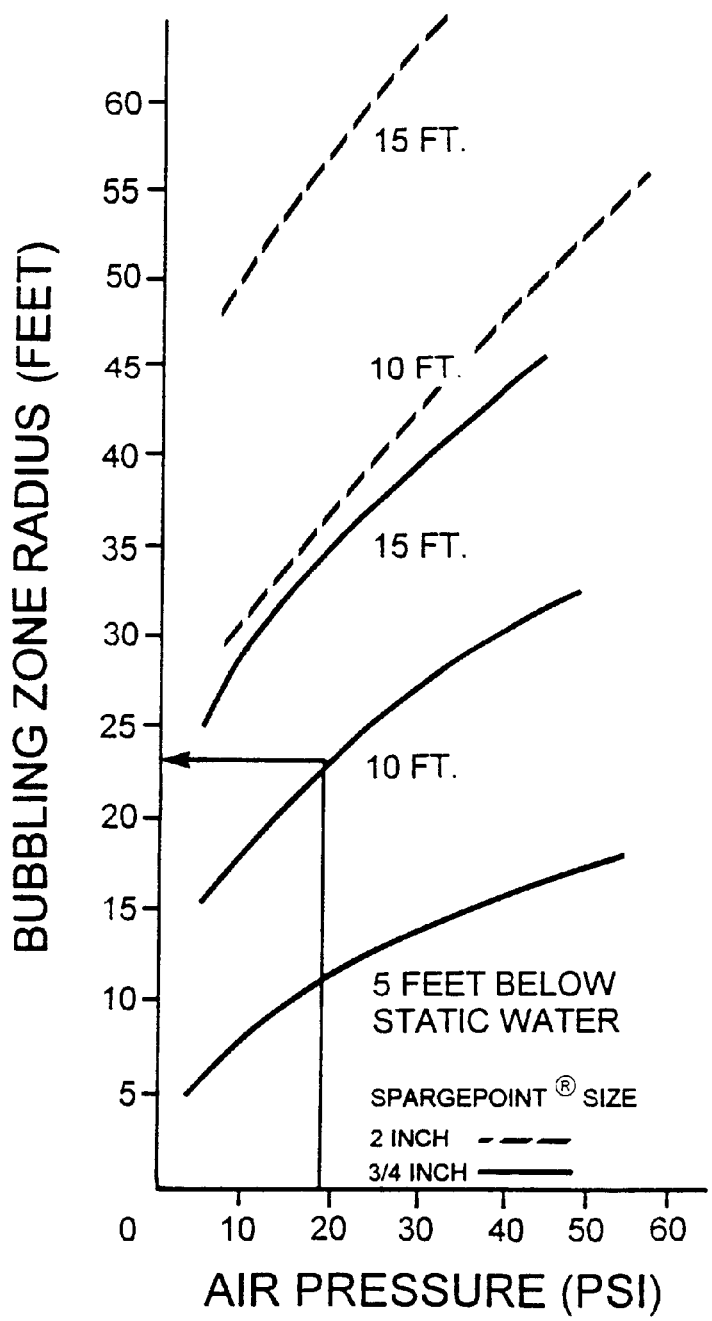
FIG. 14 is a graph illustrating influence of depth and pressure on radius of bubble zone.

As pressure increases, the gas flow to the bubble generator (Spargepoint®) also increases (see FIG. 13). For comparison, the gas yield (flow) was measured with the bubbler in air, the main resistance being through the porous sidewalls of the cylinder. The bubble generator was also place in medium sand with less than one foot of waterhead. The same pressure was applied.

If the critical bubbling pressure is subtracted, the sand and water curve will show the expected flow in medium sand. For example, at a 10-foot depth (critical bubbling=7.8 psi) and 15 psi pressure, about 1.2 cfm would be expected.

If a fine porous diffusor (10 micron) is used with a highly permeable deposit (medium sand, 100 ft/day hydraulic conductivity), the resistance to flow may be so low that a shallow curve of pressure versus flow occurs. If so, assume that the radius of bubbling will increase by the square root of 2 (i.e., 1.4) times each time the flow volume is doubled.

X. DEGREE OF OVERLAP OF BUBBLE ZONES

It is important to achieve overlap of the zones of aeration. To achieve thirty percent (30%) overlap, the distance between aeration zones should be set at ¾ $d^b$ ($d^b$ =the diameter of bubble zone).

Critical bubbling pressure (pressure to initiate bubbling) is defined as: Pc (psi)=[0.43 ×depth below water (ft)]+3.5 (psi).

The diameter of the bubbling zone produced by the bubble generator when supplied with the critical bubbling pressure is equal to the installation depth of the bubble generator below the static groundwater surface: Dc (ft)= Installation Depth below Water (ft).

The increase in the radius of the bubbling zone produced by the bubble generator when supplied with greater than the critical bubbling pressure is defined as:
R=[(Pressure/Pc)^0.5]×Dc;
Input bubble generator (Spargepoint®) depth below static groundwater level. 10.0 (ft);
Critical bubbling pressure is calculated as . . . 6.0 (psi);
Critical bubbling radius is calculated as . . . 20.0 (ft);
Input proposed delivery pressure to spargepoints . . . 12 (psi);
Bubbling zone radius based on input pressure 12.0 and volume (20 scfm) . . . 30 (ft);
Recommended horizontal spacing between bubble generators . . . 22.0 (ft);
Estimated air flow through Spargepointg based on input pressure . . . 20 (cfm);
Correction for vertical/horizontal (V/H) permeability if ratio of V/H is:
  1:1 multiply R by 1
  1:10 multiply R by 1.5
  1:100 multiply R by 2.0.

XI. GAS/GAS/WATER REACTIONS DURING MICROSPARGING DETAIL ON PROCESS AND DELIVERY SYSTEM

MICROSPARGING: The unique use of Microfine Bubble injection for simultaneous extraction/decomposition reactions in saturated and partially-saturated capillary zones (soil and geological formations).

As opposed to simply creating smaller and smaller sized bubbles for the purpose of injecting into free water, the microsparge process involves generation of fine bubbles which can enter and pass through the torturous pathways of the substrate (aquifer structure) and promote rapid gas/gas/water reactions with volatile organic compounds which the substrate participates in, instead of solely enhancing dissolved (aqueous) disassociations and reactions. The microsparging process encompasses the following unique aspects:

(1) The production of microbubbles and selection of appropriate size distribution for optimizing gaseous exchange in sandy aquifers (i.e., passage through interconnected fine capillary-sized passageways), using microporous materials, bubble chamber, and pulsed gas/water injection.

(2) Physical methodology and equipment for promoting the continuous movement of microbubbles through porous aquifers without coalescing or adhesion (i.e., small bubbles will not move through fine channels without assistance, otherwise they accumulate, coalesce, or immobilize). The injected air/water combination moves as a fluid through the aquifer without fracturing or channeling, which interfere with even distribution and efficiency of exchange. The injected gas/water combination is pulsed in such a way to move the bubbles on a pressure wave for lateral distribution. The wave form has an amplitude which falls above critical bubbling pressure but below fracturing pressure for formation. The pulsing is done to create short-term tidal waves in three dimensions. The combination of recirculating the water also assists in creating and promoting vertical airlift which induces the generation of a three-dimensional eddy current adjacent to the spargewell, greatly assisting in evening the reaction rate throughout a broad aquifer region.

(3) The use of microencapsulated ozone to enhance and promote in-situ stripping of volatile organics and simultaneously terminate the normal reversible Henry's reaction.

(4) The demonstration and enhancement of unique gas/gas/water reactions for the rapid decomposition of HVOCs and petroleum products (BTEX-related compounds). In her doctoral thesis, Masten (1986) identified a particular chemical pathway by which ozone can react with chlorinated olefinic VOCs (PCE, TCE, DCE) to decompose the molecule by direct rather than indirect means (i.e., hydroxide or super oxide formation). Heretofore, the reaction had not been demonstrated to be significant in aqueous remediation processes, since the reaction progresses very slowly with PCE. For instance, if a HVOC/ozone gaseous mixture or microbubble injection occurs into free water alone, forming superhydroxides as the primary reactive agents (Masten and Hoigne (1992). The process described here is called C-Sparging and involves promoting simultaneous VOC in-situ stripping and gaseous decomposition, with moisture (water) and substrate as co-reactants in the later stages. This is not a dissolved aqueous reaction. The following text elaborates on this by demonstrating that the reaction kinetics are entirely different from existing aqueous literature values. Bench scale and field testing demonstrate the facilitating role of the mineral substrate as part of the reaction process.

(5) Remote Process Controller and Monitor: This allows for the capacity for sensor feedback and remote communication to the Timer/Sequencer ozone (or oxygen or both) generator to achieve a certain level of gaseous content (e.g., dissolved oxygen, ozone, or other gas) and rate of mixing to promote efficient reactions. This is done by sensors placed in monitoring wells at certain distances from the central spargewell. A groundwater flow meter and pressure sensor monitors rate and direction of rotation of a three-dimensional gyre (or eddy) produced by pulsing the unit. The unique combination of pressure and flow allows a quick determination of where and how fast mixing will occur. Oxygen content, redox potential, and dissolved VOC concentration of the water can be monitored at a nearby monitoring well or top well screen of the spargewell. The operator can access the information, modify operations and diagnose the condition of the unit by telephone modem or satellite cell phone. This provides on-site process evaluation and adjustment without operator presence.

Appropriately-sized micro-fine bubbles, generated in a pulsing manner, which easily penetrate sandy formations, and/or bubble generation and selection chambers which allow alternating water/bubble/water/bubble fluid flow, have unexpected benefits when used with multiple gas systems.

Firstly, microfine bubbles substantially accelerate the transfer rate of volatile organic compounds like PCE from aqueous to gaseous state. The bubble rise has the potential to transfer the PCE to the watertable surface and above (vadose zone). The ten-fold difference in surface-to-volume ratio of bubble generator (Spargepoint®) microbubbles compared to bubbles from well screens results in at least four-fold improvement in transfer rates.

Further reducing the size of the bubbles to microfine sizes, from $1/10$ to $1/2$ mean pore size, appears to boost extraction rates between 4 and 20 fold. These sizes boost exchange rates but do not tend to be retarded in rise time by too small a size.

Secondly, when an oxidizing gas (ozone) is added into the microbubbles, the rate of extraction is enhanced further by maintaining a low interior (intrabubble) concentration of PCE, while simultaneously degrading the PCE by a gas/gas/water reaction. The combination of both processes acting simultaneously provides a unique rapid removal system which is identified in the field by a logarithmic rate of removal of PCE, and a characteristic ratio of efficiency quite different from dissolved (aqueous) ozone reactions. The compounds commonly treated are HVOCs (halogenated volatile organic compounds), PCE, TCE, DCE, vinyl chloride (VC), petroleum compounds (BTEX: benzene, toluene, ethylbenzene, xylenes). The rapid removal in saturated soils or unsaturated but wet soils can be so complete as to not require any vacuum extraction to recover the remaining solvents.

XII. GASEOUS EXCHANGE AND PARTITIONING ENHANCEMENT

If gaseous exchange is proportional to available surface area, with partial pressures and mixtures of volatile gases being held constant, a halving of the radius of bubbles would quadruple (i.e., 4×) the exchange rate. If, in the best case, a standard well screen creates air bubbles 200 times the size of a medium sand porosity, a microporous diffusor of 5 to 20 micron size creates a bubble $1/10$ the diameter and six to ten times the volume/surface ratio.

TABLE 2

| Diameter (microns) | Surface Area $4\pi r^2$ | Volume $4/3\pi r^3$ | Surface Area/Volume |
|---|---|---|---|
| 200 | 124600 | 4186666 | 0.03 |
| 20 | 1256 | 4186 | 0.3 |

Theoretically, the microporous bubbles exhibit an exchange rate of ten times the rate of a comparable bubble from a standard ten slot well screen.

The relationship between exchange efficiency and bubble configuration can be further explained by the surface to volume change between spheres (unconfined microbubbles) and cylinders (confined bubbles within capillary tubes). The injection of air into geological formations without concern for volume/pore size relationships will result in elongate cylinders of gas ("microchannels") as observed by the University of Connecticut (1995). The effect of changing from spherical or small cylinder (radius 2×length) to elongate cylinder dramatically affects the ratio of exchange surface area to volume.

To illustrate, the loss of efficiency from spherical to elongate cylinder can be shown by contrasting the ratios of transforming from one quarter (¼) pore size (given as 1.0) to ten (10) times pore size for a constrained gas bubble. As a micron-sized unconstrained bubble enters the channel, it retains a spherical shape and an A/V ratio of 24. As the volume expands to pore size, the ratio decreases to an A/V ratio of six (6). As the bubble volume becomes larger, it is forced to elongate into a cylinder. When the cylinder elongates, the A/V ratio shrinks further and begins to converge between 2.0 and 4.0. The surface to volume ratio has reduced to about one-twelfth (spheroid) or one-sixth (cylinder) of that found with spherical (or mini-cylinders) of one quarter (¼) pore size.

where:

$r_m$ = rate of mass transfer $K_g$ = coefficient of diffusion for gas $A$ = area through which gas is diffusing $C_s$ = saturation concentration of gas in solution $C$ = concentration of gas in solution.

The restatement of the equation to consider the inward transfer of phase change from dissolved HVOC to gaseous HVOC in the inside of the bubble would be:

$C_s$ = Saturation concentration of gas phase of HVOC or VOC in bubble $C$ = Initial concentration of gas phase of HVOC or VOC in bubble volume.

XIII. PARTITIONING ENHANCEMENT

Soil vapor concentrations are related to two governing systems: water phase and (non-aqueous) product phase.

TABLE 3

SURFACE TO VOLUME (A/V) RATIO CHANGES AS FUNCTION OF PORE SIZE AS BUBBLE VOLUME INCREASES

| D (i.e., 2r) or h as Fraction of Pore Size | 0.1 | 0.25 | 0.5 | 1 | 2 | 5 | 10 | 20 |
|---|---|---|---|---|---|---|---|---|
| SPHERE | | | | SPHEROID | | | | |
| Area = $4\pi r^2$ | 0.0314 | 0.19625 | 0.785 | 3.14 | 18.8 | 37.7 | 69 | 131 |
| Volume = $4/3\pi r^3$ | 0.0005 | 0.00817 | 0.065 | 0.53 | 6.3 | 15.7 | 31 | 62 |
| Ratio | 62 | 24 | 12 | 5.9 | 3 | 2.4 | 2.2 | 2.1 |
| CYLINDER (diameter is constant at 1.0, for h greater than 1) | | | | | | | | |
| Area $2\pi r(r + h)$ | 0.0471 | 0.2944 | 1.17 | 4.71 | 7.9 | 17.2 | 33 | 64 |
| Volume $\pi r^2 h$ | 0.0008 | 0.0123 | 0.098 | 0.78 | 1.6 | 3.9 | 7.9 | 16 |
| Ratio | 59 | 24 | 12 | 6 | 4.9 | 4.4 | 4.2 | 4 |

In wastewater treatment, the two-film theory of gas transfer (Metcalf and Eddy, Inc., 1991) states the rate of transfer between gas and liquid phases is generally proportional to the surface area of contact and the difference between the existing concentration and the equilibrium concentration of the gas in solution. Simply stated, if we increase the surface to volume ratio of contact, we increase the rate of exchange. If, secondly, we consume the gas (VOC) entering the bubble (or micropore space bounded by a liquid film), the difference is maintained at a higher entry rate than if the VOC is allowed to reach saturation equilibrium. In the case of a halogenated volatile organic carbon compound (HVOC), PCE, gas/gas reaction of PCE to by-products of HCl, $CO_2$ and $H_2O$ accomplishes this. In the case of petroleum products like BTEX (benzene, toluene, ethylbenzene, and xylenes), the benzene entering the bubbles reacts to decompose to $CO_2$ and $H_2O$. The normal equation for the two-film theory of gas transfer is stated (Metcalf and Eddy, 1991)

$$r_m = K_g A(C_s - C)$$

Henry's. and Raoult's Laws (DiGiulio, 1990) are commonly used to understand equilibrium-vapor concentrations governing volatization from liquids. When soils are moist, the relative volatility is dependent upon Henry's Law. Under normal conditions (free from product) where volatile organic carbons (VOCs) are relatively low, an equilibrium of soil, water, and air is assumed to exist. The compound tetrachloroethene (PCE), has a high exchange capacity from dissolved form to gaseous form. If the surface/volume ratio is modified at least 10 fold, the rate of removal should be accelerated substantially.

Figure 15:
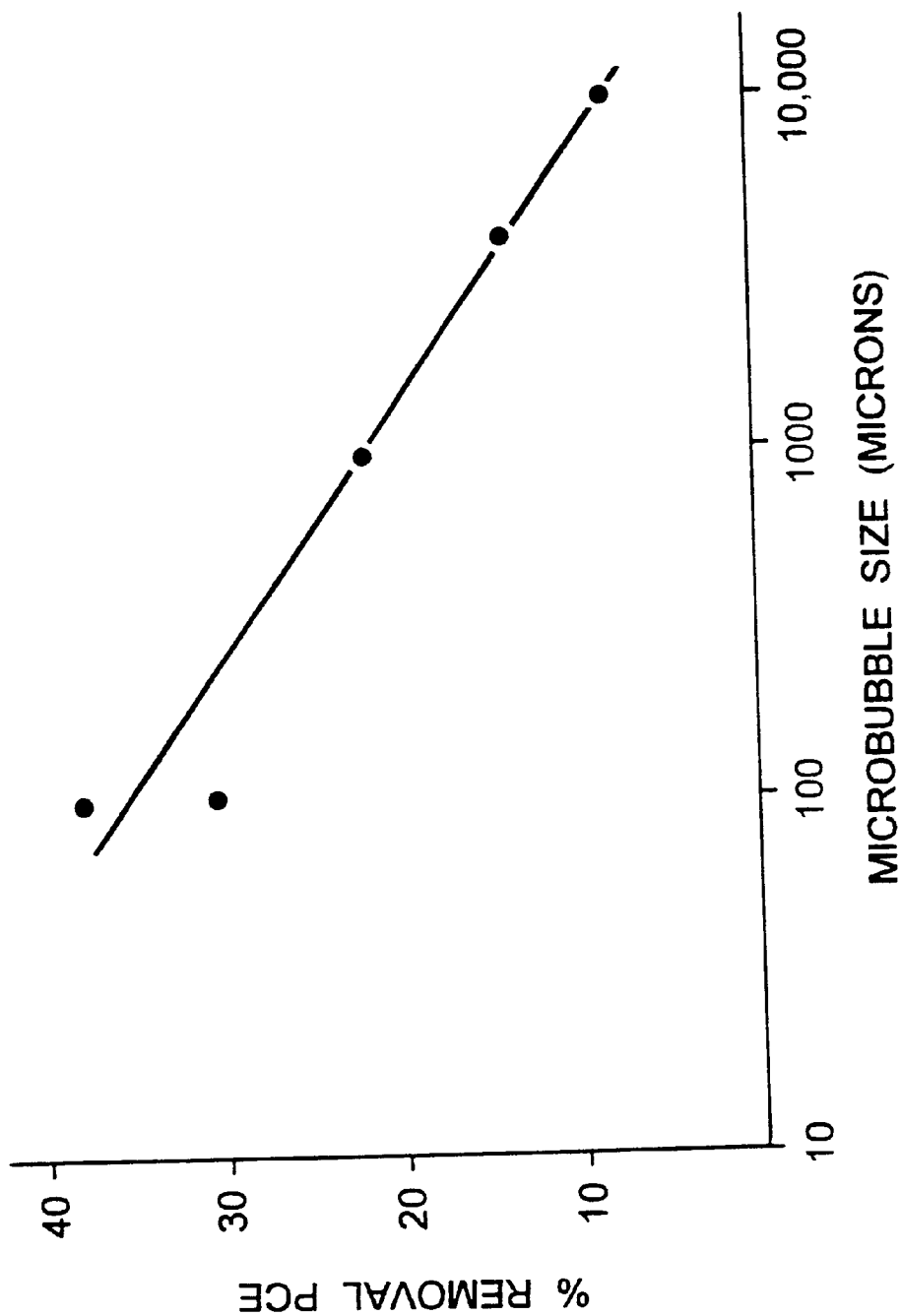
FIG. 15 is a graph illustrating PCE removal rate as function of bubble size.
Figure 16:
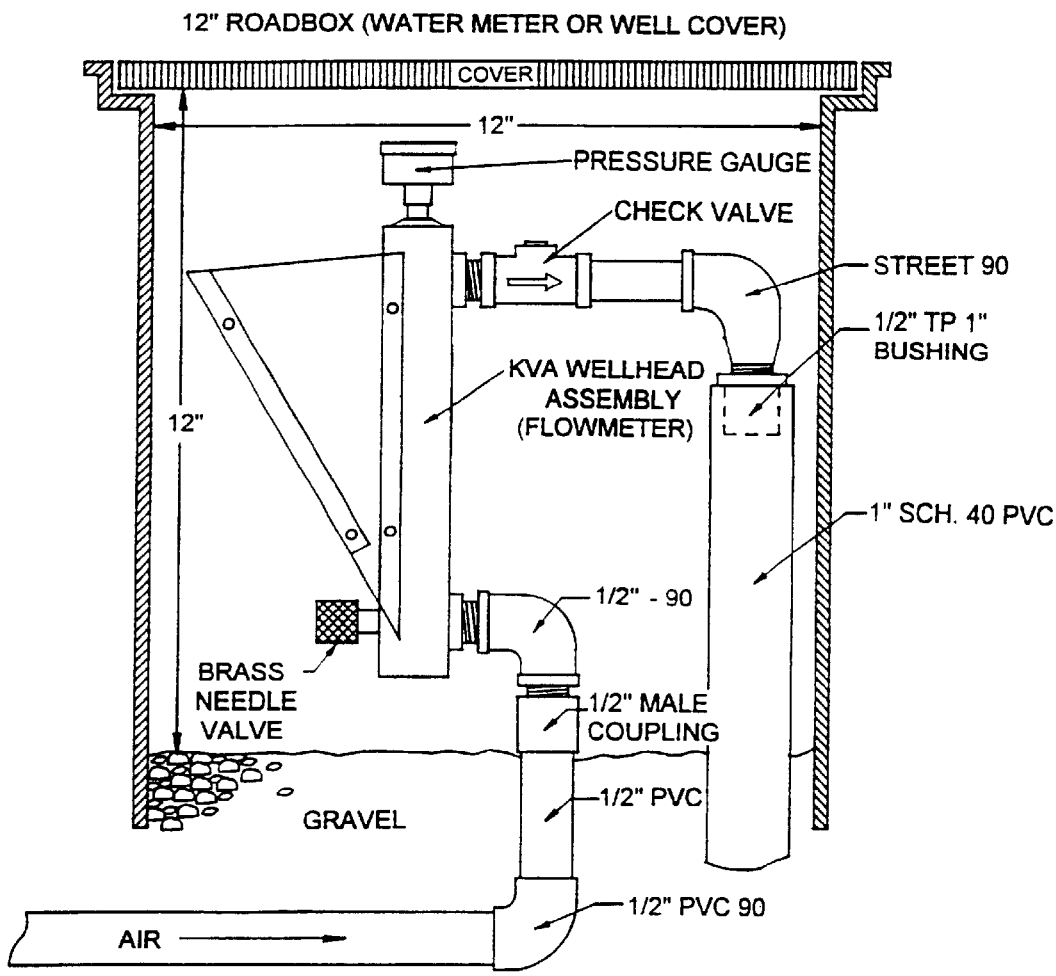
FIG. 16 is an illustration of flushmount wellhead assembly in roadbox according to the present invention.
Figure 17:
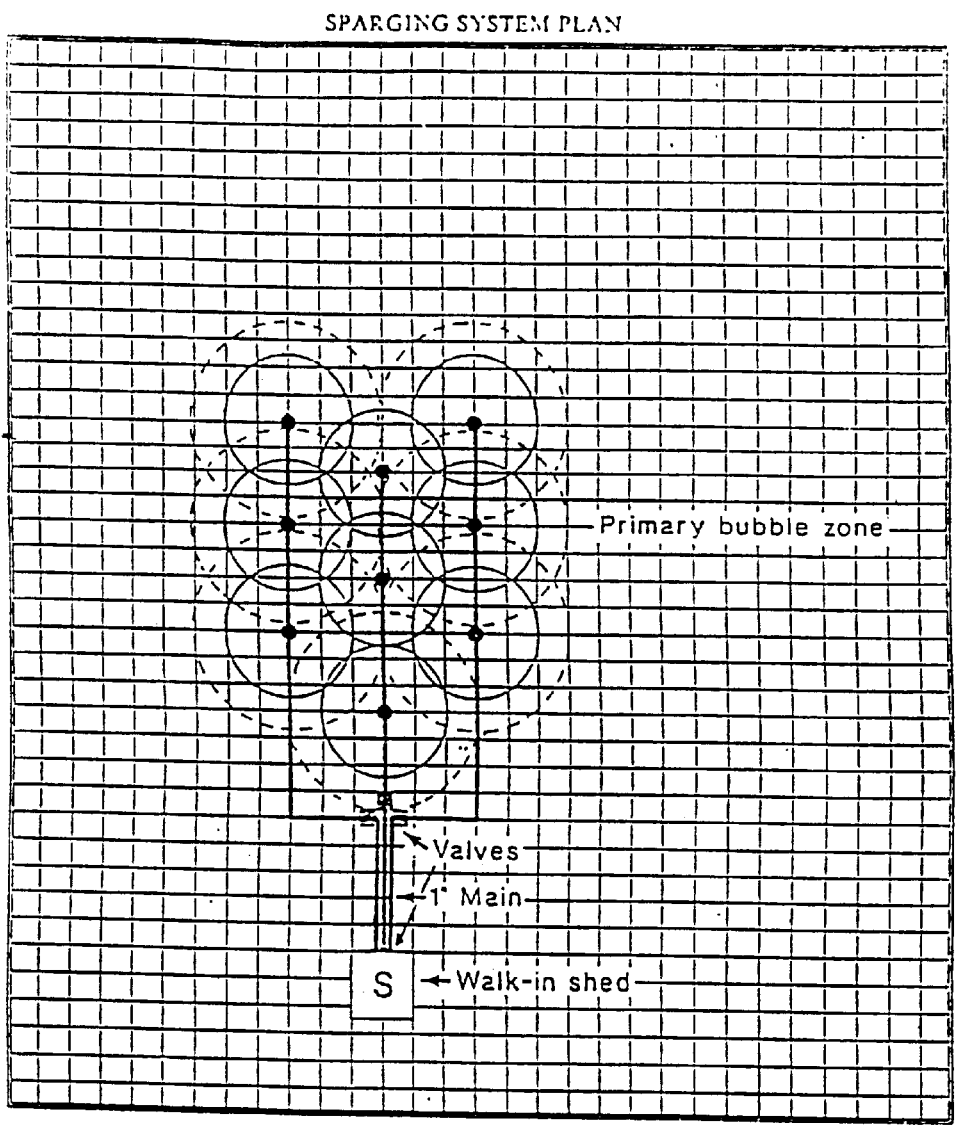
FIG. 17 is a schematic illustration of the use of zone control in the present invention.
Figure 18:
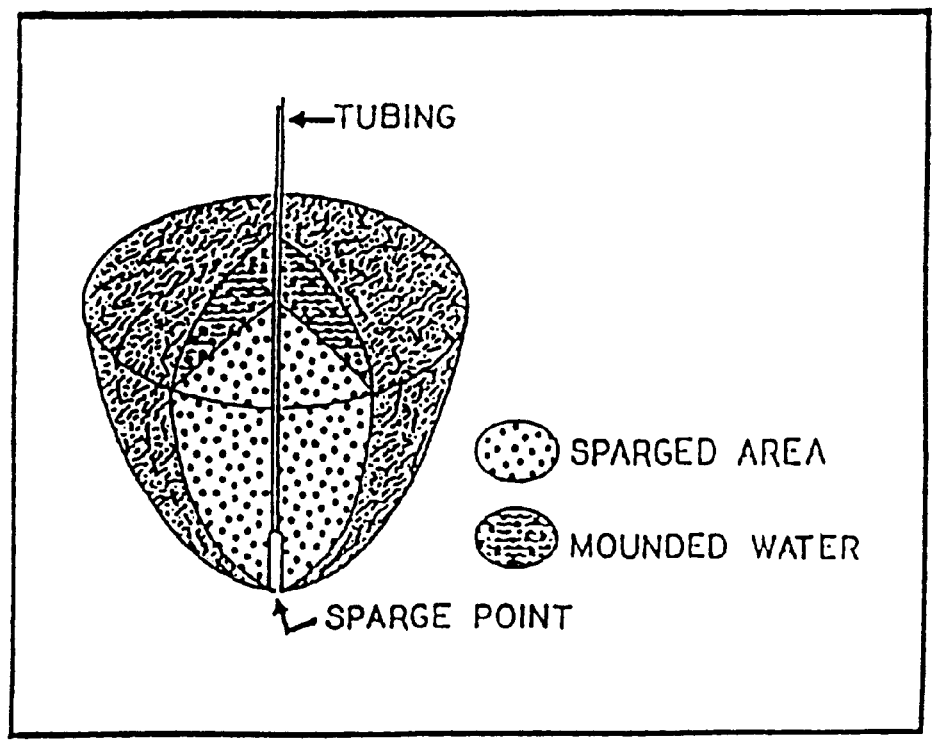
FIG. 18 is a schematic illustration of depiction of bubble zone and mounding.
Figure 19:
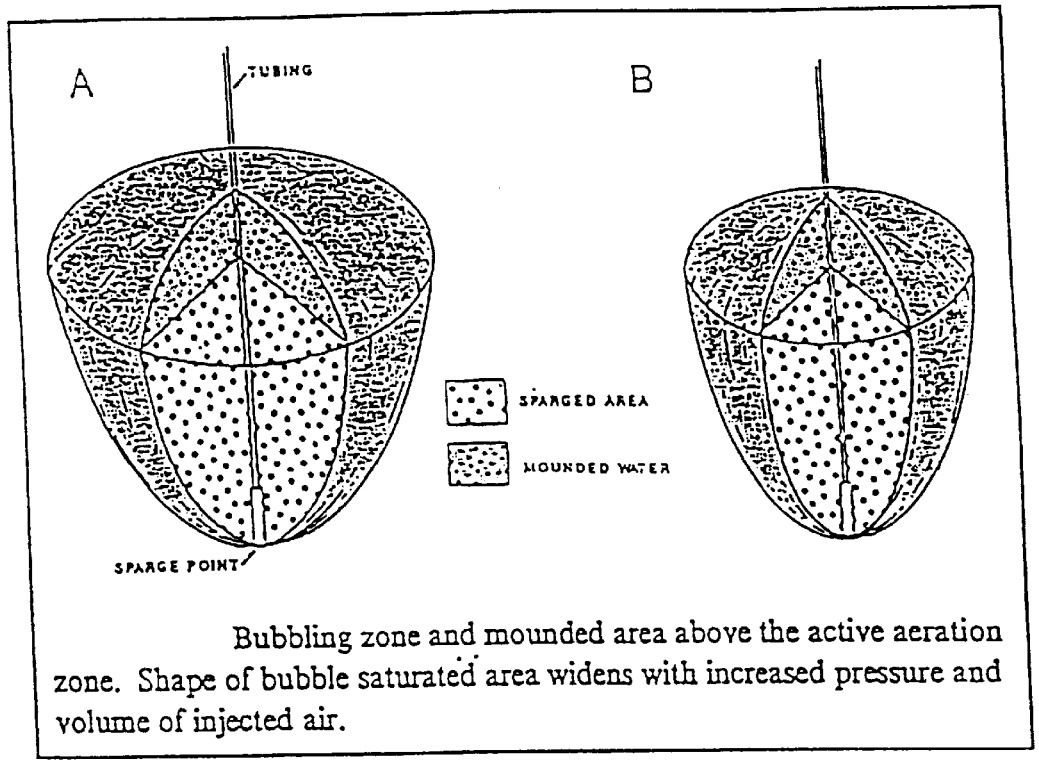
FIG. 19 is a schematic illustration of bubble zone and mounded area above the active aeration according to the present invention.
Figure 20:
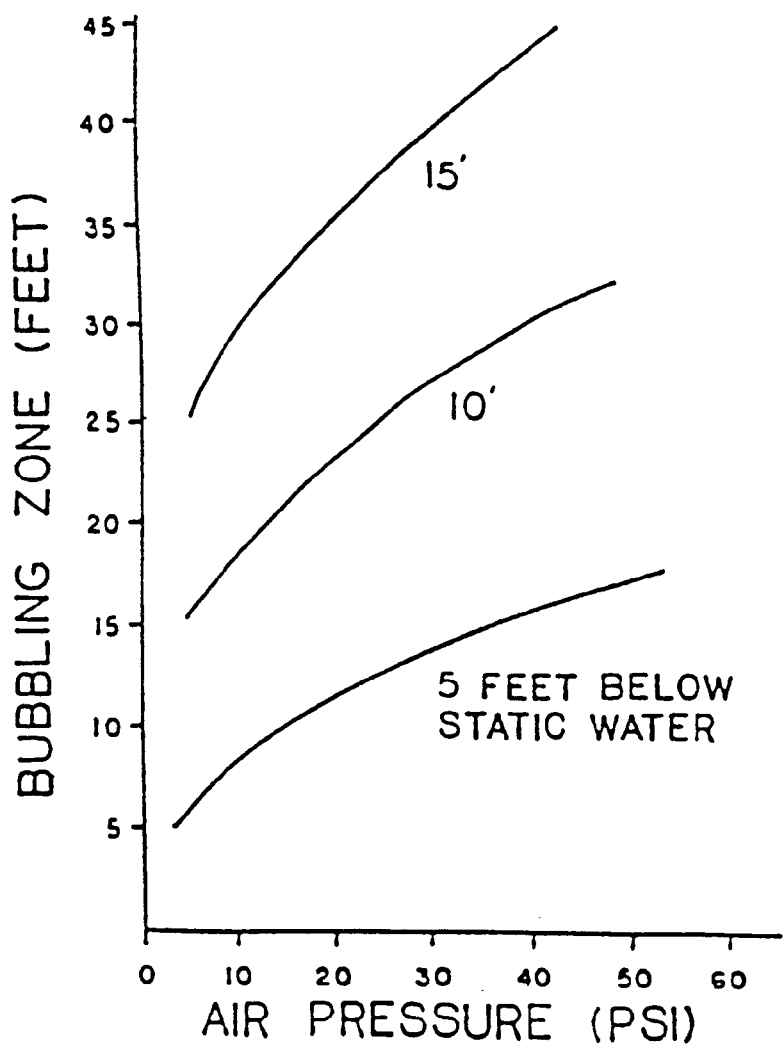
FIG. 20 is a graphic illustration of the relationship between bubble zone width, depth of bubble generator and pressure for a medium sand aquifer.
Figure 21:
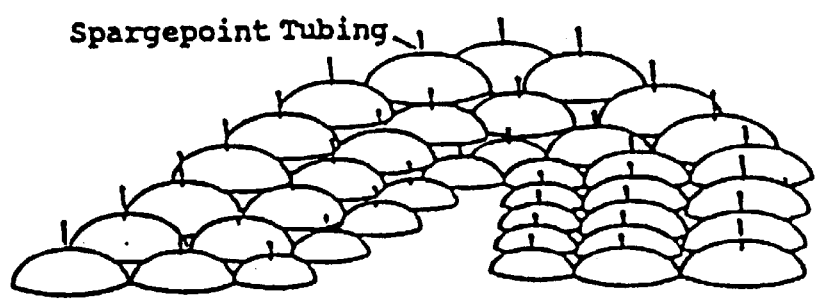
FIG. 21 is an illustration of sequential rise in water table from bubbling and concentric zones permitting containment of any floating contaminant—side view.
Figure 22:
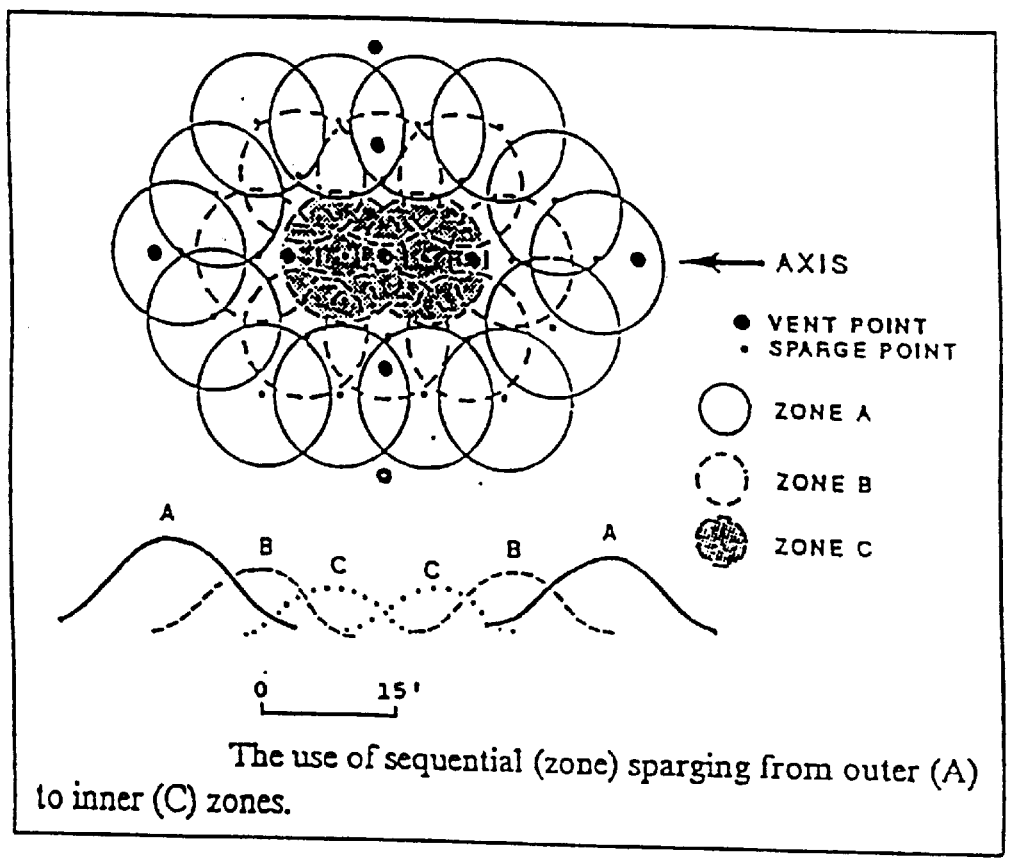
FIG. 22 is schematic illustration of sequential rise in water table from bubbling and concentric zones permitting containment of any floating contaminant—top view.
Figure 23A:
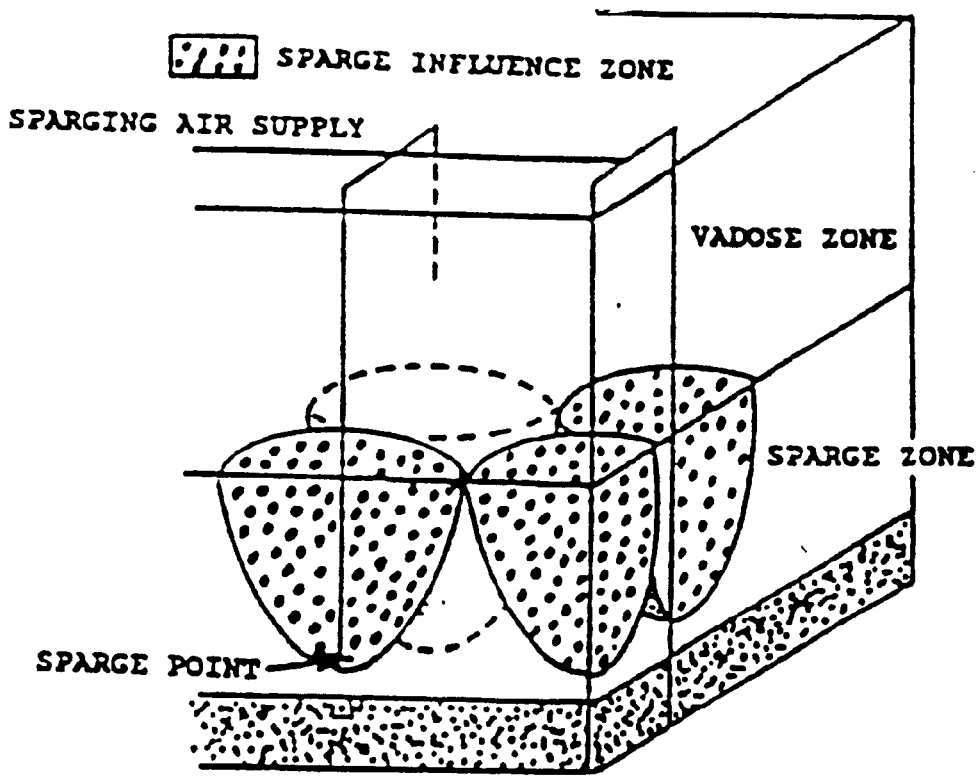
FIG. 23A is a schematic illustration of contrast between aeration gaps with non-overlapping and thirty percent (30%) overlapping sparged zones.
Figure 23B:
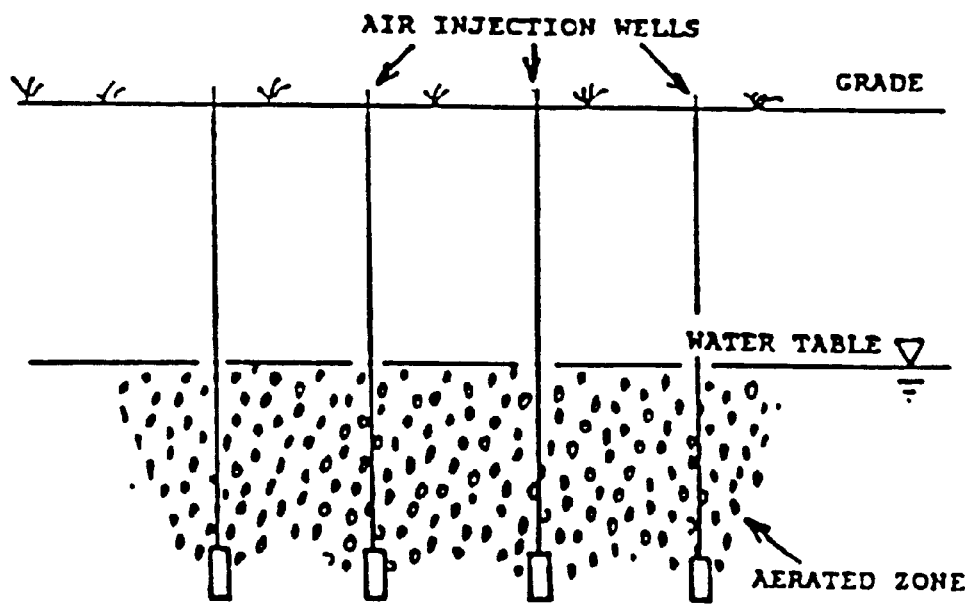
FIG. 23B is a cross sectional schematic illustration of bubble generator (Spargepoint®) apparatus well pumping above.
Figure 24:
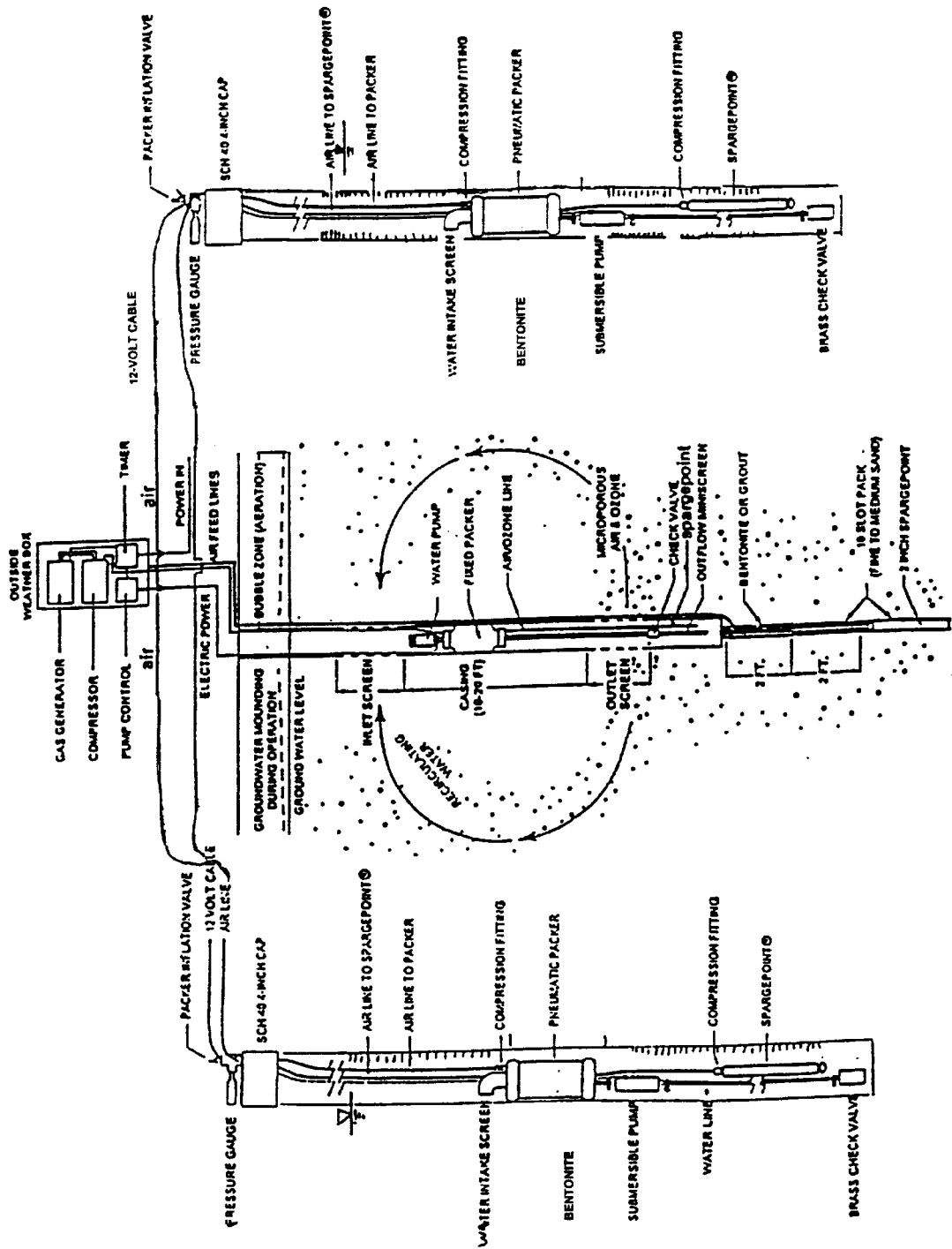
FIG. 24 is a plan view of a "C-Sparger™ system.
Figure 25:
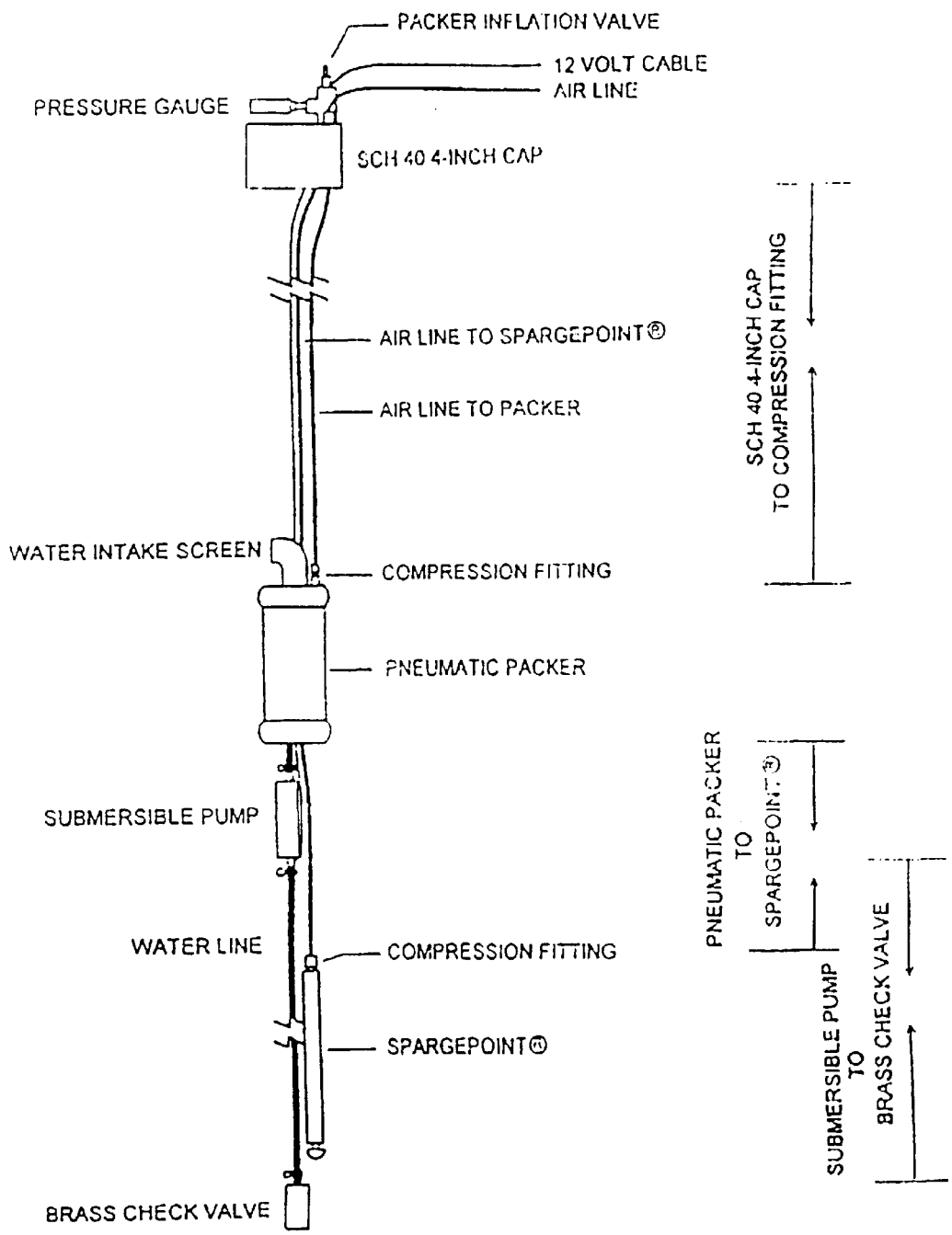
FIG. 25 is a cross sectional schematic illustration of an inwell assembly.
Figure 26:
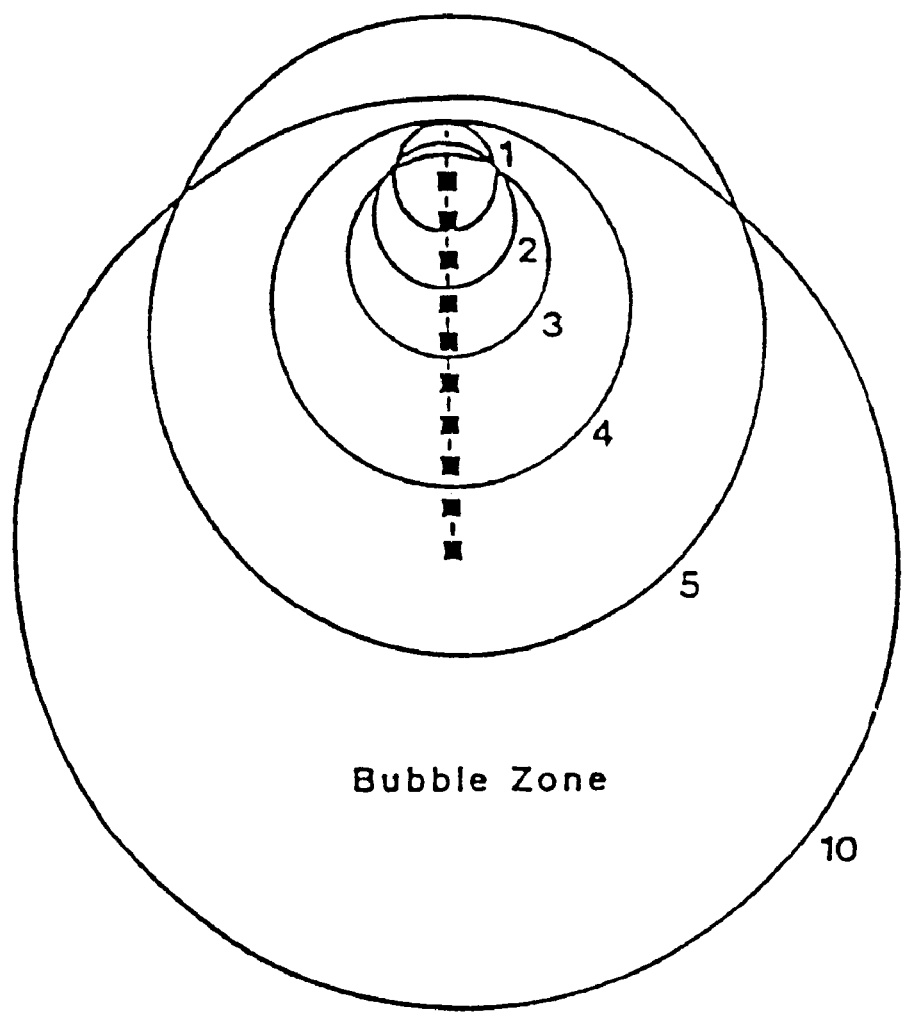
FIG. 26 is a top view of a ten point diffusor installation.
Figure 27:
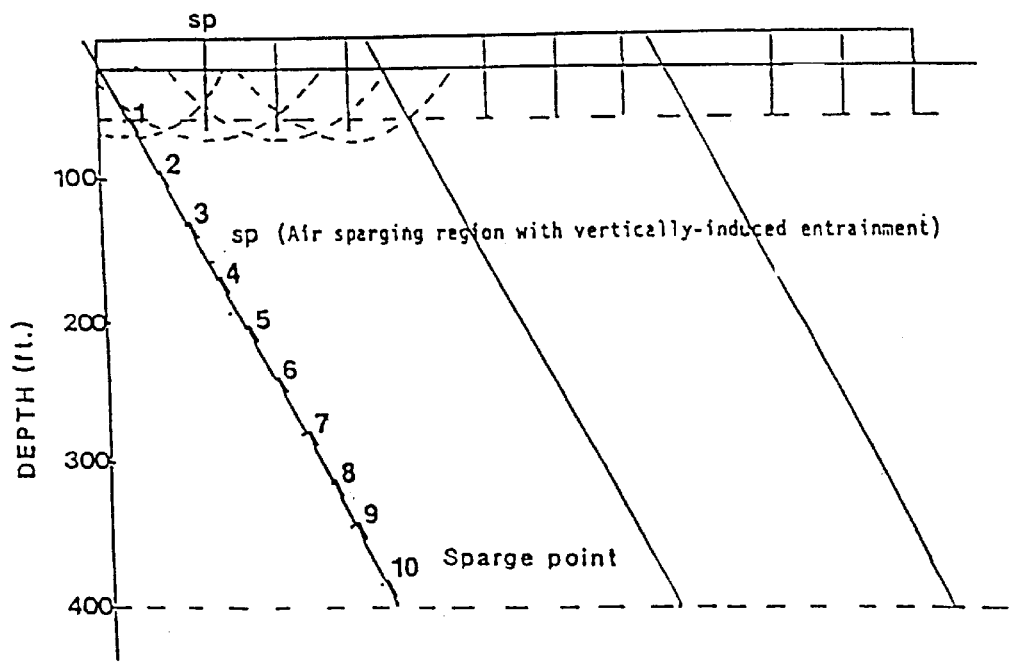
FIG. 27 is a cross sectional schematic illustration of deep slant-well installations to create selective bubble fence using equal spacing of ten diffusers.
Figure 28:
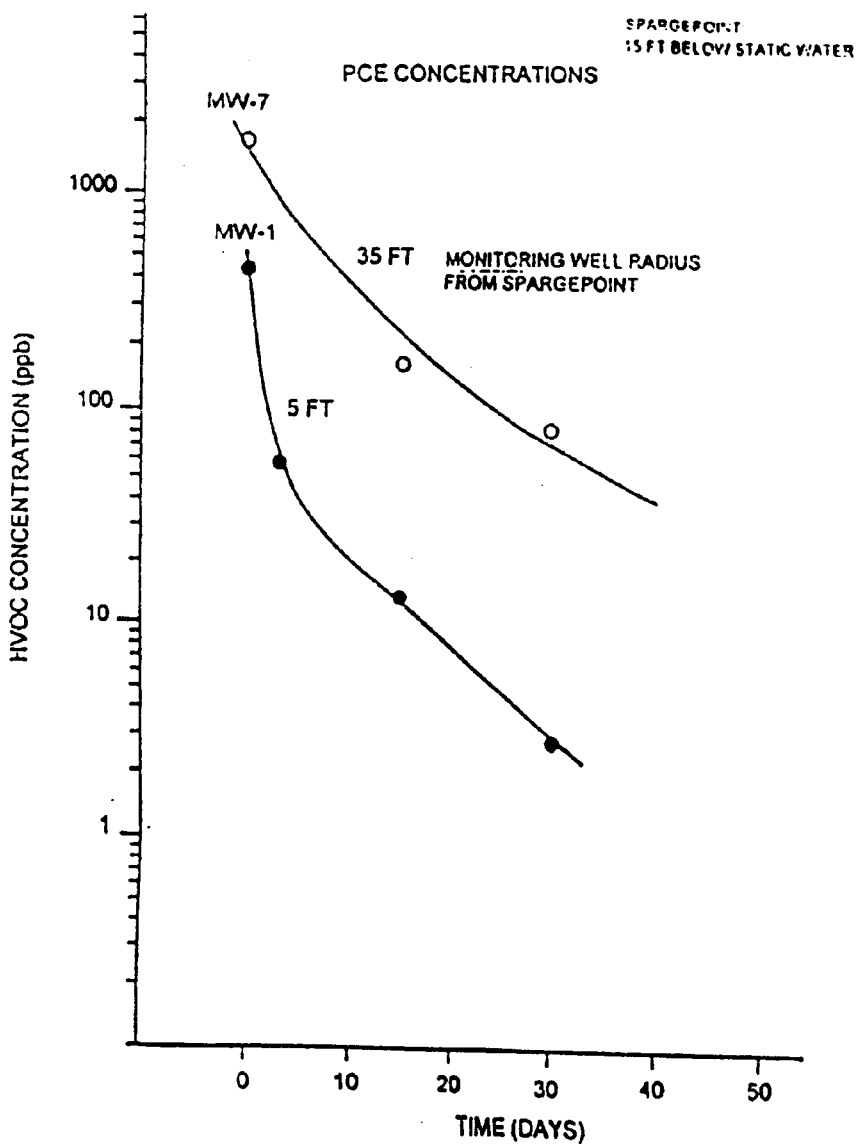
FIG. 28 is a graphical illustration of PCE concentrations.
Figure 29:
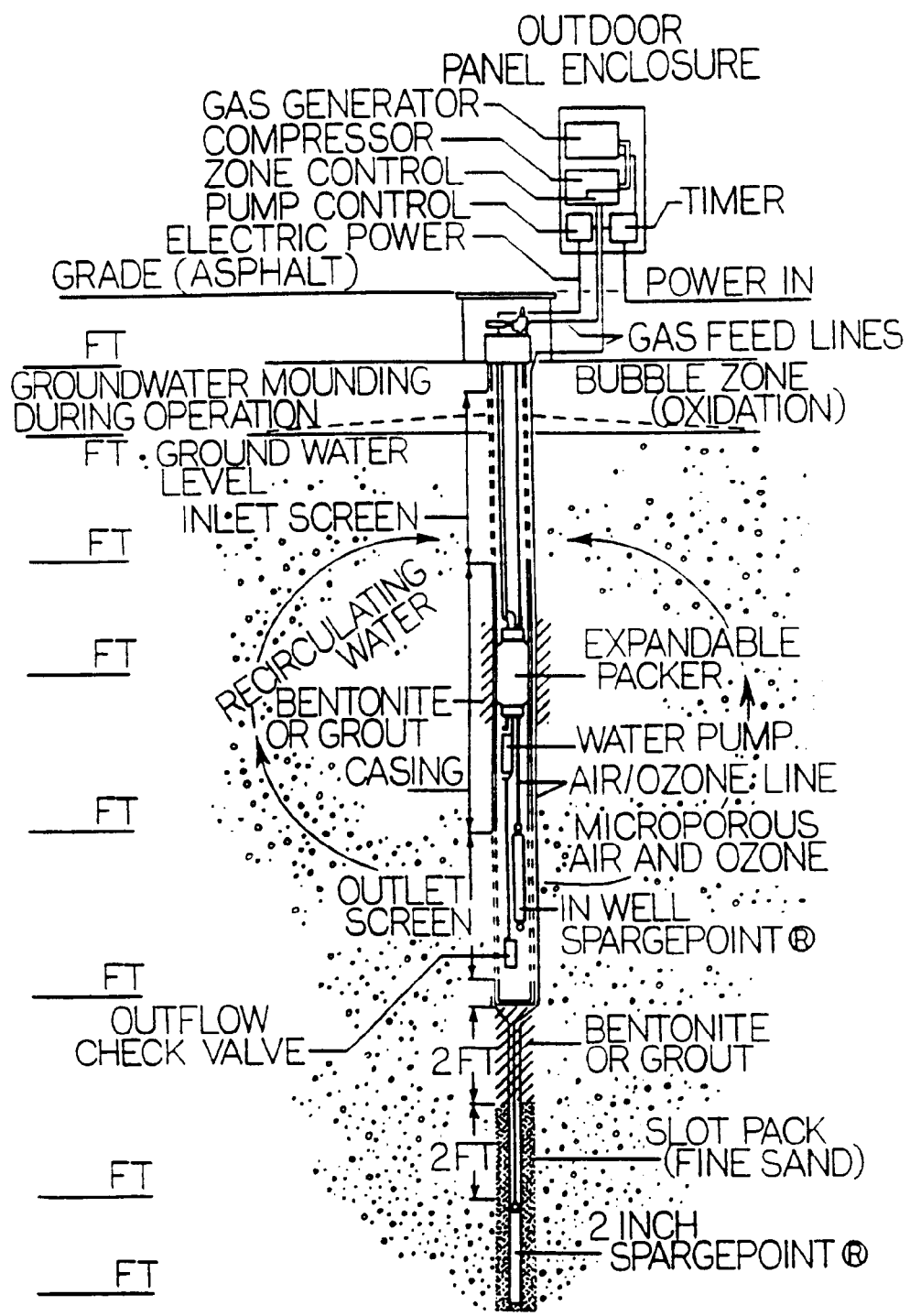
FIG. 29 is a cross sectional schematic illustration of a soil formation showing the systems and methods of the present invention.
Figure 30:
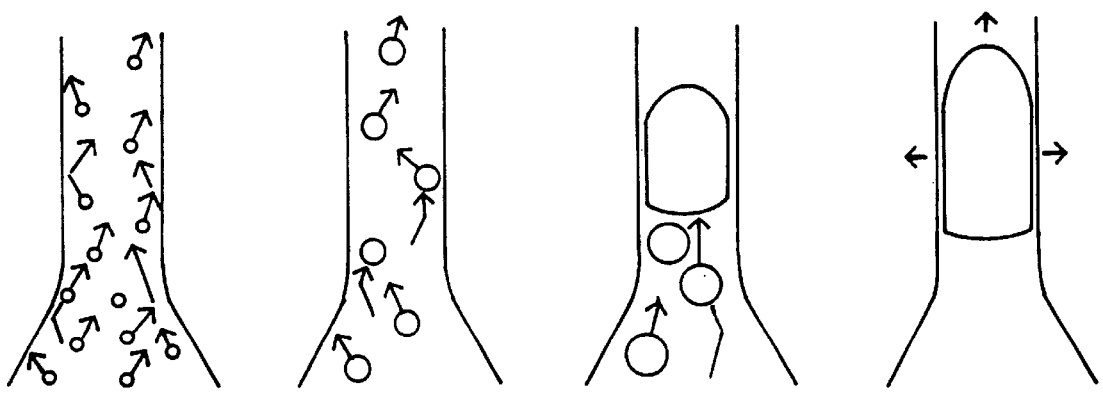
FIGS. 30–40 are directed to the improvements in the present invention set forth herein.
Figure 31:
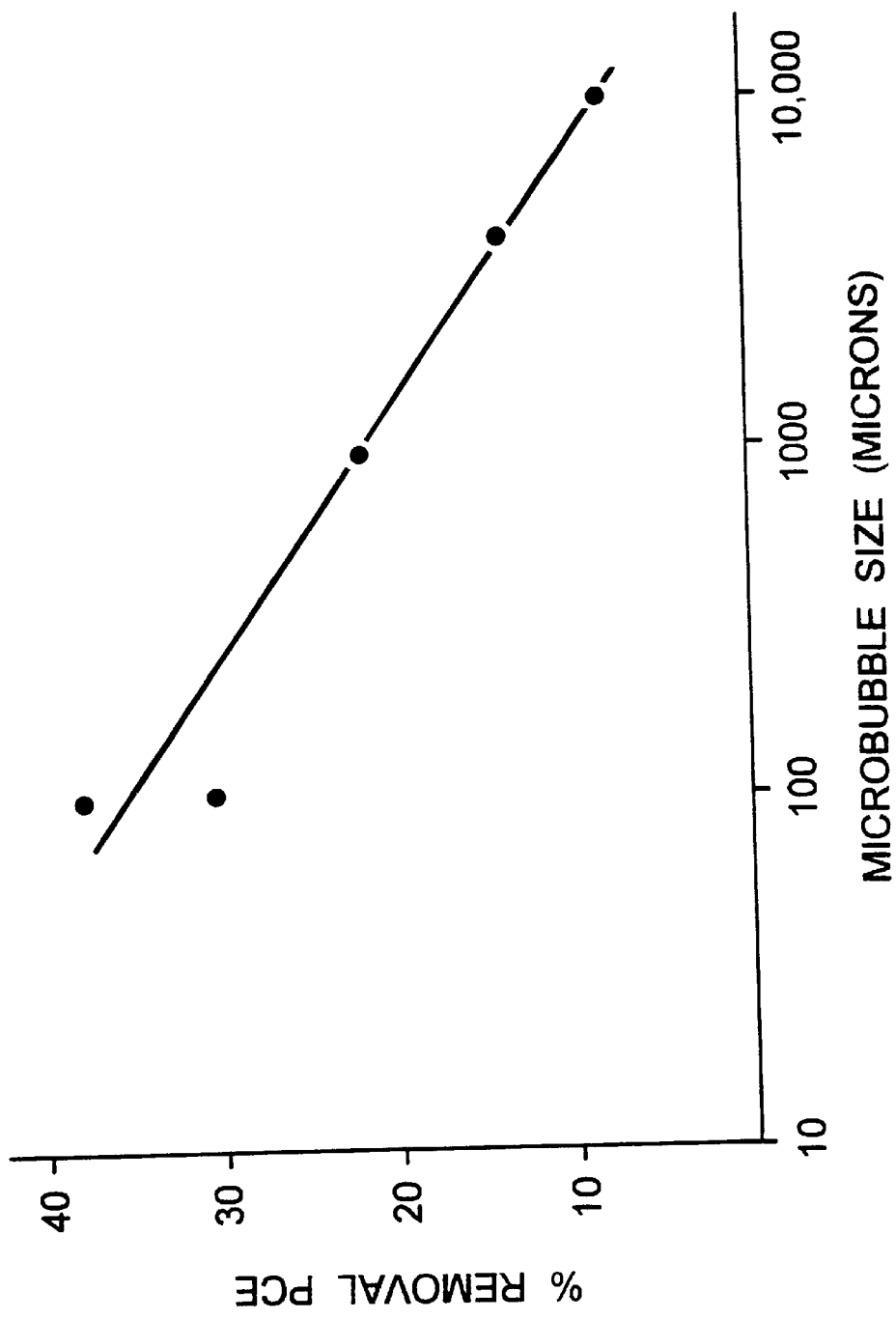
Figure 32:
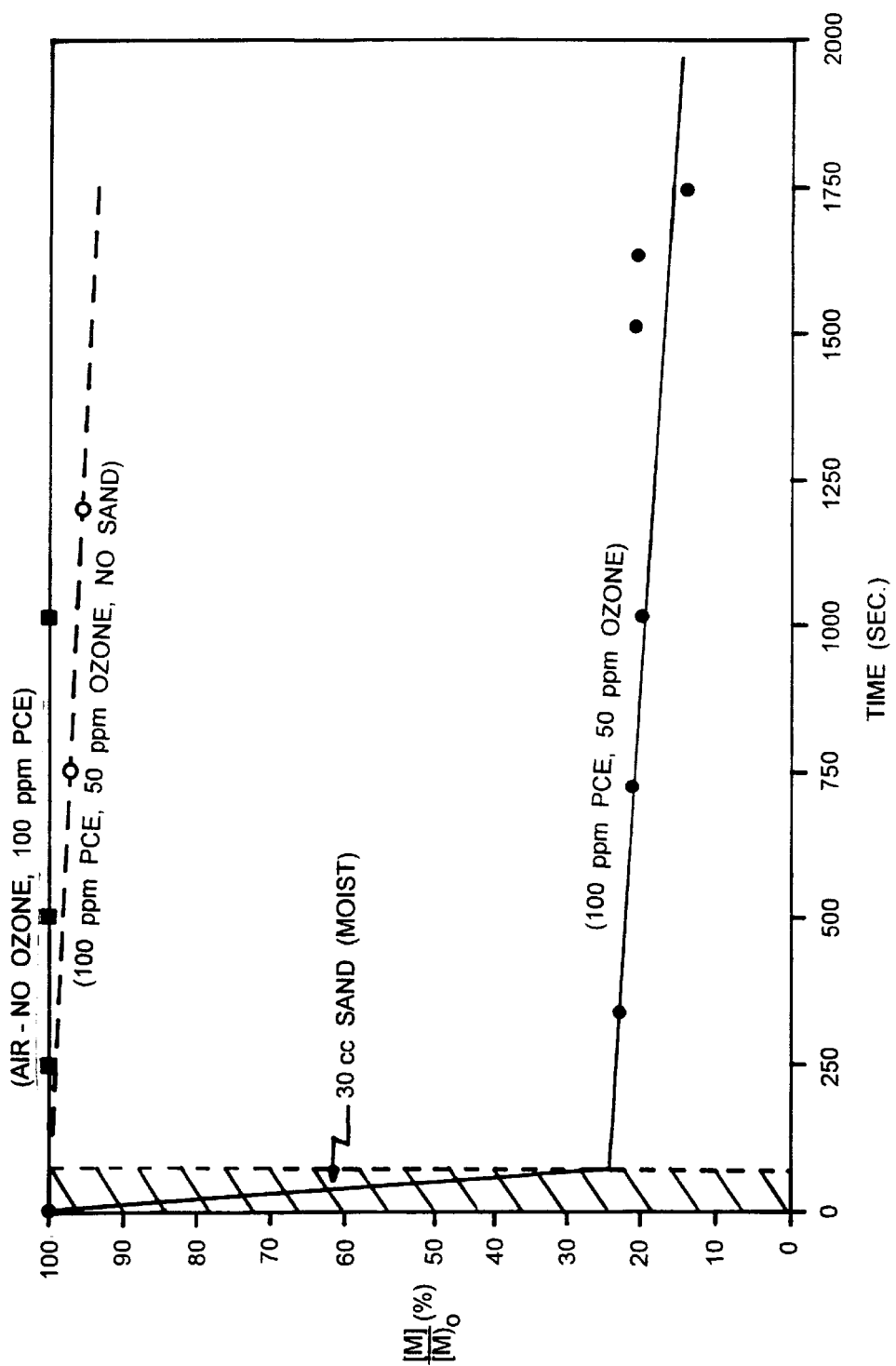
Figure 33:
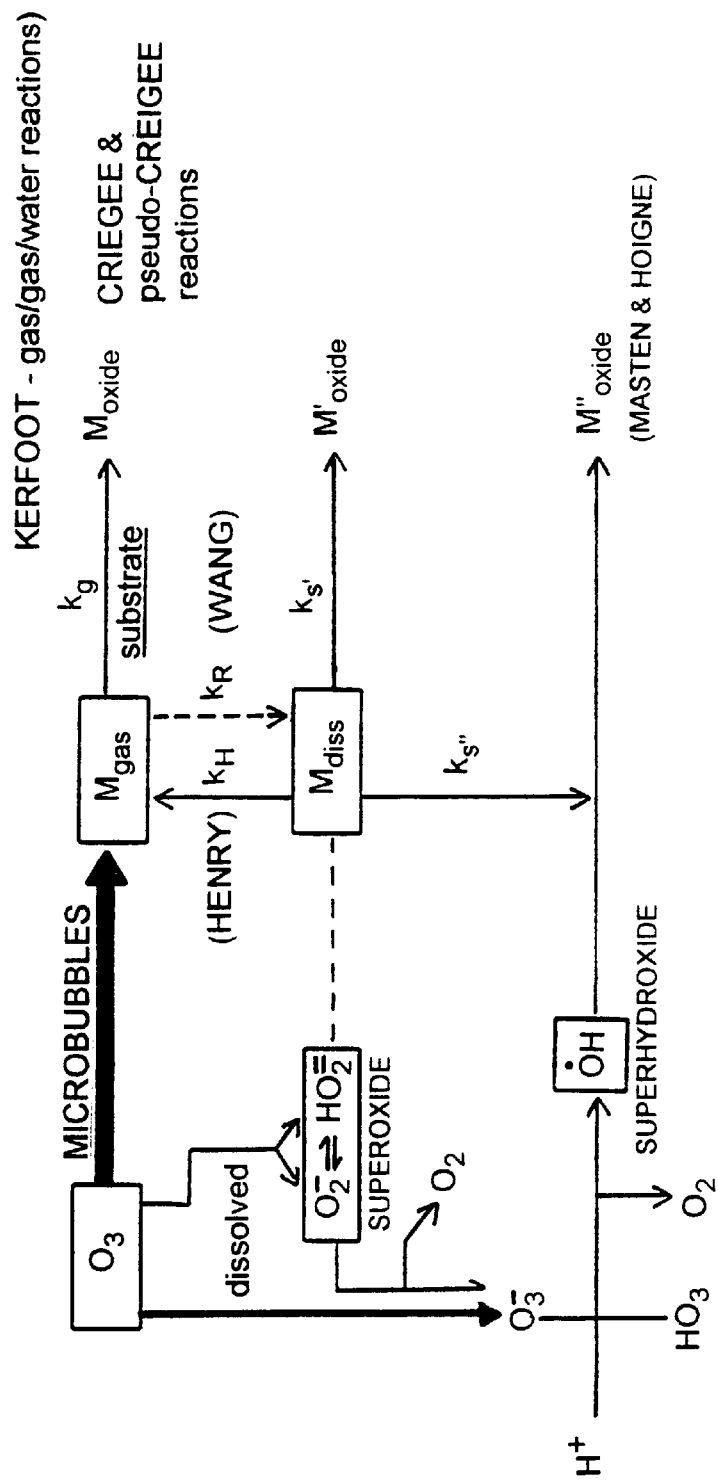
Figure 34:
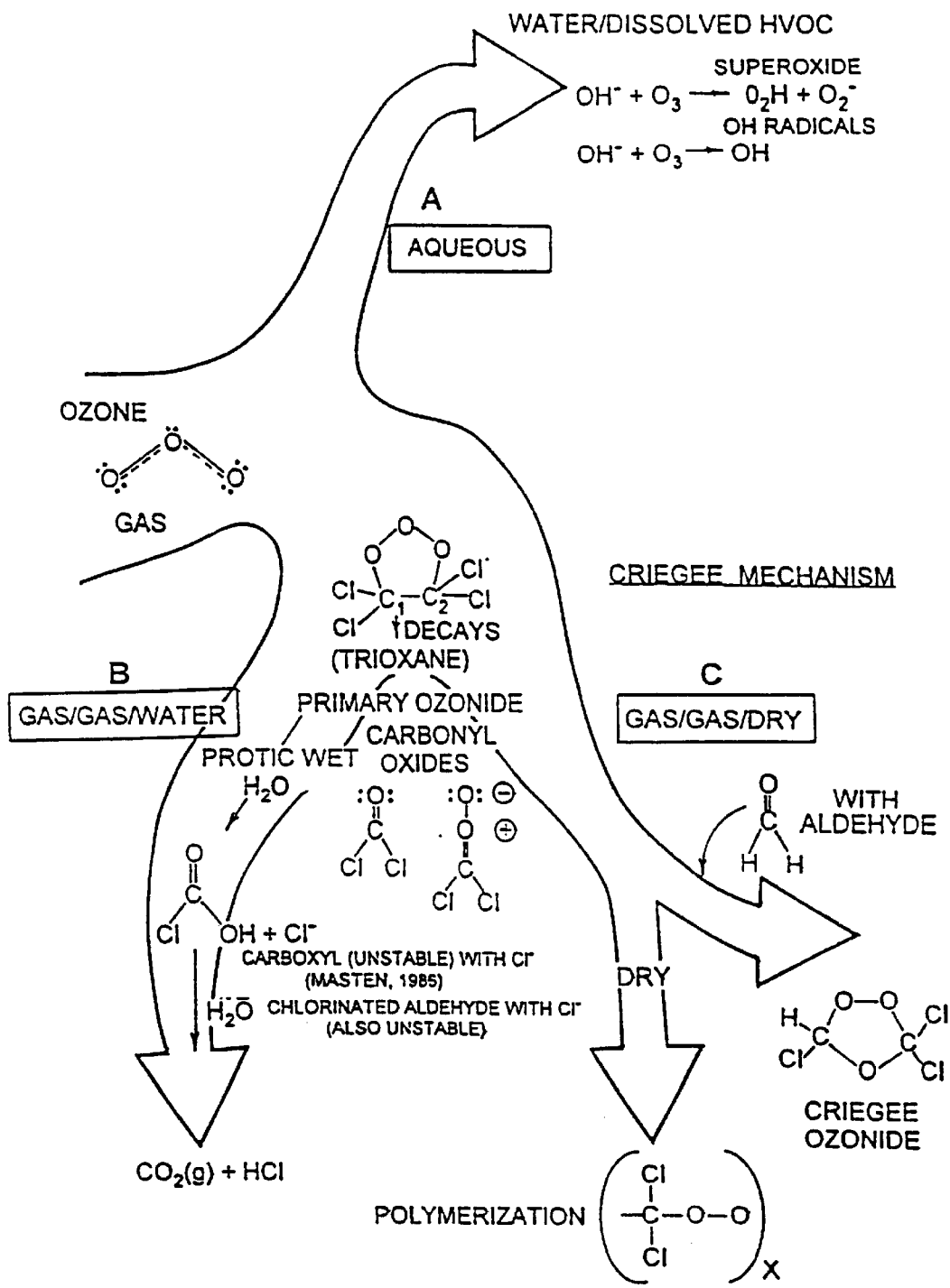

FIG. 15 plots a curve of the removal rate of PCE for an aqueous solution equivalent to 120 ppb, subjected to differing bubble sizes. The air volume and water volume was held constant. The only change was the diameter of bubbles passed through the liquid from air released from a diffusor.

XIV. PCE REMOVAL RATE AS FUNCTION OF BUBBLE SIZE OZONE ENCAPSULATION—C-SPARGING™

Ozone is an effective oxidant used for the breakdown of organic compounds in water treatment. The major problem in effectiveness is a short lifetime. If ozone is mixed with sewage-containing water above ground, the half-life is normally minutes. Ozone reacts quantitatively with PCE to yield breakdown products of hydrochloric acid, carbon dioxide, and water.

To offset the short life span, the ozone could be injected with microporous diffusors, enhancing the selectiveness of action of the ozone. By encapsulating the ozone in fine bubbles, the bubbles would preferentially extract volatile compounds like PCE from the mixtures of soluble organic compounds they encountered. The ozone destruction of organics would then target volatile organics selectively pulled into the fine air bubbles. Even in a groundwater mixture of high organic content like diluted sewage, PCE removal could be rapid. Gas entering a small bubble of volume ($4\pi r^3$) increases until reaching an asymptotic value of saturation. If we consider the surface of the bubble to be a membrane, a first order equation can be written for the monomolecular reaction of the first order.

The reaction can be written as follows:

$$\frac{dx}{dt} = K(Q - X)$$

where X is the time varying concentration of the substance in the bubble, Q is the external concentration of the substance, and K is the absorption constant.

If at time t=O, X=O, then:

$X = Q (1 - e^{31\ Kt})$

The constant K is found to be:

$$K = \frac{dx/dt}{Q - X}$$

By multiplying both numerator and denominator by V, the volume of the bubble, we obtain $$K = \frac{v dx/dt}{v(Q - X)}$$

which is the ratio between the amount of substance entering the given volume per unit time and quantity V (Q-X) needed to reach the asymptotic value. By (1) analyzing the concentration change within the fine bubbles sent through a porous matrix with saturated (water filled) solution interacting with the matrix (sand), and (2) determining the rate of decomposition of the products [TCE+ozone=$CO_2$+HCl] and [Benzene+ozone=$CO_2$+HOH], we can characterize the kinetic rates of reaction.

The rate which the quantity $K_1QV$ of the substance flows in one unit of time from aqueous solution into the bubble is proportional to Henry's Constant. The second rate of decomposition within the bubble can be considered as $k_1$, a second rate of reaction ($-k_2X$), where $$\frac{dx}{dt} = k_1 Q - k_2 X$$

and, at equilibrium, as dx/dt=0, we would have $$X = \frac{k_1}{k_2} Q$$

However, if the reaction to decompose is very rapid, so $-k_2X$ goes to zero, the rate of reaction would maximize $k_1Q$; i.e., be proportional to Henry's Constant and maximize the rate of extraction since VOC saturation is not occurring within the bubbles.

The unique combination of microbubble extraction and ozone degradation can be generalized to predict the volatile organic compounds amenable to rapid removal. The efficiency of extraction is directly proportional to Henry's Constant. Multiplying the Henry's Constant (the partitioning of VOCs from water to gas phase) times the reactivity rate constant of ozone for a particular VOC yields the rate of decomposition expected by the microbubble process.

The concentration of HVOC expected in the bubble is a consequence of rate of invasion and rate of removal. In practice, the ozone concentration is adjusted to yield 0 concentration at the time of arrival at the surface.

$$r_{VOC} = -K_L a_{VOC}(C - C_s)$$

where:

$r_{VOC}$ = rate of VOC mass transfer, $\mu g/ft^3 \cdot h$ ($\mu g/m^3 \cdot h$)

$(K_L a)_{VOC}$ = overall VOC mass transfer coefficient, 1/h $C$ = concentration of VOC in liquid $C_s$ = saturation concentration of VOC in liquid $\mu g/ft^3$ ($\mu g/m^3$)

The saturation concentration of a VOC in wastewater is a function of the partial pressure of the VOC in the atmosphere in contact with the wastewater.

$$\frac{C_g}{C_s} = H_c \text{ therefore, } C_g = H_c \cdot C_s \quad \text{(equation 1)}$$

$C_g$ = concentration of VOC in gas phase $\mu g/ft^3$ ($\mu g/m^3$)

$C_s$ = saturation concentration of VOC in liquid $\mu g/ft^3$ ($\mu g/m^3$)

$H_c$ = Henry's Constant

The rate of decomposition of an organic compound $C_g$, (when present at a concentration [C]) by ozone can be formulated by the equation:

$$-\left(\frac{d[C_g]}{dt}\right)_{O_3} = K_{O_3 c}[O_3][C_g]$$

or, after integration for the case of a batch reactor:

$$-\ln\left(\frac{[C_g]_{end}}{[C_g]_O}\right) = K_{O_3 c}[O_3]t \quad \text{(equation 2)}$$

-continued $$\frac{[C_g]_{end}}{[C_g]_o} = e_{O_3c}^{-k}[O_3]t$$

$$C_{end} = C_o e_{O_3c}^{-k}[O_3]t$$

[$O_3$] = concentration of ozone averaged over the reaction time ($t$)

[$C_g$]$_o$ = halocarbon initial concentration

[$C_g$]$_{end}$ = halocarbon final concentration

Substituting:

| | | |
|---|---|---|
| $rm = K_gA(C_g - C)$ | From Henry's Law: | (equation 3) |
| $rm = K_gA([H_c \bullet C_s] - C)$ | $C_g = H_c \bullet C_g$ | |
| $rm = K_gZ([H_c \bullet C_s] - C)$ | With ozone | |
| $rm = K_gZ$ | $([H_c \bullet C_s] - C - K_{O_3c}[O_3][C_g])$ | |
| | $[H_c \bullet C_s) - K_{O_3c}[O_3][C_g] = 0$ | (equation 4) |

Rate of decomposition is now adjusted to equal the total HVOC entering the bubble.

SET: $[H_c \bullet C_s] = K_{O_3c}[O_3][C_g]$  (equation 5)

therefore surface concentration=0

This condition has not been formulated before. It speeds up the rate of extraction because the VOC never reaches equilibrium or saturation in the bubble.

Table 4 gives the Henry's Constants ($H_c$) for a selected number of organic compounds and the second rate constants ($R_c$) for the ozone radical rate of reaction observed in solely aqueous reactions where superoxide and hydroxide reactions dominate. The third column presents the observed rates of removal in field trials with the C-Sparger™ process.

TABLE 4

REMOVAL RATE COEFFICIENTS FOR THE MICROBUBBLE/OZONE PROCESS - C-SPARGER ™

| Organic Compound | Ozone Aqueous Second Order Rate Constant[a] ($M^{-1}$ $SEC^{-1}$) | Henry's Constant[b] | C-Sparger ™ Rate Removal Coefficient(t)[c] |
|---|---|---|---|
| Benzene | 2 | 5.59 × $10^{-3}$ | 0.06 |
| Toluene | 14 | 6.37 × $10^{-3}$ | 0.07 |
| Chlorobenzene | 0.75 | 3.72 × $10^{-3}$ | 0.013 |
| Dichloroethylene | 110 | 7.60 × $10^{-3}$ | 0.035 |
| Trichloroethylene | 17 | 9.10 × $10^{-3}$ | 0.05 |
| Tetrachloroethylene | 0.1 | 25.9 × $10^{-3}$ | 0.06 |
| Ethanol | 0.02 | .04 × $10^{-3}$ | 0.0008 |

[a]From Hoigne and Bader, 1983
[b]From EPA 540/1-86/060, Superfund Public Health Evaluation Manual, presented as × $10^{-3}$
[c]From Site Tests (KVA,1995,1996,1997)

The C-Sparger™ process rapid removal rate clearly does not follow Hoigne and Bader (1983) rate constants. There is a close correlation to Henry's Constant as would be expected from equation 5. The presence of the substrate (sand) and moisture is necessary to complete the reaction. The active ingredient in the sand matrix appears to be an iron silicate. The breakdown products include $CO_2$ and dilute HCl.

Two sets of equations are involved in the reactions:

Dissolved Halogenated Compounds

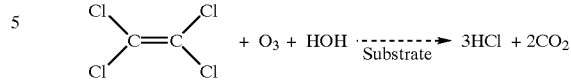

Dissolved Petroleum Distillates

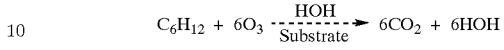

The eligible compounds for the C-Sparger™ process are normally unsaturated (double bond), halogenated compounds like PCE, TCE, DCE, Vinyl Chloride, EDB; or aromatic ring compounds like benzene derivatives (benzene, toluene, ethylbenzene, xylenes). However, pseudo Criegee reactions with the substrate and ozone appear effective in reducing certain saturated olefins like trichloro alkanes (1,1-TCA), carbon tetrachloride ($CCl_4$), and chlorobenzene, for instance.

The following characteristics appear desirable for reaction:

| | |
|---|---|
| Henry's Constant: | $10^{-2}$ to $10^{-4}$ $m^3$ .atm/mol |
| Solubility: | 10 to 20,000 mg/l |
| Vapor pressure: | 1 to 3000 mmhg |
| Saturation concentration: | 5 to 9000 g/$m^3$ |

XV. TREATMENT SYSTEM EXAMPLE

The following report describes a pilot test of the C-Sparger™ process for remediation of dissolved chlorinated solvents from groundwater. The test was conducted by Mateboer Milieutechniek B.V. for the Provincial Government of Utrecht at Rembrandt Street in Bilthoven, The Netherlands, from Mar. 27, 1997 through Apr. 4, 1997. The test involved installation of a C-Sparger™ well (TW), some additional monitoring wells (four 2 inch ID), the use of previously existing miniwells, and a fire well across the site.

XVI. SITE DESCRIPTION

The field test is positioned in a small park area midway on a long plume of predominantly trichloroethene (TCE) originating at a commercial building and traveling over 800 ft. across a predominantly commercial and residential area. The plume region lies in a thick fine sand deposit which contains gravel (streambed) deposits. Groundwater exists at a depth of 7.5 ft. (2.5 m) below grade. About one half of the area of groundwater overlying the TCE plume is contaminated with dissolved hydrocarbons (BTEX) from a nearby commercial fuel spill.

Soil borings taken by Tauw Engineering in the vicinity of the plume showed a shallow surface loam extending to 6 feet (2 m) deep. Groundwater occurred at 7.5 ft. (2.5 m). Fine sand occurred in many wells to over 18 ft. (6 m) deep. Often gravel layers were intercepted at 12 ft. (4 m) to 18 ft. (6 m) deep. A thick clay layer, which probably serves as a bottom confining layer, was found at (110–120 ft. (38–40 m) depth. A hydraulic conductivity (K) of 7.5×$10^2$ cm/sec has been estimated for the sand deposits.

Previous groundwater sampling had identified a narrow, long HVOC plume on two transects A–A' and B–B' extending from a source near A (wells 120 and 121) at a commercial facility to under Rembrandt Street, and ending under another commercial complex (beyond well 140) near Rembrandt Street. The distance was about 765 ft. (225 m) long. The top of the plume was at about 30 ft. (22 m) below grade. The highest total HVOC content was expected to be about 790 ppb combined PCE and TCE (miniscreen 129).

The location of the monitoring wells were varied in distance and depth from the test spargewell (TW) to be able to give a 3-dimensional picture of the test results. The larger diameter (2-inch ID) wells allowed groundwater flow measurements as well as pressure change to be monitored during treatment. A variety of physical and chemical measurements were performed during the test.

TABLE 5

GROUNDWATER MONITORING DURING PILOT TEST

| Physical Measurement | Chemical Monitoring |
|---|---|
| Temperature, turbidity | pH, Fe, redox potential |
| Static Water Elevation | dissolved oxygen (DO) |
| Groundwater Flow | HVOCs including PCE, TCE, DCE, Vc, DCA |
| Head Pressure change | VOCs including benzene, toluene, xylenes, ethylbenzene, ozone concentration |

XVII. C-SPARGER™ WELL INSTALLATION

The C-Sparger™ double-screen well with lower bubble generator (FIG. 2) was installed with a recirculating water system and casing. A small flow (2 gal/min) was obtained from a shallow fire well for makeup water. The lower bubble generator was set at a depth of 7.8 ft. (2.6 m). A one-half inch tubing extended to the surface from a compression fitting on the bubble generator. A four inch ID triple-screened well extended from 69 ft. (23 m) to one foot above grade. 6 ft. long (2 m) screens were placed with bottom edges at 69 ft. (23 m), 39 ft. (13 m), and 7.5 ft. (2.5 m). The middle casing between the two lower screens received 3 ft (1 m) of bentonite grout, 3 ft. (1 m) of cement/bentonite, and 3 ft. (1 m) of bentonite to seal the annular space to prevent "short-circuiting" of water. Water and fine bubbles are injected into the formation from the lowest screen and return water enters the middle screen. The most upper screen collects gases from just above the water table (2.5 m) to assure vapor control

XVIII. RADIUS OF INFLUENCE

The C-Sparger™ system is designed to achieve the injection and distribution of microbubbles into the aquifer to be treated. The pressure of the gas injection, use of microporous bubblers, and a recirculating well system all function to distribute fine bubbles, containing air/ozone gas through the fine sands under Darcian flow approximating fluid flow. The injection of the air/ozone approximates the injection of water, exhibiting mounding and outward movement until equilibrium is reached.

Despite numerous monitoring well corings depicting uniform fine sand formation with occasional gravel deposits, the immediate injection pressures and distribution suggested hydraulic conductivities consistent with semi-confined conditions. The presence of microbubbles, gas release, and dissolved oxygen changes normally demark the expansion of the treatment zone. On April 1st, operation of the C-Sparger™ unit began at about 2:00 PM. By the afternoon of April 2nd, gas bubbles were found discharging at minipoint 129, over 51 R. (17.1 m) from the spargewell (TW) installation (Table 6). Well D, only about 7 ft. (2.2 m) from the injection area showed almost immediate oxygen changes and water which was effervescent with fine bubbles. However, the lateral spread from this long axis progressed slowly (Well A and C), as if the wells were in tight (silty) material.

Tables 6 and 7 give the results of field measurements taken during sampling. Pictorial depictions are presented using the combined bubble presence, D.O. redox, and temperature change.

The bubble zone was still expanding during the ten day test. Based upon the time sequence, a long axis extending outwards about 100 ft. (30 m) in a westerly and easterly direction would be reached, with a minor axis (at right angles) of about 56 ft. (18 m). Each well would then treat a region 200 ft. long by about 100 ft. wide and 90 ft. (30 m) deep. Although an elliptic zone is considered here, the occurrence of bubbles at miniwell 126 about day 5 complicates the picture. We must assume that a buried gravel streambed, about 30 feet wide was originally intercepted and either small streamlets (braided streams) intercepted it or some secondary fracturing by air pockets was occurring to create the offshoot to miniwell 126. A geological basis exists for assuming gravel streambeds originating east-west across the region from glacial streams. Side connections could occur.

TABLE 6

DISSOLVED OXYGEN (D.O.) CHANGES OBSERVED IN MONITORING WELLS NEAR THE SPARGEWELL

| WELL | DAY | | | | | | | | | | |
|---|---|---|---|---|---|---|---|---|---|---|---|
| | 1 | 2 | 3 | 4 | 5 | 6 | 7 | 8 | 9 | 10 | 11 |
| TW | 2.8 | 11.5 | — | — | — | — | — | — | — | — | — |
| D | 1.2 | 14.2 | 12.2 | 11.8 | 8.9 | — | 12 | 12.3 | 13 | 9.2 | 15.8 |
| 129 | 0 | 1.6 | 9.3 | 9.2 | 7.4 | — | 7.9 | 8.6 | 9.1 | 8.5 | 9.4 |
| C | 0 | 0.7 | 1.4 | 0.9 | 1.1 | — | 3.5 | 3.4 | 5.7 | 5.2 | 8.2 |
| A | 0 | 0 | 0.1 | 3.1 | 8.6 | — | 8.6 | 8.8 | 11.6 | 11.7 | 9.3 |
| B* | 0 | 0 | 0 | 0.2 | 0 | — | 0 | 0 | 0 | 0 | 0 |
| 126 (14–15) | 0 | 0 | 0 | 3.5 | 3.7 | — | 5.9 | 6.3 | 6.8 | 6.7 | 6 |

*Well B showed a continual increase in redox potential despite exhibiting no oxygen increase. A hydrocarbon plume with high oxygen demand existed in the region.

XIX. GROUNDWATER FLOW MEASUREMENTS CIRCULATION PATTERN DEFINITION

Direct groundwater flow measurements were performed with a KVA Model 40 GeoFlo Meter prior to the startup and during the operation to determine background velocity and changes. Initial measurements indicated a flow near the spargewell (TW) in a north westerly direction at a velocity of between 0.6 and 0.8 ft./d, coinciding with the direction of movement of the plume.

Additional measurements were taken after beginning injection to determine the velocity of groundwater eddies created by the double-screen well system and rising bubbles which expand the treatment zone both vertically and horizontally across the site. The observed change in direction and rate coincided with a slow vertical mixing rate (which is 5.4 m. east of TW). The change was measured at about 3 ft/d in an easterly direction. At well B (which is 11 m. west of TW) a velocity change of 0.5 ft/d occurred towards the TW well. The A well is shallow (37 ft. below grade) and the B well significantly lower (49 ft. below grade). Groundwater moving in towards the spargewell would reach a maximum at about 71 ft. (27 m) below grade.

The outward gyre would reach a maximum velocity at about 36 ft. (12 m). The vertical eddy for mixing appeared to reach a velocity with a diameter of about 60 ft. (20 m) by day 10 of the test, with an estimated velocity of about 10 ft/day (3.3 m/d). This is slow by normal standards and probably the result of loss of pressure along the narrow gravel streambed, intercepted between 60 ft. and 75 ft. deep (20 and 25 m).

XX. CHEMICAL RESULTS VOC REMOVAL—CHLORINATED AND PETROLEUM COMPOUNDS

The site held a combination of a lower dissolved chlorinated solvent plume, dominated by PCE and TCE, and an upper dissolved fuel spill, dominated by BTEX compounds. A large region of the wells exhibited elevated HVOCs in groundwater, with initial samples from wells D, B, C and miniwell 129 (14–15 m) showing concentrations of 2,100 ppb; 14,500 ppb; 12,500 ppb; and 1,450 ppb, respectively, well above the 800 ppb originally expected. Groundwater from the spargewell (TW) and wells A, B, C, and D exhibited total BTEX concentrations ranging from 62 to 95 $\mu$g/l-ppb.

Concentration of HVOCs (VOCs) located in the gravel zone underwent immediate rapid reduction (wells TM, D, 129). Nearby wells located at right angles (probably in fine sands) to the buried gravel streambed, showed a slower removal, converging on a logarithmic decay rate. Those in the outlying wells, mainly requiring recirculation to treat the groundwater, tended to show decaying oscillating concentrations with time, reflecting the circular water movement.

The process of removal of dissolved volatiles is similar to detoxification in human bodies. Elimination and detoxification processes correspond to first order reactions where the rate of decrease in concentration of the toxic substance is directly proportional to the concentration of the substance. The following differential equation expresses the direct relationship between the rate of elimination and the concentration of the dissolved volatile compound:

$dc/dt = -bc$ where:

dc=change in concentration of dissolved volatile dt=change in time b=fraction of volatile substance that leaves groundwater in one unit of time (day)

c=concentration of volatile compound

If b=0.20, 20 percent of the volatile substance present at any given time is eliminated per unit of time (day). To determine the actual amount of substance eliminated per unit of time, the initial concentration was compared to later concentrations at increasing time intervals from start of operation. The amount of material eliminated is obtained from:

$Bc(dc/dt) = fc$ where:

Bc=volume of groundwater block (prism) containing the chlorinated substance

C=concentration of volatile substance in groundwater, in $\mu$g/l-ppb f=a constant The following equation offers the simple solution:

$C = Co e^{-bt}$ where:

e=an exponent

Co=Initial concentration of volatile organic compound in groundwater ($\mu$g/l-ppb)

The equation shows the behavior of the phenomenon of "exponential decay", since the exponential term $e^{-bt}$ appears in it. The curve starts from a known groundwater concentration and decreases in proportion to the remaining concentration, thus $$\log C/Co = bt/2.303$$

or $$\log C = \log Co - bt/2.303$$

for $$C = Co/2, b = 0.693/t_{1/2}$$

The constant $t_{1/2}$ corresponds to the length of time needed for the concentration of Co to decrease by 50%; i.e. $t_{1/2}$ is the half-life of the substance in the groundwater.

Figure 10:
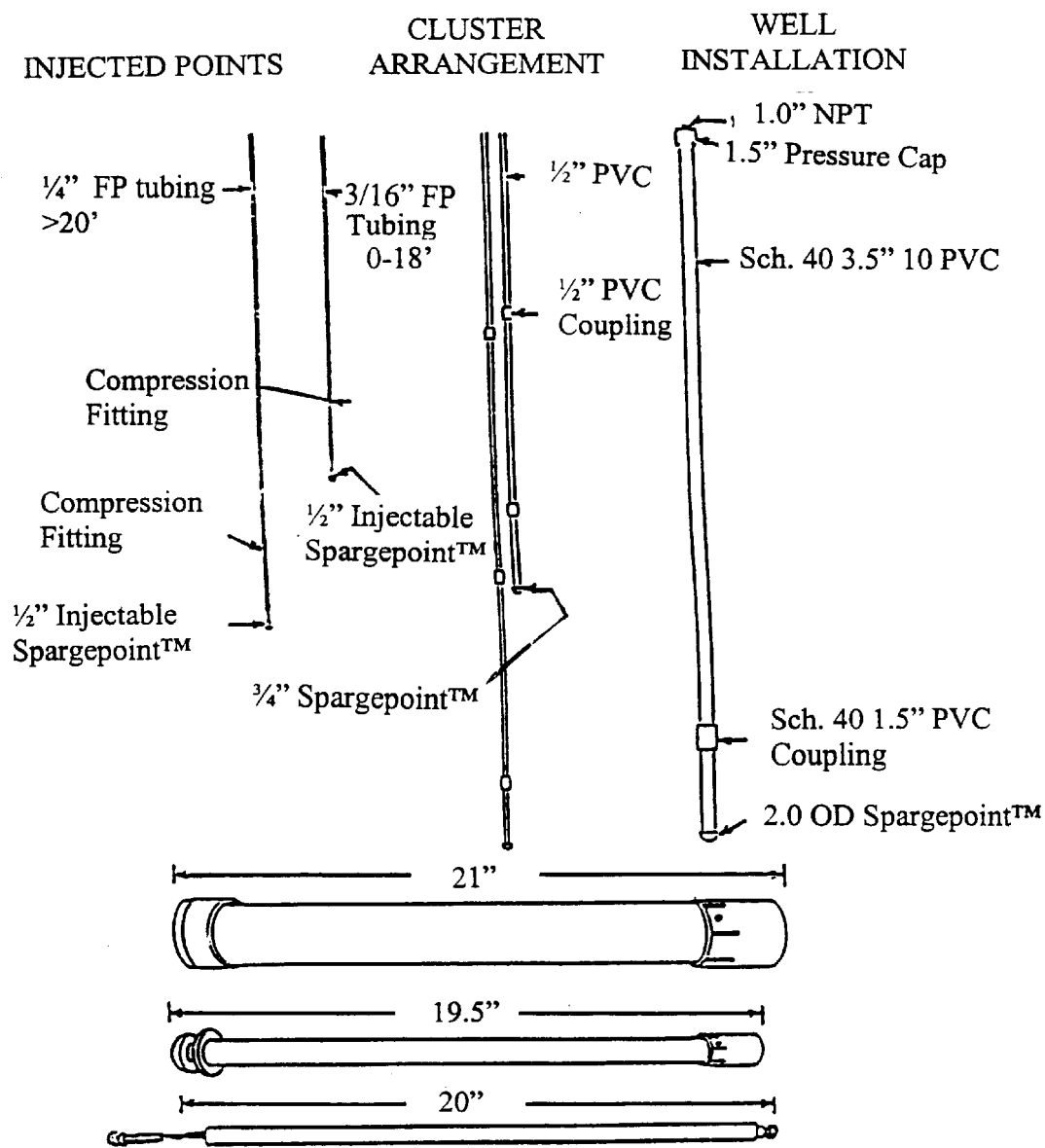
FIG. 10 is a plan view of three different types of bubble generators and installations of the present invention.
Figure 11:
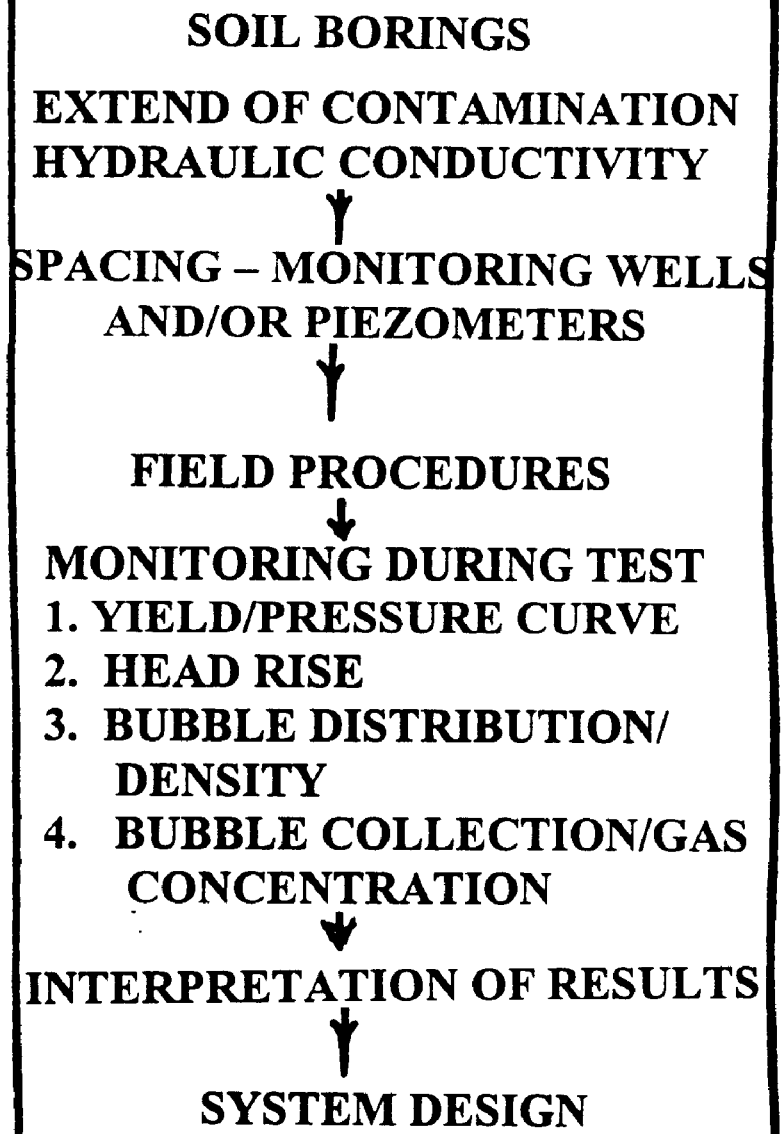
FIG. 11 is an illustration of flow chart for a sparge test according to the present invention.
Figure 12:
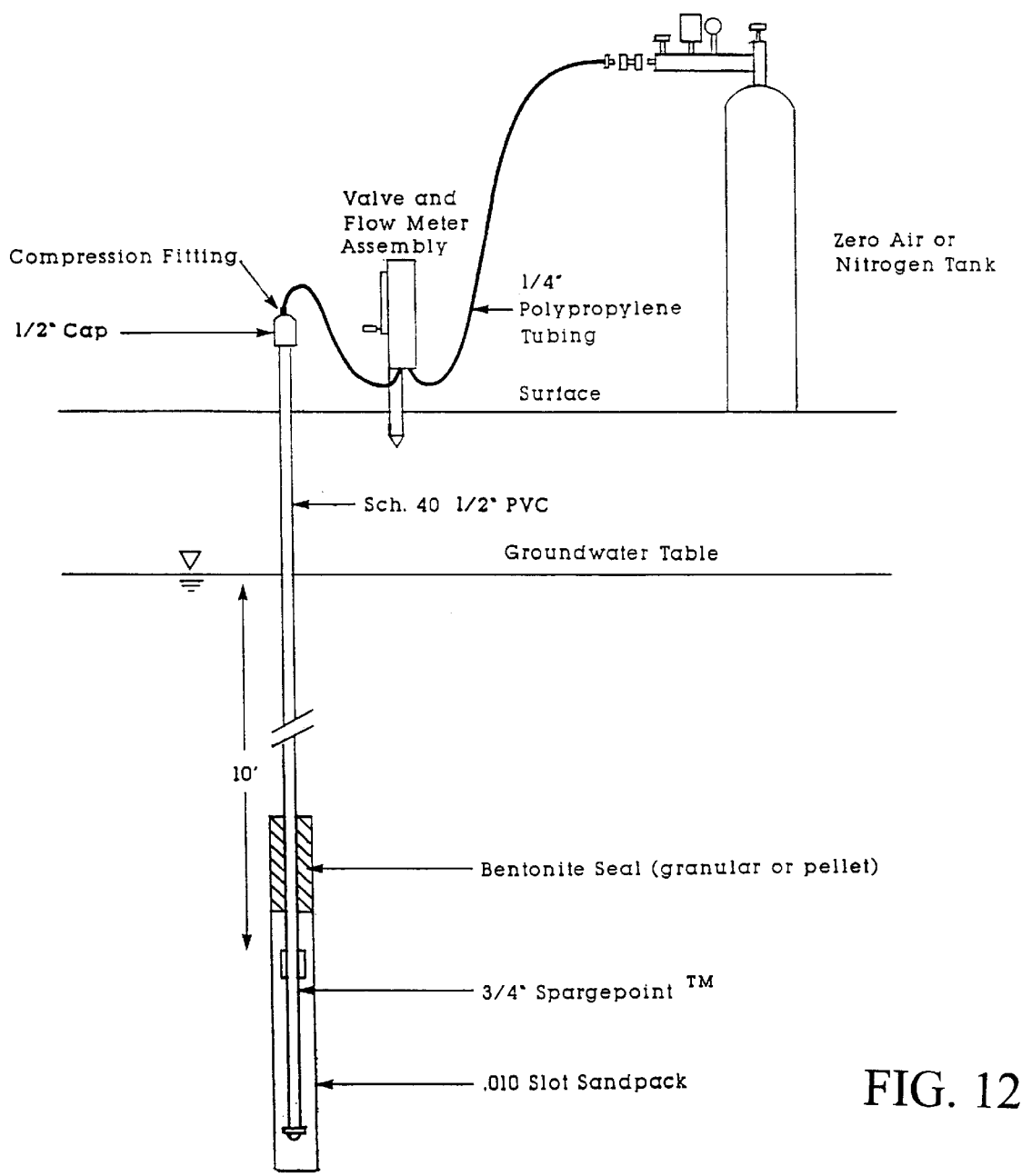
FIG. 12 is a schematic illustration of apparatus used in in-situ sparge test according to the present invention.

In FIGS. 10 and 11, the mean $-\log C/Co$ is plotted versus time to derive the approximate decay rate observed for the site conditions. Note that because the y-axis is the negative logarithm, a positive (upwards) slope indicates proportional reduction. The decay constants for both HVOCs and BTEX compounds were computed. In some cases, a linear mean value was clearly being fitted to a dampened oscillating decay as a first approximation.

HVOC removal rates fell between 0.09 and 0.14t. BTEX removal rates fell between 0.07 and 0.20 t. This corresponds to a steady rate of reduction to ½ value every 7 to 11 days. In a conservative estimate it would take slightly less than 100 days to reduce the core region (50 ft wide by 30 ft deep by 200 ft long) to below 5 $\mu$g/l-ppb, assuming no other sources invade the eddies with the treatment volume.

With HVOCs, the time to bring core region concentrations to 1 $\mu$g/l-ppb ranged from 50 to 100 days. For BTEX compounds, the level ranged between 20 to 60 days. Please note that the HVOC removal rate is somewhat slower since the beginning concentration of 2000 ppb total HVOC is higher than the starting point of the BTEX compounds (50–70 ppb)

XXI. BUBBLE CHAMBER (SELECTOR AND INJECTOR)

To generate a higher proportion of micron-sized bubbles, a recirculating liquid flow system under pressure was combined with a porous cylinder, with counter-gravity flow (for segregating bubble size) to create a micro-bubble production chamber. The combination of flow across porous plates has been known to fractionate bubbles to produce small bubbles (Adler, Bourbigot, and M. Faivre, 1985). To increase the number of fine ozoneated bubbles and decrease their size, the partial water flow was pressurized, saturated with ozone and then released, producing fine bubbles with a size between 50 to 200 µm (Boisoon, Faivere, and Martin, 1995).

The concept of mounting a porous plate with vigorous mixing vertically below a pulsing water pump, then allowing a time delay or low volume flow to allow segregation of small bubbles from large bubbles, can produce 10 to 100 µm bubbles suitable for injection into finely porous geological formations (fine silts and sands to medium sands). Groundwaters are naturally lower temperatures (40–50° F.), which allow low loss of ozone (2% to 5%) during compression.

Figure 35:
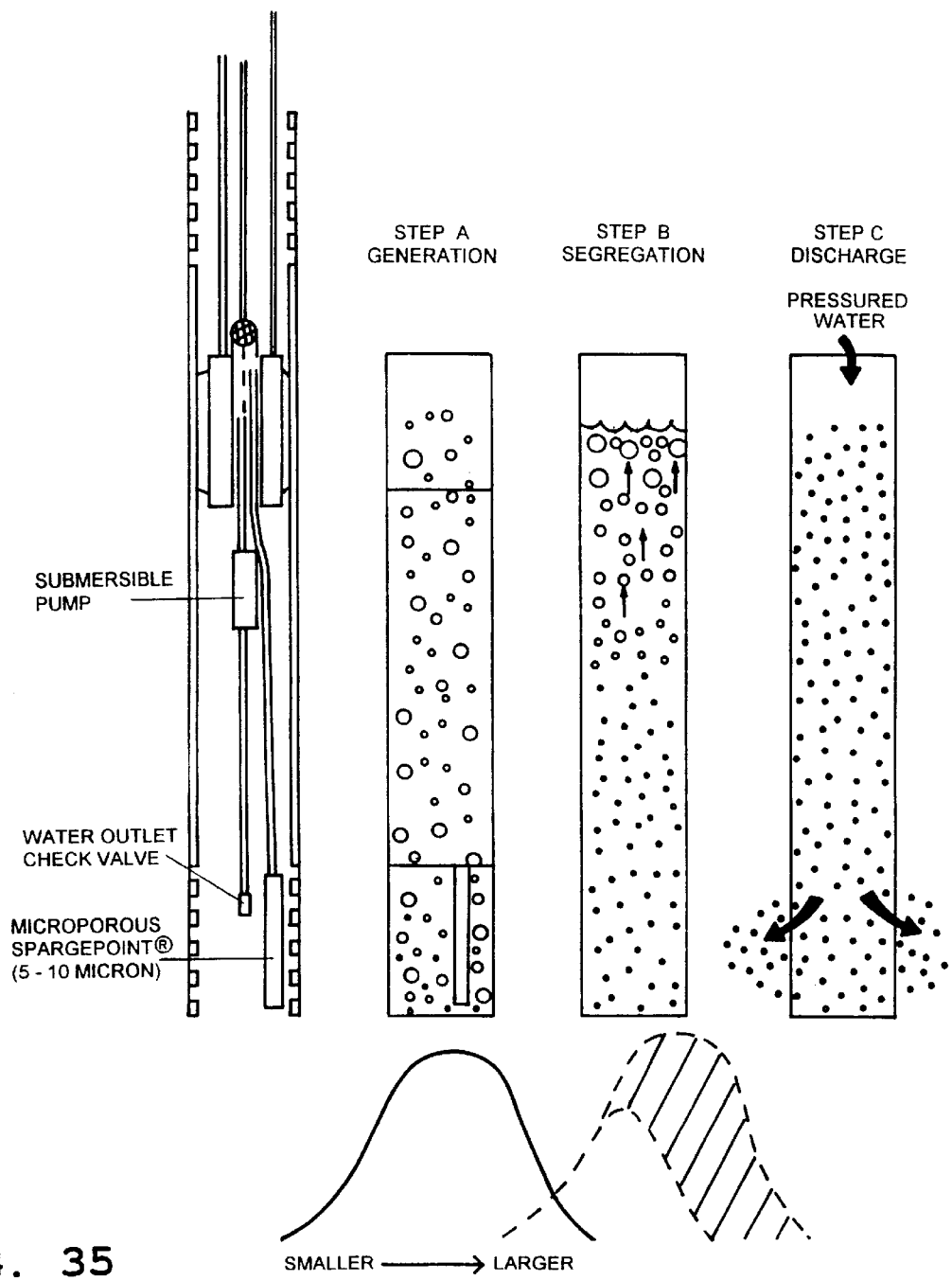

The process can be visualized in three steps. Firstly (step A) generation of a large range of bubble sizes at one time, secondly (step B) the segregation step when larger bubbles segregate out and form a gas space at the top, and thirdly (step C) the fine bubbles remaining are then pumped out the lower well screen as water under pressure is introduced from the top (FIG. 35).

XXII. INDUCTION OF MICROBUBBLE MOVEMENT

The induction of microbubble flow through a sandy saturated deposit (aquifer) can be compared to that of transferring electron movement through alternating current. An alternating wave of pressure is created where the amplitude varies continuously.

$$p = P_{max} \bullet \sin\theta$$

where:

$p$ = the instantaneous pressure amplitude in inches (cm) of water $P_{max}$ = the maximum pressure in inches (cm) of water $\theta$ = the angle at which pressure is being calculated These values are repeated during the remainder of the first alternation, but in reverse order if a modal value is chosen as reference. The magnitude of $P_{max}$ lies above critical bubbling pressure but below fracturing pressure of formation.

Figure 36:
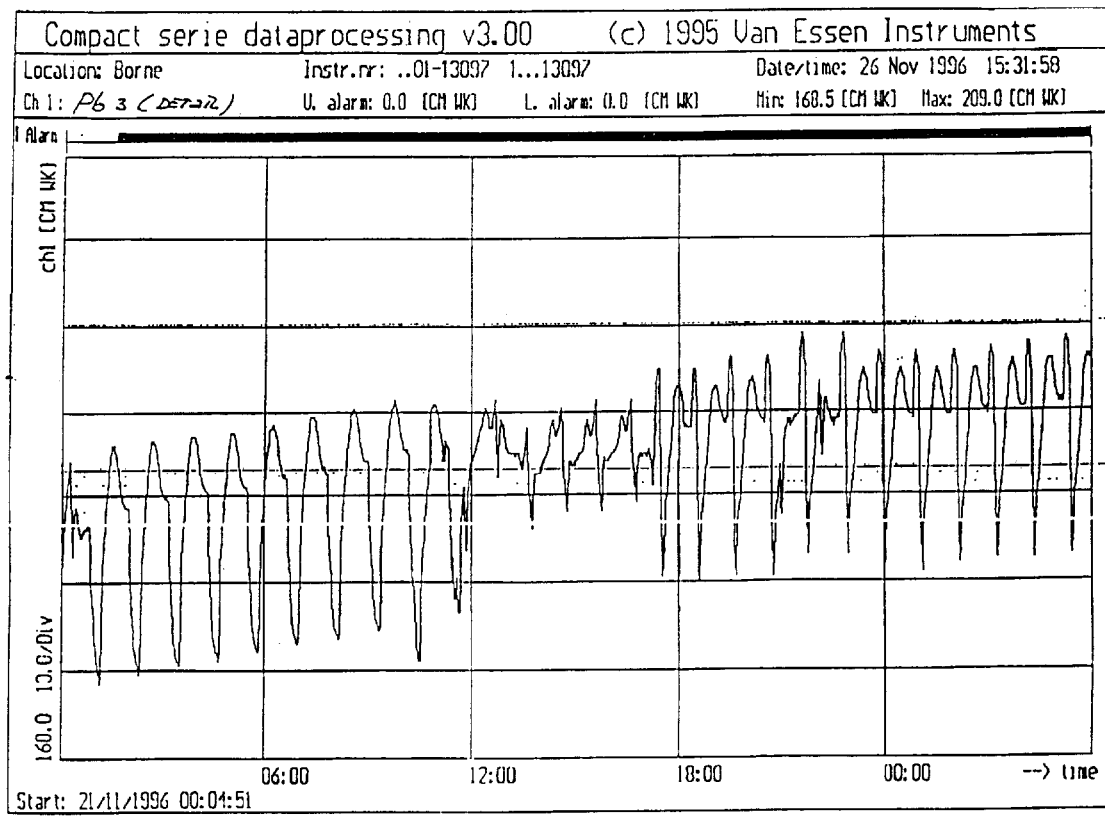

The pulsing pressure wave can be seen at distance from the C-Sparger™ well (FIG. 36). Cycle time can vary from 30 minutes to 10 minutes.

Figure 37:
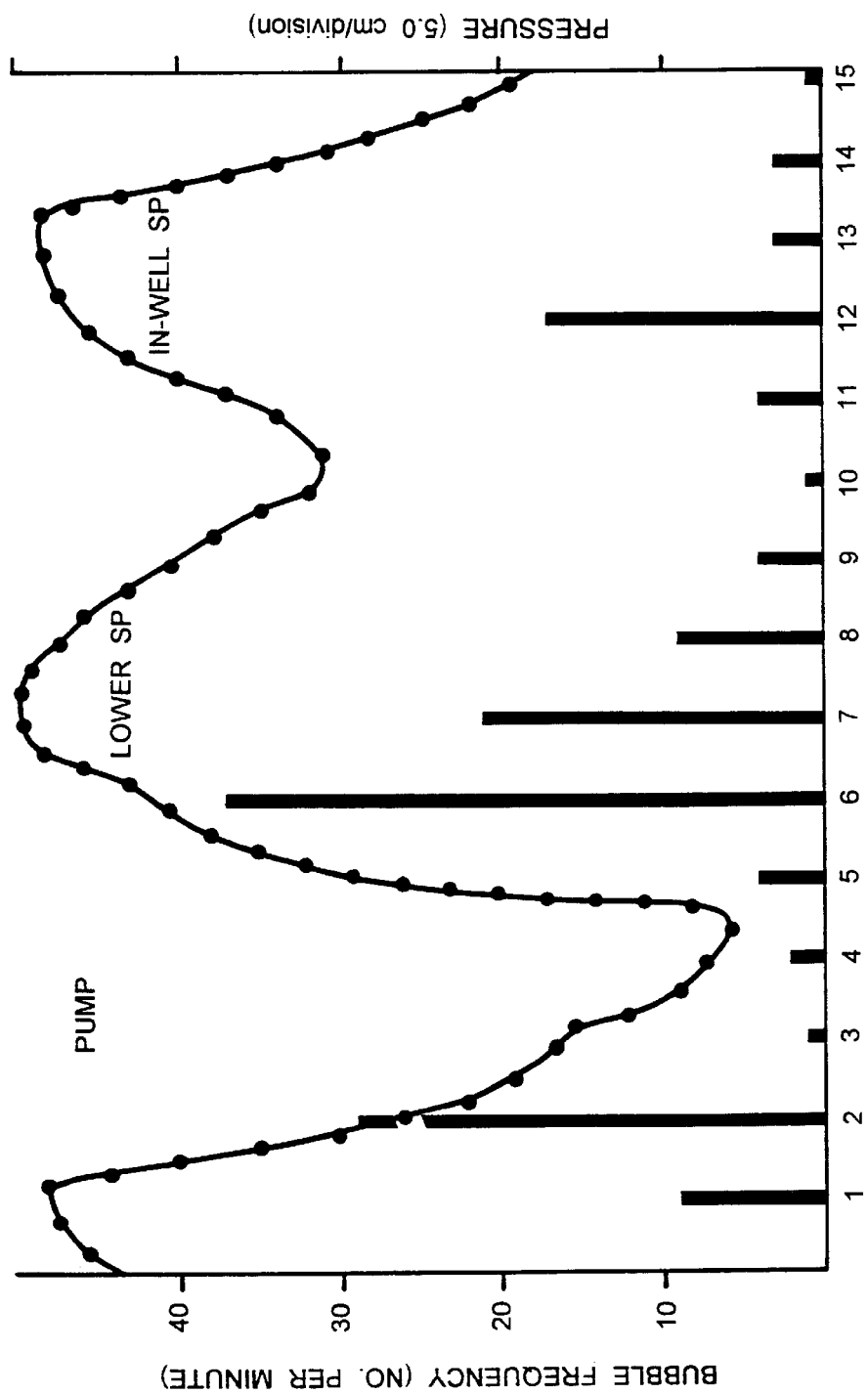

The movement of microbubbles and inbetween water occurs as a response to the pressure difference, and has a similar equation:

$$v = V_{max} \bullet \sin\theta$$

where:

$v$ = the instantaneous velocity in ft/day $V_{max}$ = the maximum velocity in ft/day -continued $\theta$ = the angle at which instantaneous velocity is being calculated Because of the nature of resistance and storage capacity in an aquifer, pressure change (inductance) and bubble flow (velocity) may have a phase difference The alternating pressure of the C-Sparger™ unit creates a wavefront which pushes the microbubbles along. By alternating water injection with microbubble production, a continuous flow of microbubbles is produced. When a monitoring well is encountered, the fine bubbles can be seen to enter the screens in spurts (FIG. 37).

Microbubbles, being less dense than water, will tend to rise, resulting in a parabolic upwards pathway. The rising rate (velocity) produces a displacement of water upwards which creates an inflow of lower water, inducing an eddy and mixing with a particular radius of the installed spargewell.

XXIII. RECIRCULATION MECHANICS

The use of the bubble chamber, composed of vertically offset well screens, creates large circular eddies on each side of the C-Sparger™ unit when it is placed in an unconfined aquifer. The rise of bubbles, combined with pulsed liquid recirculation between the screens, drives a mass of groundwater vertically which then moves along the surface region before diving below. The net effect is to act as a big vacuum cleaner, sucking water from below and lateral to it and exposing the circulating water to continual treatment and removal of VOCs. The advantages are several:

(1) Rates of reaction within the circulating cell do not diminish (exponentially decay) with distance from the bubble emission source as would be the case if reaction were bubble density dependent. Instead the recirculating water creates a rate of removal which is uniform within the circulating cell of water. Concentration level then is only affected by initial rate of removal and the absence of influx from another source or upgradient groundwater.

(2) The system can expand its region of effect beyond the upper regions which the bubbles transmit through. It can "vacuum" concentrations along a bottom confining layer and circulate them within the region of exposure to the bubbles.

(3) The lateral extent of treatment depends upon the distance between the lower bubble generator and the topmost well screen. Generally, the cross-sectional area of influence is about 2.5 times the vertical distance between the lower sparge bubble generator and the upper screen.

Figure 38:
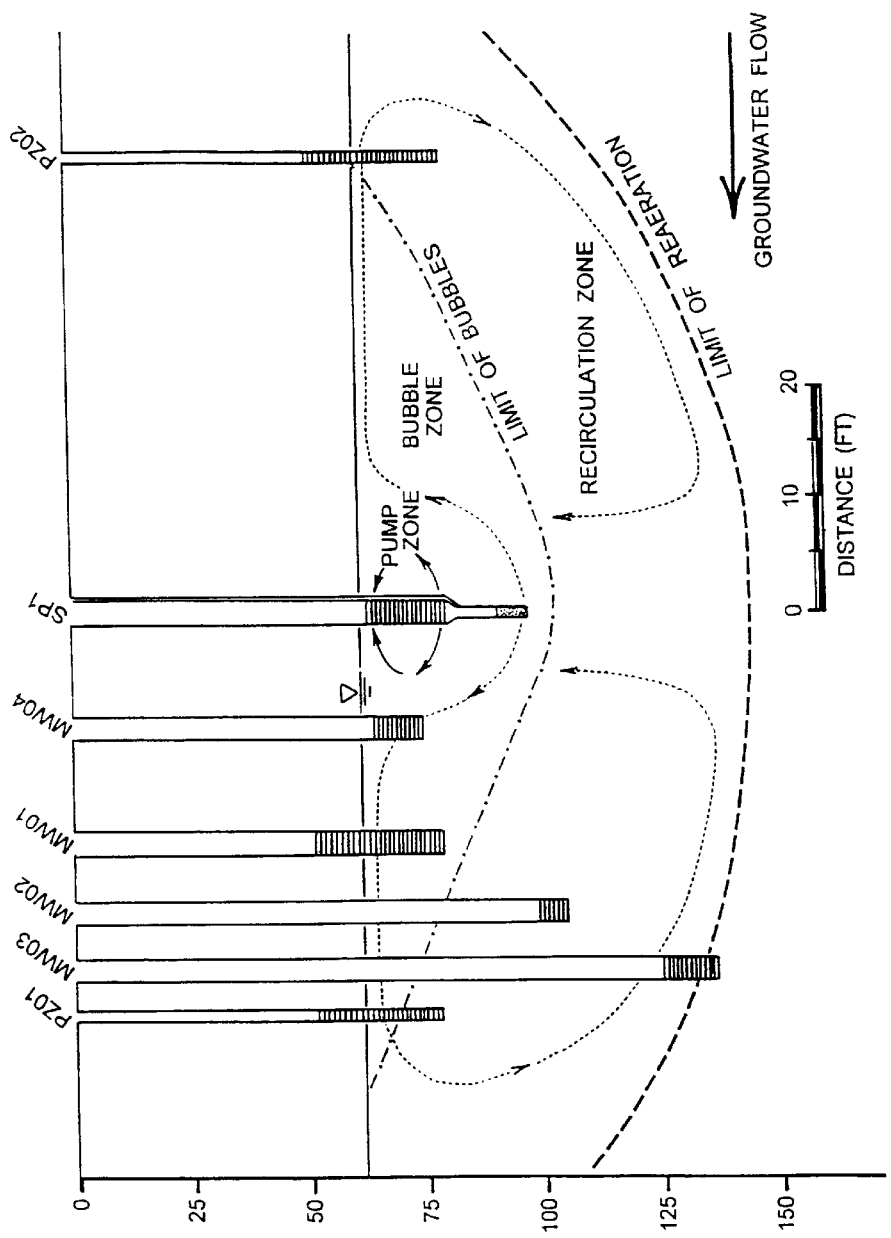

(4) The mixing capacity of recirculation allows mechanics to be used equivalent to Diffused-Air Aeration Process Mechanics. The three-dimensional recirculation cell can be considered similar to the boundaries of a tank (FIG. 38). If groundwater flow is very slow, the cell is considered a fixed reactor with only circulation and no inflow. If groundwater movement is significant, the transfer into the cell is equivalent to inflow and the loss of groundwater downgradient, the discharge effluent.

Figure 39:
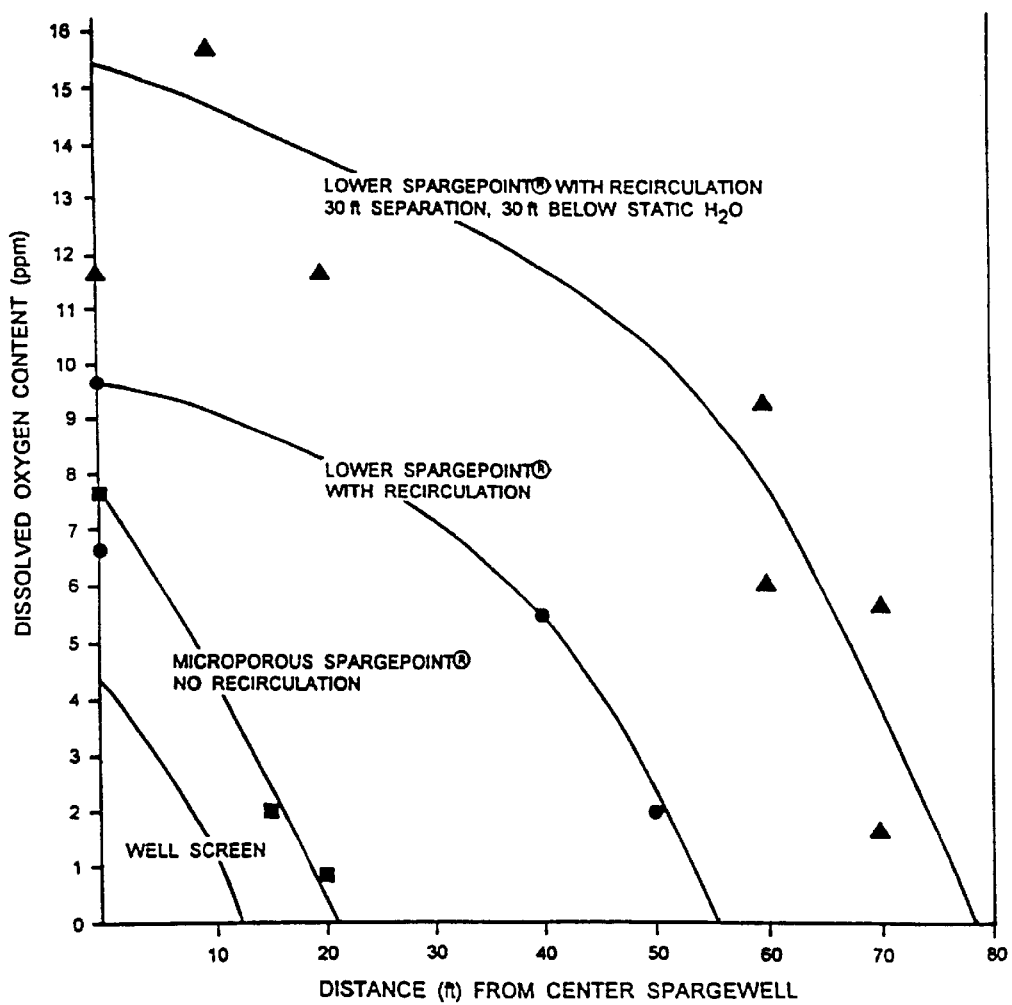
Figure 40:
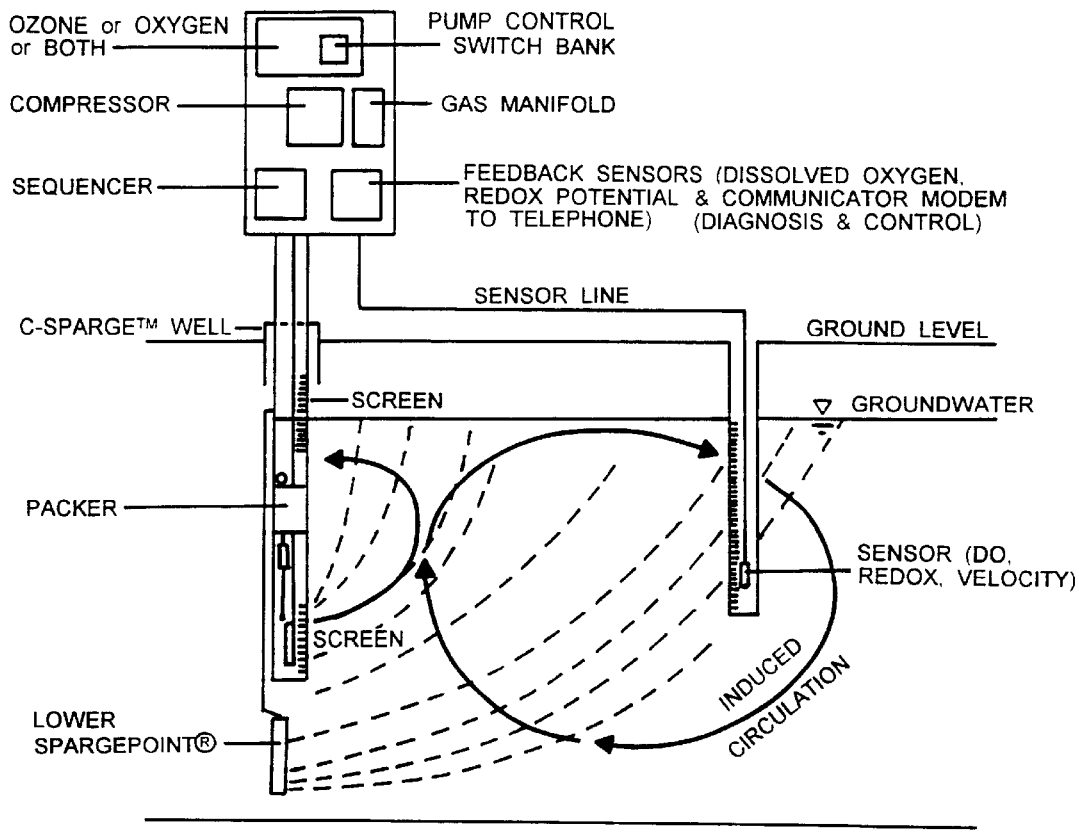

The tremendous advantage that the microbubble injection has over slotted well screen injection can be shown in FIG. 39. A flow of 5 CFM to a five-foot long, two-inch slotted PVC monitoring well screen placed 10 feet below static water results in a measured rise in dissolved oxygen at distances of 15 feet. With the use of a microporous bubble generator (Spargepoint®) under pulsed operation at the same position, the radius increases to over 20 feet. If the C-Sparger™ unit is used with microbubble production chamber and pulsed recirculation, the zone expands to beyond a 50-foot radius. Enlarging the distance between recirculating well screens can even further enlarge the radius.

XXIV. PROCESS CONTROL, MONITORING, COMMUNICATOR UNIT

The C-Sparger™ unit is equipped with a telephone modem diagnostic sensor unit and monitoring well sensor which feed back to the sequencer to control the groundwater/soil remediation process. A remote unit can then monitor the extent of treatment and induced groundwater mixing and determine when to move to another spargewell. An operator can dial the unit and receive past and ongoing data on groundwater condition and machine operation. The recorded data can be dumped for graphic presentation.

XXV. ELIMINATION OF THE NEED FOR VAPOR EXTRACTION

The need for vapor control exists when vapors of VOCs, partitioned from dissolved form into the microbubbles, reach the unsaturated zone, releasing vapors. Without reaction with a decomposing gas, such as ozone, a large mass can be transmitted in a short time, creating potential health problems near residential basement areas.

The combined extraction/decomposition process has the capacity to eliminate the need for vapor capture. If the decomposition rate with ozone exceeds the vertical time-of-travel, vapors will not be produced or their concentration will be so low as to not require capture. By controlling the size of microbubbles and matching them to suitable slow rise times, the need for vapor control is eliminated.

The rise time of bubbles of different sizes was computed for water, giving the upwards gravitational velocity. The upwards velocity provides the positive pressure to push the bubbles through the porous media, following Darcy's equation. The actual rise time is dependent upon the size of the bubble, the frequency of agitation (pulsing) and pressure differential during pulses. By timing the rise rate in the field, the rise time, proportional to upwards pressure, can be calculated. Following is rise time in medium to coarse sand, based upon 15 minute pulse cycles of generation with an equivalent pressure differential of 20 psi at the source, 0.5 ft. change at 30 ft. radius from generation (Table 7).

TABLE 7

| BUBBLE DIAMETER | UPWARD VELOCITY IN WATER | TIME (MINUTES) FOR UPWARDS MIGRATION (3 METERS) |
|---|---|---|
| 10 mm | .25 m/s | 19 min. |
| 2 mm | .16 m/s | 30 min. |
| .2 mm | .018 m/s | 240 min. |
| .02 mm | .005 m/s | 600 min. |

Local recirculation of the water by a vertical bubble production chamber (double-screen well), greatly increases the rate of reaction by circulating water through the bubble pulses.

XXVI. ELIMINATION RATE OF PCE RELATIVE TO OZONE CONTENT

The reaction of ozone with tetrachloroethene (PCE) in the presence of substrate (sub) sand will produce degradation products of hydrochloric acid and carbon dioxide. By adjusting the ozone concentration to match the dissolved PCE level, the PCE can be removed rapidly without excess ozone release to the air or release of PCE vapor into the unsaturated zone.

TCE

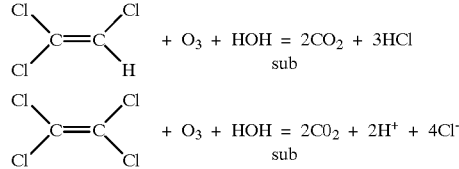

The reaction of ozone and PCE in the air bubbles is a gas reaction. The molecular weight of PCE is 168 gm/mole; ozone is 48 gm/mole. A mass of 3.5 grams of PCE reacts with one gram of $O_3$ needed to react with 1 mole PCE. To calculate the concentration of gms/day ozone to match the removal need, the total mass of dissolved PCE in the treated water column is computed. Assuming a porous cylinder of 8 meters radius and 2 meters deep (contaminated zone), the liquid volume of medium sand (0.30 porosity) is about 60,000 liters. If the mean PCE concentration is 100 ppb, 6.0 gm of PCE are contained within the cylindrical water column. From a mass balance standpoint, about 2 grams of ozone would be sufficient to remove the 100 ppb PCE concentration if both could be instantaneously brought into contact.

If the ozone generating unit produces 5 g/1440 minutes and it is operated 200 min/day then 0.69 gms/day would be released. Dividing the grams of PCE by 3.5 yields the ozone needed, and then dividing by the rate of production of ozone gives an approximation of removal rate, assuming good distribution of bubbles throughout the medium sand contaminated area.

$$\frac{2\,\text{gms}}{.674\,\text{gms/day}} = 30 \text{ days for complete removal, assuming } 100\% \text{ extraction and no ozone decay.}$$

XXVII. BUBBLE MECHANICS

In reality, the reaction rate is dependent upon the total number of bubbles (area of extraction), the efficiency of distribution of the bubbles, and the rate of transfer into the bubbles. The rate of decomposition within the bubbles is a ratio proportional to concentration, i.e., it slows as concentration decreases.

XXVIII. USE OF SPECIALLY—DESIGNED WELLHEADS (1) The hydraulic conductivity of saturated sandy formations may vary over a range of 1000 fold. In glacial outwash, a 50 fold range may be common in a short distance. If a series of spargepoints are placed at a fixed depth across formations of varying resistances, like fine sand (k=5 ft/d), medium sand (k=100 ft/d), and coarse gravel (k=1000 ft/d), the point in coarse gravel would steal all the flow. To compensate for this, a resistance element, like a needle valve, may be placed inline with a flowmeter to allow the flow to be equalized to each point. The capacity to maintain pressure at the wellhead is simultaneously measured by a pressure gauge. (2) By comparing flow and pressure, the performance can be checked with the original site test procedure. The wellheads are often installed at the top of the bubble generator to limit the number of individual lines back to the compressor/ozonator. Placed in a wellhead, a vertical mount block flow meter cannot be easily read. To allow easy reading, a 45 degrees angle mirror was installed and the scale printed in mirror image to allow for easy reading.

XXX. MOUNDING

During the pilot test a noticeable rise in ground water levels should occur. The phenomenon of groundwater mounding occurs when a fluid is introduced into soil in unconfined sandy aquifers. Small bubbles displace an equivalent volume of water, creating a movement of water horizontally and vertically. Hantush (1976) and Fielding (1981) have developed equations to depict two-dimensional behavior of groundwater in a constant-recharging system. Assuming a radial flow of bubbles in an aquifer of thickness (D), the head distribution can be represented as:

$$(hm - hx) = \frac{Q_o}{2K_g(D + hx)}$$

where:

$K_g$ = bubble conductivity $(hm - hx)$ = pressure head (ft)

$m$ = maximum water rise (ft)

$D$ = depth of aquifer $\pi$ = pi, a constant (3.14...)

$Q_o$ = gas outflow (cfd)

$x$ = distance from source (ft)

In a theoretical depiction, the introduced bubbles exit the bubble generator and migrate vertically, resulting in a symmetrical sphered shape. In reality, circular regions rarely are found. More commonly, an elliptical region is found, reflecting higher hydraulic conductivity in one axis than another, inherent with the depositional history of the formation. See FIG. 19 for a depiction of groundwater mounding caused by sparging.

XXX. ZONE SPARGING—MULTIPLE ZONES WITH ONE SYSTEM

The simplest sparging system attaches ten or twenty sparging points to one gas supply. The individual flow controllers adjust each sparging point for even air flow and sparging. A zone control system adds an electronic or mechanical programmable timer that opens and closes valves to direct the air supply to the appropriate manifold. The zone control is added to the system to expand the system and improve control of the sparging. Sequential periods of aeration improve the sparging action and expand the capabilities of a single air source for the system. If, for example, one microfine sparge system can provide adequate gas supply to 10 sparge bubblers, zone control can increase this to 20, 30 or more.

XXXI. PRODUCT MIGRATION CONTROL THROUGH ZONE SPARGING

If the potential of product migration exists, a design for controlling the movement of floating product off-site is accomplished by sequential sparging using discrete zones of sparge bubble generators. Stylized illustration of such a system shows that an outer ring of sparge locations provides a barrier for outward migration of contaminants by concentric mounding focused toward the center. Control of the height of water mounding through the length of time of sparging or pressure/air volume control per sparge locus serves to push any floating product in a predictable direction, toward extraction wells. Using sequential timing and air volume control is an effective strategy for product migration abatement.

Concentric zones permit containing any floating contaminant. Concentric zones of sparging centers, activated for different lengths of time and volumes of air, will form a barrier to off-site product migration. A contaminated region with overlapping zones of sparging contains a plume. The midpoint of Region A is located just outside the contaminated zone. The sequence of sparging involves first zone A, then zone B, and finally zone C. Greater volume and/or duration of sparging in zone A forms a barrier ridge, forcing product toward the center of zone C.

Individual sparge bubble generator effects are shown graphically as the location of introduced bubbles in the saturated zone. The shape of the bubbled zone is composed of the original groundwater zone plus an area above static water level where water is mounded and is governed by the air pressure and volume. Higher pressure and greater volume gives a wider diameter of influence while lower pressure and lower volume influence a smaller diameter area. Overlap of these affected areas increases the thickness of the uniformly sparged areas, decreasing the areas missing the introduction of air. If there is a natural groundwater flow and directional transmissivity in an aquifer, then the sparged zone becomes distorted downgradient and non-uniform in diameter. The more knowledge available of the water bearing zone, the more likely it is to predict the effects of sparging and control them. The sparged area then actually becomes a barrier inhibiting contaminant migration.

XXXII. DEGREE OF OVERLAP OF BUBBLE ZONES

Two important reasons exist which support overlapping sparge bubble generator zones of influence: (1) even distribution of the aeration and gas transfer in sparging, and (2) elimination of vertical gaps in the treated areas. While a two-dimensional set of circles can be arranged in a triangular or rhomboid configuration with circumferences touching, the region within is not equally saturated with air bubbles. From a single source, bubbles are ejected outwards. Their density decreases exponentially with distance in a uniform medium. Overlapping sparging centers compensate by increasing the bubble density in the outer regions of influence where the number of bubbles are smaller.

In a three-dimensional perspective, the spacing of the sparging points leaves gaps between the conical zones where the bubbles rise. The closer the points, the smaller the stagnant zones become. Overlap in the vertical as well as horizontal dimension tends to create eddies of groundwater as well as promote gaseous transfer from entrapment in the saturated formation to rising bubbles of introduced air.

XXXIII. THE USE OF ALTERNATING (PULSE) PUMPAGE AND BUBBLE INJECTION

Purpose: If a bubble generator is placed within a well, the microbubbles will not penetrate into the formation. Installation of an inverted submersible pump with a pneumatic packer to alternately pump the well volume water containing the nicrobubbles out into the formation allows the bubble generator to be installed in an existing elongate well screen.

The function of the inverted pump also adds two additional advantages to normal microbubble production: (1) the periodic outwards pressure enlarges the bubble radius over that of a microporous point alone and, (2) the alternating of water pulsing after bubble production decreases the formation of air channels which tend to enlarge with continual air injection. Plugging the forming channels with water resists the re-entry of air, producing far more channels, the pathways varying in time.

XXXIV. USE OF A PHYSICAL ARRANGEMENT OF SEQUENTIALLY ARRANGED SPARGEPOINTS INSTALLED AT AN ANGLE.

The use of angled straight boring for sparging allows unique effects ideal for treatment of groundwater plumes of petroleum based volatile organics or volatile solvents. Increasing the depth below static water directly increases the radius of bubbling, creating a natural widening of the bubble zone. With an inclined well, multiple bubblers can create a broadening pattern from dense to diffuse with distance. By overlapping the slanted installation, a three dimensional bubble "fence" is created by the staggered placement of bubble emitters.

What is claimed is:

1. A process for removing contaminants, including dissolved chlorinated hydrocarbons and dissolved hydrocarbon products, said process comprising:
    evaluating a site to identify contaminants present on the site;
    installing an infection well system and sparge system including a sparge apparatus at each injection well of said well system;
    selecting an appropriate bubble size range for gaseous exchange with the contaminants, by matching the bubble size range with characteristics of the sparge apparatus and microporous materials used with the sparge apparatus in accordance with results obtained from evaluating the site;
    controlling a supply of gas, said gas including an oxidizing gas, while injecting the gas into the site, and alternating water injection with bubble production to provide an even dispersion of bubbles, to promote pulling of contaminants into the bubbles and to decompose the contaminants in a reaction with the gas in the bubbles in the presence of water; and
    enhancing decomposition of the contaminants by carrying out the reaction in the presence of a reaction promoter.

2. The process of claim 1 wherein the bubbles of oxidizing gas include oxygen and ozone and with the bubbles having a bubble diameter in a range of less than about 200 microns.

3. The process of claim 1 wherein the microporous diffusers have a porosity characteristic matched to soil conditions on the site and fluid acceptance range to avoid fracturing of the substrate structure.

4. The process of claim 2 wherein the bubbles of oxidizing gas extract volatile dissolved tetrachloroethene, trichloroethene, dichloroethene and/or vinyl chloride, while encapsulated ozone decomposes the tetrachloroethene, trichloroethene, dichloroethene and/or vinyl chloride by providing even distribution of the bubbles into an aquifer containing sand material act as co-reactant with the gas for decomposing the VOCs.

5. The process of claim 2 wherein the bubbles contain a mixture of air and ozone to allow a rapid decomposition of contaminants extracted from the groundwater wherein said system provides for varying the respective concentrations of oxygen and ozone respectively.

6. The process of claim 1 further comprising:
    simultaneously extracting and decomposing those contaminants that are organic compounds with high Henry's constants greater than about 0.0001 atm-m$^3$/mol, by matching a time of exposure for decomposition to a vertical travel time of the bubbles.

7. The process of claim 1 further comprising equalizing the injected flows between formations of differing permeability.

8. The process of claim 1 further comprising controlling bubble zone overlap; and
    periodically pulsing the injected gas to improve dispersion area of influence and avoid movement of floating product.

9. The process of claim 1 further comprising:
    sensing groundwater pressure to monitor and regulate the mixing/reactions of said process.

10. The process of claim 1 further comprising:
    pulsing of bubble injection to maximize dispersal of bubbles within and outward from said injection well casing.

11. The process of claim 1 further comprising:
    arranging the microporous diffusers at a non-normal angle to the ground while maintaining independent pressure and flow control on the microporous diffusers.

12. A sparging system for in-situ removal of contaminants from soil and an associated subsurface groundwater aquifer of a site comprising:
    a microporous diffuser having a porosity matched to a soil porosity characteristic;
    packing material having a porous structure matching the condition of porosity of the soil with 30 percent (30%) pore distribution;
    an injection well within which is disposed the at least one microporous diffuser to inject microbubbles in the site;
    an ozone generator;
    a co-reactant that promotes decomposition of the contaminants by reaction with the gas in the bubbles in the presence of water;
    a bubble chamber comprising:
        a pneumatic packer;
        a pump having an inlet above the bubble chamber and an outlet in the bubble chamber below the pneumatic packer; and
        an outlet screen providing the outlet for the bubble chamber, said outlet screen having a porosity matched to that of a porosity condition of soil;
    a controller to control the pump and gas delivered to the diffuser and bubble chamber to alternate pumping and bubble injection, with the controller operating the pump to alternate pumping and bubble injection into the well to maximize dispersal of bubbles within and outward from the injection well and to provide uniform dispersion of the bubbles as they travel through the site formation; and
    pressure monitoring and groundwater sensing devices to remotely monitor and regulate mixing operation of the system.

13. The process of claim 1 wherein selecting is further dependant upon characteristics of a surrounding sand pack, sizing bubble chamber, and a programming waveform used to control pulsing of gas/water injection.

14. The process of claim 1 wherein pulling of contaminants into the bubbles avoids a need for a vapor recovery by decomposing volatile contaminants before such contaminants reach an unsaturated soil zone.

15. The process of claim 1 wherein the sparge apparatus in each injection well comprises:
an in-well bubble chamber and a recirculation system to control the size of bubbles to promote even bubble dispersion.

16. The process of claim 2 wherein the bubbles contain a mixture of air and ozone, to allow a rapid decomposition of volatile organic compounds, halogenated volatile organic compounds, and benzene, toluene, ethyl benzene and xylene.

17. The process of claim 4 wherein decomposing uses a Criegee reaction in which unsaturated chlorinated compounds or vinyl chloride are decomposed by reaction of ozone with double carbon bonds forming chlorinated carboxyl and chlorinated aldehyde compounds that decay in the presence of water to form hydrochloric acid and carbon dioxide.

18. The process of claim 1 wherein the reaction promoter is iron silicate.

19. A process for removing contaminants, including dissolved chlorinated hydrocarbons and dissolved hydrocarbon products, said process comprising:
injecting gas including an oxidizing gas, into the site; and
alternating water injection with bubble production to provide an even dispersion of bubbles, with the bubbles having a bubble diameter in a range of about 5 to 200 microns to promote pulling of contaminants into the bubbles and to decompose the contaminants in a reaction with the gas in the bubbles in the presence of water.

20. The process of claim 19 further comprising:
enhancing decomposition of the contaminants by carrying out the reaction in the presence of a reaction promoter.

21. The process of claim 20 wherein the bubbles of oxidizing gas include oxygen and ozone.

22. The process of claim 19 wherein the microporous diffusers have a porosity characteristic matched to soil conditions on the site and fluid acceptance range to avoid fracturing of the substrate structure.

23. The process of claim 20 wherein the bubbles of oxidizing gas extract volatile dissolved tetrachloroethene, trichloroethene, and/or dichloroethene while encapsulated ozone decomposes the tetrachloroethene, trichloroethene, and/or dichloroethene by providing even distribution of the bubbles into an aquifer containing sand.

24. The process of claim 23 wherein the reaction promoter occurs in the sand.

25. The process of claim 23 wherein the reaction promoter is iron silicate.

26. The process of claim 19 wherein the bubbles contain a mixture of air and ozone to decompose the contaminants; further comprising varying respective concentrations of oxygen and ozone to effect the rate of decomposition.

27. A process for removing contaminants from a site, said contaminants including dissolved chlorinated hydrocarbons and dissolved hydrocarbon products, said process comprising:
injecting into the site, gas, including an oxidizing gas under conditions to cause the oxidizing gas to break carbon-carbon bonds in the contaminants in the site, said injecting further comprising:
alternating water injection with bubble production to provide an even dispersion of bubbles, with the bubbles having a bubble diameter in a range of about 5 to 200 microns to promote pulling of contaminants into the bubbles and to decompose the contaminants in the reaction that breaks the double carbon bonds with the gas in the bubbles in the presence of water; and
enhancing decomposition of the contaminants by carrying out the reaction in the presence of a reaction promoter.

28. The process of claim 27 wherein the oxidizing gas includes ozone and the contaminates contain double-bonded carbon bonds.

29. The process of claim 28 wherein the chlorinated hydrocarbons include tetrachloroethene, trichloroethene, dichloroethene and/or vinyl chloride.

* * * * *